(12) United States Patent
Okada

(10) Patent No.: US 6,744,929 B1
(45) Date of Patent: Jun. 1, 2004

(54) IMAGE DATA COMPRESSION METHOD IMAGE DATA COMPRESSION APPARATUS AND RECORDING MEDIUM AND DATA SIGNAL FOR PROVIDING IMAGE DATA COMPRESSION PROGRAM

(75) Inventor: Sadami Okada, Sakado (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 09/466,869

(22) Filed: Dec. 20, 1999

(30) Foreign Application Priority Data

Nov. 18, 1999 (JP) .......................... 11-328379
Nov. 18, 1999 (JP) .......................... 11-328380
Nov. 18, 1999 (JP) .......................... 11-328381

(51) Int. Cl.$^7$ ............................................... G06K 9/36
(52) U.S. Cl. ..................................................... 382/251
(58) Field of Search ................................ 382/232–233, 382/237–240, 241–243, 244–248, 250–251, 166; 375/240.1, 240.14, 240.18, 240.21, 240.23, 210.25; 358/520, 539, 448, 426.01, 426.02, 426.05, 426.15; 348/396.1

(56) References Cited

U.S. PATENT DOCUMENTS

| | | | | |
|---|---|---|---|---|
| 4,555,802 A | * | 11/1985 | Fedak et al. ................. | 382/243 |
| 4,707,729 A | * | 11/1987 | Bruno et al. ............. | 348/396.1 |
| 5,315,670 A | * | 5/1994 | Shapiro ....................... | 382/240 |
| 5,321,776 A | * | 6/1994 | Shapiro ....................... | 382/240 |
| 5,384,646 A | * | 1/1995 | Godshalk et al. ........... | 358/448 |
| 5,412,741 A | * | 5/1995 | Shapiro ....................... | 382/232 |
| 5,416,857 A | * | 5/1995 | Chen et al. .................. | 382/237 |
| 5,850,261 A | * | 12/1998 | Kondo et al. .......... | 375/240.24 |
| 6,320,986 B1 | * | 11/2001 | Strohacker .................. | 382/239 |

* cited by examiner

*Primary Examiner*—Leo Boudreau
*Assistant Examiner*—Ishrat Sherali
(74) *Attorney, Agent, or Firm*—Oliff & Berridge, PLC

(57) ABSTRACT

An image data compression method invention for compressing image data including pixel data having a specific number of bits per pixel obtained at an image input device, includes: a step in which the pixel data having the specific number of bits are divided into higher-order bit data having a first number of bits and lower-order bit data having a second number of bits; and a step in which at least the higher-order bit data resulting from division are compressed through a specific compression method.

17 Claims, 39 Drawing Sheets

FIG. 2

| B11 | G12 | B13 | G14 | B15 |
|-----|-----|-----|-----|-----|
| G21 | R22 | G23 | R24 | G25 |
| B31 | G32 | B33 | G34 | B35 |
| G41 | R42 | G43 | R44 | G45 |
| B51 | G52 | B53 | G54 | B55 |

FIG. 10

| B11 | G12 | B13 | G14 | B15 |
|-----|-----|-----|-----|-----|
| G21 | R22 | G23 | R24 | G25 |
| B31 | G32 | B33 | G34 | B35 |
| G41 | R42 | G43 | R44 | G45 |
| B51 | G52 | B53 | G54 | B55 |

FIG. 19

| 12-BIT RAW DATA | 12-BIT RAW DATA VALID BIT WIDTH | VALID BIT POSITION | NUMBER OF VALID BITS IN LOWER-ORDER BIT DATA |
|---|---|---|---|
| 1xxx xxxx xyyy | 9 | Bit1-Bit9 | 1 |
| 01xx xxxx xxyy | 9 | Bit2-Bit10 | 2 |
| 001x xxxx xxxy | 9 | Bit3-Bit11 | 3 |
| 0001 xxxx xxxx | 9 | Bit4-Bit12 | 4 |
| 0000 1xxx xxxx | 8 | Bit5-Bit12 | 4 |
| 0000 01xx xxxx | 7 | Bit6-Bit12 | 4 |
| 0000 001x xxxx | 6 | Bit7-Bit12 | 4 |
| 0000 0001 xxxx | 5 | Bit8-Bit12 | 4 |
| 0000 0000 1xxx | 4 | Bit9-Bit12 | 4 |
| 0000 0000 01xx | 3 | Bit10-Bit12 | 4 |
| 0000 0000 001x | 2 | Bit11-Bit12 | 4 |
| 0000 0000 0001 | 1 | Bit12 | 4 |

FIG. 20

| NUMBER OF SIGNAL CHARGES IN CCD (ELECTRONS) | SIGNAL VALUE (GRADATIONS) | EFFECTIVE SIGNAL LEVEL (GRADATIONS) | NOISE COMPONENT (GRADATIONS) | |
|---|---|---|---|---|
| $1.0 \times 10^5$ | 4096 | $(1.0 \times 10^5)^{1/2} \approx 316.2$ | 12.95 | |
| $X_1 \times 10^5$ | $4096 \times X_1$ | $(X_1 \times 10^5)^{1/2}$ | $8 \,(=2^3)$ | $X_1 \approx 0.38147$ |
| $X_2 \times 10^5$ | $4096 \times X_2$ | $(X_2 \times 10^5)^{1/2}$ | $4 \,(=2^2)$ | $X_2 \approx 0.09537$ |
| $X_3 \times 10^5$ | $4096 \times X_3$ | $(X_3 \times 10^5)^{1/2}$ | $2 \,(=2^1)$ | $X_3 \approx 0.02384$ |

FIG. 21

| | 12-BIT RAW DATA SIZE (GRADATIONS) | NUMBER OF VALID BITS IN LOWER-ORDER 4 BITS | RAW DATA VALID BIT WIDTH |
|---|---|---|---|
| FIRST RANGE | 4095~1552 | 1 | 9~8 |
| SECOND RANGE | 1552~384 | 2 | 8~7 |
| THIRD RANGE | 384~96 | 3 | 7~6 |
| FOURTH RANGE | 96~0 | 4 | 6~1 |

FIG. 22

| INPUT DATA | | HIGHER-ORDER 8 BITS | LOWER-ORDER 4 BITS | | LOWER-ORDER 4 BIT EFFECTIVE DATA |
|---|---|---|---|---|---|
| DECIMAL NOTATION | HEXADECIMAL NOTATION | HEXADECIMAL NOTATION | HEXADECIMAL NOTATION | BINARY NOTATION | BINARY NOTATION |
| 2748 | 0xABC | 0xAB | 0xC | 0b1100 | 0b1 |
| 812 | 0x32C | 0x32 | 0xC | 0b1100 | 0b11 |
| 156 | 0x9C | 0x9 | 0xC | 0b1100 | 0b110 |
| 76 | 0x4C | 0x4 | 0xC | 0b1100 | 0b1100 |

FIG. 23

| 12-BIT RAW DATA | 12-BIT RAW DATA VALID BIT WIDTH | VALID BIT POSITION | NUMBER OF VALID BITS IN LOWER-ORDER BIT DATA |
|---|---|---|---|
| 1xxx xxxx xyyy | 9 | Bit1-Bit9 | 1 |
| 01xx xxxx xyyy | 8 | Bit2-Bit9 | 1 |
| 001x xxxx xxyy | 8 | Bit3-Bit10 | 2 |
| 0001 xxxx xxyy | 7 | Bit4-Bit10 | 2 |
| 0000 1xxx xxxy | 7 | Bit5-Bit11 | 3 |
| 0000 01xx xxxy | 6 | Bit6-Bit11 | 3 |
| 0000 001x xxxx | 6 | Bit7-Bit12 | 4 |
| 0000 0001 xxxx | 5 | Bit8-Bit12 | 4 |
| 0000 0000 1xxx | 4 | Bit9-Bit12 | 4 |
| 0000 0000 01xx | 3 | Bit10-Bit12 | 4 |
| 0000 0000 001x | 2 | Bit11-Bit12 | 4 |
| 0000 0000 0001 | 1 | Bit12 | 4 |

FIG. 25

| B 11 (204) | G 12 (52) | B 13 (202) | G 14 (54) | B 15 (197) |
|---|---|---|---|---|
| G 21 (46) | R 22 (100) | G 23 (50) | R 24 (102) | G 25 (53) |
| B 31 (206) | G 32 (50) | B 33 (200) | G 34 (53) | B 35 (195) |
| G 41 (47) | R 42 (97) | G 43 (52) | R 44 (98) | G 45 (47) |
| B 51 (201) | G 52 (48) | B 53 (202) | G 54 (49) | B 55 (196) |

|   |   |   |   |   |   |
|---|---|---|---|---|---|
|   | f |   | e |   |   |
|   |   | c | b |   |   |
|   | d | a | x |   |   |
|   |   |   |   |   |   |
|   |   |   |   |   |   |
|   |   |   |   |   |   |

| B11 | G12 | B13 | G14 | B15 |
|---|---|---|---|---|
| 204 | 52 | 202 | 54 | 197 |
| G21 | R22 | G23 | R24 | G25 |
| 46 | 100 | 50 | 102 | 53 |
| B31 | G32 | B33 | G34 | B35 |
| 206 | 50 | 200 | 53 | 195 |
| G41 | R42 | G43 | R44 | G45 |
| 47 | 97 | 52 | 98 | 47 |
| B51 | G52 | B53 | G54 | B55 |
| 201 | 48 | 202 | 49 | 196 |

FIG. 35

| PREDICTION FORMULA NUMBER | PREDICTED VALUE y | PREDICTION ERROR (y-x) |
|---|---|---|
| (1) | 50 | -150 |
| (2) | 50 | -150 |
| (3) | 100 | -100 |
| (4) | 0 | -200 |
| (5) | 25 | -175 |
| (6) | 25 | -175 |
| (7) | 50 | -150 |

FIG. 36

| PREDICTION FORMULA NUMBER | PREDICTED VALUE y | PREDICTION ERROR (y-x) |
|---|---|---|
| (1) | 50 | -150 |
| (2) | 50 | -150 |
| (3) | 100 | -100 |
| (4) | 0 | -200 |
| (5) | 25 | -175 |
| (6) | 25 | -175 |
| (7) | 50 | -150 |
| (8) | 206 | 6 |
| (9) | 202 | 2 |
| (10) | 204 | 4 |
| (11) | 205 | 5 |
| (12) | 205 | 5 |
| (13) | 203 | 3 |
| (14) | 204 | 4 |

IMAGE DATA COMPRESSION METHOD IMAGE DATA COMPRESSION APPARATUS AND RECORDING MEDIUM AND DATA SIGNAL FOR PROVIDING IMAGE DATA COMPRESSION PROGRAM

INCORPORATION BY REFERENCE

The disclosures of the following priority applications are herein incorporated by reference:

Japanese Patent Application No. 11-328379 filed Nov. 18, 1999
Japanese Patent Application No. 11-328380 filed Nov. 18, 1999
Japanese Patent Application No. 11-328381 filed Nov. 18, 1999

BACKGROUND OF THE INVENTION

1. Field of the Invention

The present invention relates to an image data compression method, an image data compression apparatus and a recording medium and data signal for providing image data compression program.

2. Description of the Related Art

With further technological development achieved in the area of image input devices (e.g., CCDs employed in digital cameras), image data are taken in at increasingly high definition. The user performs image processing by using a personal computer or the like on raw data (original data) that have been obtained with such a high degree of resolution and gradation, and then desired image data are achieved through an output device (e.g., a CRT, a printer).

Image data that are represented as signals (signal charges) from a CCD are converted by an A/D converter to digital signals having, for instance, 10~12 bits per pixel. When the image data are converted to 12-bit digital signals, each corresponding to 12 bits, the maximum number of gradation levels is 4096. The image data taken in at high definition in units of 10~12 bits in this manner are converted to image data of approximately 8 bits per pixel and the image is reproduced at an output device.

The number of bits of image data corresponding to one pixel at the time of the data intake is 10~12, as described above, since the photographing environment can change significantly during the data intake from an extremely bright field to a extremely dark field, and since it is necessary to obtain image data evenly over this wide photographing environment range. However, since the lightness difference that is actually represented within a given frame (image plane) at the time of reproduction is smaller than that in the photographing environment, the contrast of the image in the frame can be expressed by 8-bit image data in a satisfactory manner.

The image data taken in by a CCD are stored in a storage medium and the image data are read out as necessary from the storage medium. In the prior art, image data achieved through conversion to 8-bit image data are stored in the storage medium. Since the data volume corresponding to a single frame (a single image plane) becomes huge when 8-bit image data are stored directly, the image data undergo compression processing before they are stored in the storage medium.

Types of image data compression processing that are normally implemented include DPCM processing, Huffman coding and arithmetic coding that are performed on raw data, JPEG lossless coding achieved by utilizing the forgoing methods in appropriate combination and universal coding, a typical example of which is the Ziv-Lempel method.

However, if image data having 8 bits per pixel are stored as original data at the storage medium, the image data that are obtained after the user performs desired processing/modification on the 8-bit image data will have 8 bits or fewer per pixel to result in a relatively poor image quality.

As a solution, the image quality of image data having undergone processing/modification can be improved by directly storing in the storage medium the raw data of an image achieving a high degree of gradation levels (10~12 bits) obtained by the CCD, reading out the raw data and performing the processing/modification on them.

While it is also necessary to perform the compression processing (in particular, reversible compression processing) when storing raw data achieving such a high degree of gradation levels in the storage medium, there is a problem in that a high compression rate cannot be achieved by performing compression processing on 10~12-bit image data similar to the compression processing performed on 8-bit image data.

SUMMARY OF THE INVENTION

An object of the present invention is to provide an image data compression method and an image data compression apparatus that enable compression of image data that have been obtained at high gradation levels while achieving a high compression rate, and also to provide a recording medium and a data signal providing an image data compression program executing such functions.

In order to attain the above object, an image data compression method according to the present invention for compressing image data including pixel data having a specific number of bits per pixel obtained at an image input device, comprises: a step in which the pixel data having the specific number of bits are divided into higher-order bit data having a first number of bits and lower-order bit data having a second number of bits; and a step in which at least the higher-order bit data resulting from division are compressed through a specific compression method.

This image data compression method preferably further comprises: a step in which the higher-order bit data that have been compressed are stored in a first storage area; a step in which the lower-order bit data are stored in a second storage area through a specific method; and a step in which first positional data provided for management of a storage position of the higher-order bit data and second positional data provided for management of a storage position of the lower-order bit data are stored in a third storage area.

Also the image data compression method preferably further comprises: a step in which the higher-order bit data that have been compressed are stored in a first storage area; and a step in which the lower-order bit data are stored in a second storage area through a specific method. In this case, data corresponding to a third number of bits starting from a highest order bit that is set in the pixel data are valid data; and bits in the lower-order bit data that are not included in the valid data are not stored in the second storage area.

Also in the image data compression method, preferably, the image input device is provided with color filters having specific colors in correspondence to individual pixels. In this case, the compression method employed to compress the higher-order bit data preferably comprises: a step in which the individual pixels are each sequentially assigned as a target pixel; a step in which a predicted value for the target pixel is calculated based upon pixel data corresponding to one or more nearby pixels including, at least, a pixel having a color filter with the same color component as the target pixel that has already been obtained; a step in which an error in the predicted value that has been calculated relative to pixel data corresponding to the target pixel obtained by the image input device is ascertained; and a step in which the error that has been calculated is coded through a specific method.

Another image data compression method for compressing image data obtained by an image input device provided with color filters in specific colors corresponding to individual pixels, comprises: a step in which the individual pixels are each sequentially assigned as a target pixel; a step in which a predicted value for the target pixel is calculated based upon pixel data corresponding to one or more nearby pixels including, at least, a pixel having a color filter with the same color component as the target pixel; a step in which an error in the predicted value that has been calculated relative to pixel data corresponding to the target pixel obtained by the image input device is ascertained; and a step in which the error that has been calculated is coded through a specific method.

In this image data compression method, preferably, a plurality of prediction formulae are provided to calculate the predicted value for the target pixel and are selectively used in conformance to a specific positional relationship between the target pixel and a nearby pixel; and a prediction formula that has achieved a closest predicted value to pixel data actually acquired in a nearby pixel, which is provided with color filter having the same color component as the target pixel and has been processed before the target pixel, is used to calculate the predicted value for the target pixel.

The above image data compression method preferably further comprises: a step in which the error that has been ascertained is quantized using a quantization table, that is implemented after the step in which the error is ascertained. In this case, the error that has been quantized is coded through a specific method in the step in which the error is coded.

Another image data compression method for compressing image data, which is obtained by an image input device, having a specific number of bits per pixel, comprises: a step in which data corresponding to each pixel having the specific number of bits are divided into higher-order bit data having a specific number of higher-order bits and lower-order bit data having a specific number of lower-order bits; a step in which the higher-order bit data undergo variable-length coding; a step in which the lower-order bit data are packed through a bit-shift operation performed on a plurality of pixels; a step in which management data to be used to individually manage the higher-order bit data having undergone the variable-length coding and the lower-order bit data that have been packed are generated; and a step in which the higher-order bit data having undergone the variable-length coding, the lower-order bit data that have been packed and the management data that have been generated are recorded in a recording medium.

In this image data compression method, preferably, the image input device has pixels arrayed in a matrix; the higher-order bit data having undergone the variable-length coding are grouped together in blocks each corresponding to units of pixels included in a row; the lower-order bit data that have been packed are grouped together in blocks each corresponding to units of pixels included in a row; and positional information indicating individual recording positions of the higher-order bit data that have been grouped together in blocks and the lower-order bit data that have been grouped together in blocks is generated as the management data.

Also, preferably, the variable-length coding is achieved through a combination of Huffman coding and DPCM coding.

Also, preferably, the specific number of bits in the data representing each pixel is a value corresponding to a degree of accuracy of detection achieved at the image input device; and the specific number of higher-order bits, at which correlation with nearby pixels tends to manifest greatly, is determined through rules of experience.

An image data management method for managing image data, which is obtained by an image input device provided with pixels arrayed in a matrix, having a specific number of bits per pixel, comprises: a step in which data corresponding to each pixel having the specific number of bits are divided into higher-order bit data having a specific number of higher-order bits and lower-order bit data having a specific number of lower-order bits; a step in which the higher-order bit data are grouped together in blocks in units of pixels included in a row; step in which lower-order bit data are grouped together in blocks in units of pixels included in a row; a step in which positional information indicating individual recording positions of the higher-order bit data that have been grouped together in blocks and the lower-order bit data that have been grouped together in blocks is generated; and a step in which the higher-order bit data that have been grouped together in blocks, the lower-order bit data that have been grouped together in blocks and the positional information that has been generated are recorded in the recording medium.

Another image data compression method for compressing image data, which is obtained by an image input device, having a specific number of bits per pixel, comprising: a step in which raw data corresponding to each pixel having the specific number of bits are divided into higher-order bit data having a specific number of higher-order bits and lower-order bit data having a specific number of lower-order bits; a step in which the higher-order bit data undergo reversible coding; a step in which a number of valid bits in the lower-order bit data is determined based upon the raw data corresponding to each pixel having the specific number of bits per pixel; a step in which higher-order data corresponding to specific bits in the lower-order bit data are extracted in conformance to a width representing the number of valid bits; a step in which management data to be used to individually manage the higher-order bit data having undergone the reversible coding and the lower-order bit data corresponding to the width representing the number of valid bits that have been extracted are generated; and a step in which the higher-order bit data having undergone the reversible coding, the lower-order bit data corresponding to the width representing the number of valid bits that have been extracted and the management data that have been generated are recorded in the recording medium.

In this image data compression method, preferably, the number of valid bits is determined in conformance to a valid bit width in the raw data corresponding to each pixel.

Also, preferably, the valid bit width of each pixel is a value corresponding to a degree of accuracy of detection achieved at the image input device; and the specific number of the higher-order bits at which correlation with nearby pixels tends to manifest greatly, is determined through rules of experience.

Another image data compression method for compressing image data obtained in units of individual pixels by a single-board CCD provided with color filters arrayed in a specific pattern, comprises: a step in which the individual pixels are each sequentially assigned as a target pixel; a step in which a predicted value for the target pixel is calculated based upon a pixel value that has already been obtained for a nearby pixel having a color filter with the same color component as the target pixel; a step in which an error in the predicted value that has been calculated and a pixel value corresponding to the target pixel obtained by the single-board CCD is ascertained; and a step in which the error that has been calculated is coded.

Another image data compression method for compressing image data obtained in units of individual pixels by a single-board CCD provided with color filters arrayed in a specific pattern, comprises: a step in which the individual pixels are each sequentially assigned as a target pixel; a step in which a predicted value for the target pixel is calculated based upon a pixel value of a nearby pixel that has already been obtained; a step in which an error in the predicted value that has been calculated with respect to pixel data corresponding to the target pixel obtained by the single-board CCD is ascertained; a step in which the error thus ascertained is coded; a step in which a predicted value is calculated by using a pixel value of an adjacent pixel provided with a color filter having a color component different from the color component at the target pixel as the pixel value of the nearby pixel; a step in which a predicted value is calculated by using a pixel value of a same-color pixel provided with a color filter having the same color component as the target pixel as the pixel value of the nearby pixel; a step in which a decision is made as to which predicted value a pixel value of the target pixel obtained by the single-board CCD is closest to; and a step in which a decision is made as to whether the pixel value of an adjacent pixel or a same-color pixel is to be used to calculate a predicted value of a next target pixel based upon result of the decision in the previous step.

An image data compression apparatus according to the present invention carries out the image data compression method or the image data management method described above.

A recording medium according to the present invention records therein an image data compression program that carries out the image data compression method or the image data management method described above.

A data signal according to the present invention embodied in a carrier wave comprises an image data compression program that carries out the image data compression method or the image data management method described above.

BRIEF DESCRIPTION OF THE DRAWINGS

FIG. 2 illustrates the layout of color filters provided at the light-receiving surface of the image input device 2;

FIG. 10 illustrates the layout of color filters provided at the light-receiving surface of the image input device 2;

FIG. 19 is a table showing the relationships the 12-bit raw data have with the raw data valid bit width, the bit position of the signal to be reproduced (valid bit position) and the number of valid bits in the lower-order bit data;

FIG. 20 is a table showing the individual relationships among the number of signal charges at CCD 1 with a saturation level of 100,000 ($1.0 \times 10^5$) electrons, the signal value from the CCD 1, the effective signal level and the noise component;

FIG. 21 is a table presenting examples in which signal values S1, S2 and S3 are used as threshold values;

FIG. 22 is a table presenting the results of hexadecimal processing performed to determine the number of valid bits in the lower-order bit data by using the higher-order bit data (8 bits) in 12-bit raw data;

FIG. 23 is a table presenting the relationships among the 12-bit raw data, the signal valid bit width and the valid bit position;

FIG. 25 illustrates the layout of color filters provided at the light-receiving surface of the image input device 2;

FIG. 35 is a table presenting the predicted values (y) calculated through prediction formulae (1)~(7);

FIG. 36 is a table presenting the provisional predicted values "y" calculated through prediction formulae (1)~(14) and the corresponding prediction errors.

DESCRIPTION OF THE PREFERRED EMBODIMENTS (First Embodiment)

Figure 1:
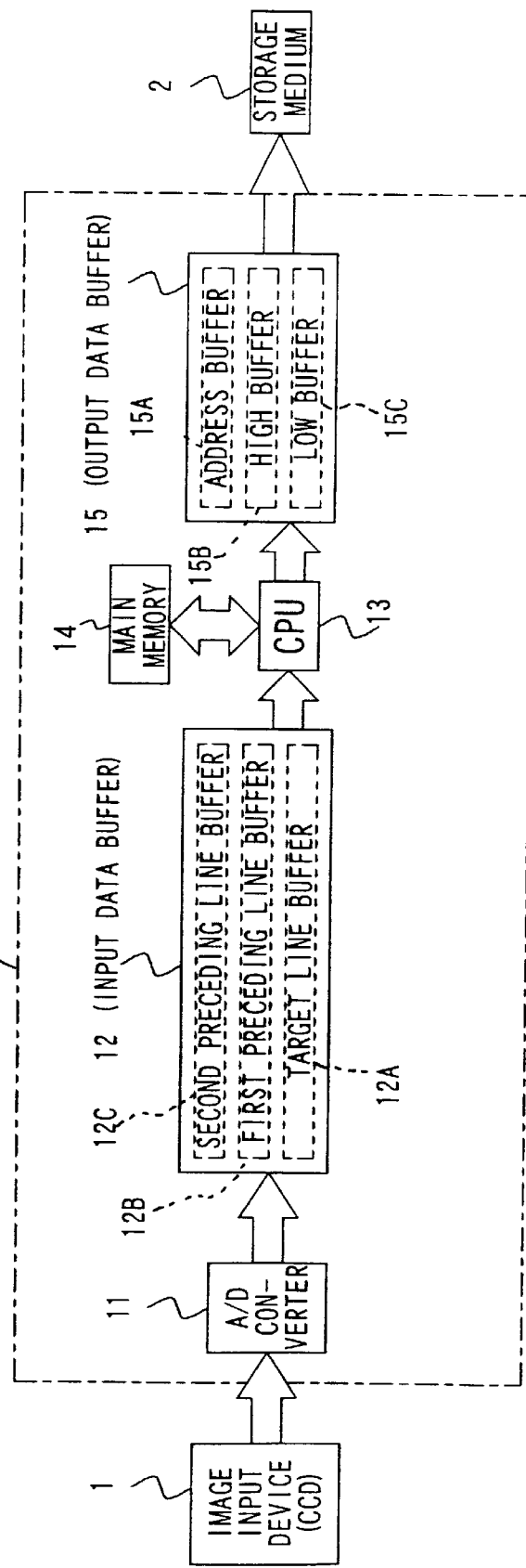
FIG. 1 a block diagram illustrating the structure of a coding processing apparatus in a first embodiment of the present invention.

The following is an explanation of the first embodiment of the present invention, given in reference to the attached drawings. FIG. 1 is a block diagram illustrating the structure of a coding processing apparatus 10 adopting the image data compression method and the image management method according to the present invention.

The coding processing apparatus 10 digitizes an image signal input from an image input device (CCD) 1 and then compresses the image data through JPEG lossless coding which combines DPCM coding and Huffman coding to store (record) them at a storage medium (recording medium) 2. In this structure, the coding processing apparatus 10 and the CCD 1 constitute an integrated unit (e.g., within a digital camera). In addition, as detailed later, the compressed image data stored at the storage medium 2 are decoded at a decoding processing apparatus 20 (see FIG. 6) such as a personal computer and then the image is reproduced after the data undergo processing/modification performed by the user.

The CCD 1 connected to the input side of the coding processing apparatus 10 is provided with pixels (cells) arrayed in an m-row×n-column matrix and, as illustrated in FIG. 2, color filters in three colors (R, G and B in the example presented in the figure) are provided at its light-receiving surface. The coding processing apparatus 10 comprises an A/D converter 11 that converts a signal (signal charge) from the CCD 1 to a digital signal (12 bits) with 4096 gradation levels (hereafter referred to as just "gradations"), an input data buffer 12 that temporarily stores the digitized signal (raw data), a CPU 13 that codes the signal (raw data) temporarily stored at the input data buffer 12, a main memory 14 that stores programs and the like executed by the CPU 13, an output data buffer 15 that temporarily stores the signal (compressed image data) coded by the CPU 13 and outputs the signal with specific timing to the storage medium 2 for storage, and the like.

The input data buffer 12, which stores pixel data (m×n sets) corresponding to the individual pixels obtained by the CCD 1 in units of single rows (lines), is constituted of a target line buffer 12A that stores in a batch data corresponding to one row (n sets of pixel data) to be coded, a first preceding line buffer (buffer for the line immediately preceding the target line) 12B that stores the data corresponding to the immediately preceding row shifted by one row from the row corresponding to the target line buffer 12A and a second preceding line buffer (buffer for the line preceding the target line by two rows) 12C that stores the data preceding the data of the target line by two rows shifted by one row from the first preceding line buffer 12B.

In addition, the output data buffer 15 is constituted of an address buffer 15A, a high buffer 15B and a low buffer 15C, with "higher-order compressed data block positional information" which is to be detailed later stored in the address buffer 15A, "higher-order compressed data" and "lower-order data block positional information" that are to be detailed later stored in the high buffer 15B and "lower-order data" stored in the low buffer 15C.

Figure 3:
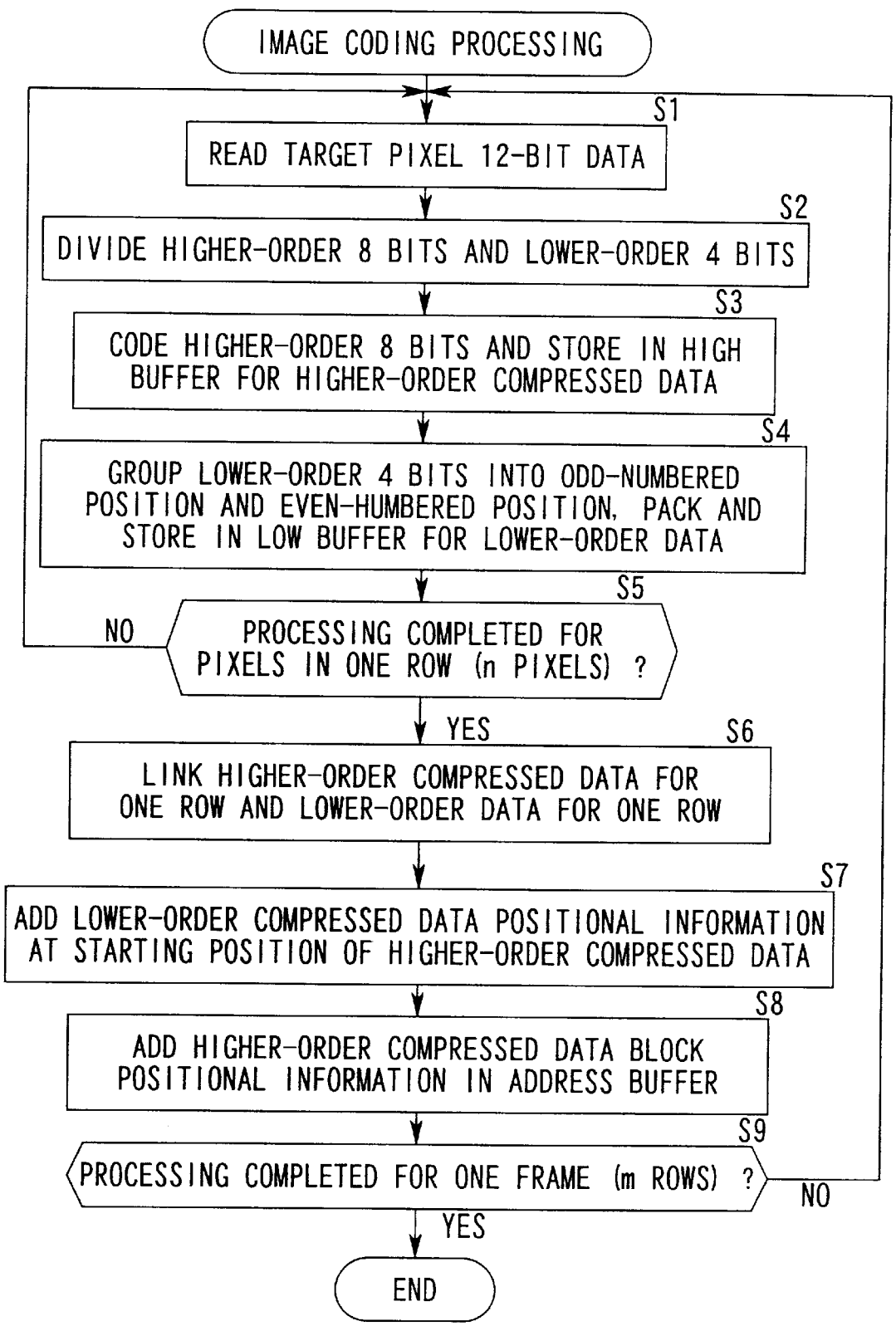
FIG. 3 is a flowchart of the image coding processing performed in the first embodiment.

Next, the coding processing performed on image data corresponding to one frame (image plane) which is executed by the CPU 13 of the coding processing apparatus 10 is explained in reference to the program flowchart in FIG. 3. When this coding processing starts, first in step S1, data corresponding to a target pixel are read from pixel data (12-bit raw data) n sets of which are stored in correspondence to a given row in the target line buffer 12A at the input data buffer 12.

In step S2, the pixel data (12 bits) of the target pixel thus read are divided into higher-order 8 bits (higher-order data) and lower-order 4 bits (lower-order data). The 12-bit pixel data (raw data) are divided into the higher-order 8 bits and the lower-order 4 bits in this manner since, while the higher-order 6~8 bits of data normally demonstrate a marked correlation with other image data in the vicinity and thus coding can be achieved at a high compression rate, the lower-order 4 bits achieve a lesser correlation with the lower-order 4 bits of other pixels in the vicinity.

In step S3, the higher-order 8-bit data are coded through JPEG lossless coding and the coded pixel data are stored in the high buffer 15B as "higher-order compressed data." The JPEG lossless coding in step S3 is performed by following the schematic flow of the procedure described below through a combination of DPCM coding and Huffman coding in the first embodiment.

First, a predicted value for the target pixel is calculated through a specific prediction formula by using the pixel value (the value of the higher-order bit data) of a pixel having a color filter in the same color (same-color pixel) in the vicinity or the pixel value (the value of higher-order bit data) of an adjacent pixel. The nearby pixel used in this process should be the pixel whose pixel value achieves the smallest prediction error relative to the target pixel (e.g., R44 in FIG. 2) among the same-color pixels (e.g., R42, preceding by 2 pixels) on the same line, the same-color pixels (R24 and R22) on the line preceding by 2 lines and adjacent pixels (G43, B33 and G34).

In more specific terms, the calculation of the predicted value using one of the pixel values (using a prediction formula that includes the pixel value as a variable) is achieved as follows. A plurality of provisional predicted values are obtained through a plurality of prediction formulae using individual pixel values corresponding to the higher-order bit data of same-color pixels in the vicinity of the pixel preceding the target pixel by 2 pixels and the higher-order bit data of pixels adjacent to the pixel preceding the target pixel by 2 pixels. The pixel value of the pixel preceding the target pixel by 2 pixels is compared against the plurality of provisional predicted values and the prediction formula that achieves the smallest prediction error (optimal prediction formula) is stored. Then, by using the optimal prediction formula stored in correspondence to the pixel preceding the target pixel by 2 pixels, the predicted value for the target pixel in the current loop is calculated.

The predicted value of the higher-order bit data thus calculated is compared against the pixel value of the higher-order bit data (8 bits) obtained through the division in step S2 to determine the prediction error Δ (DPCM coding). Then, Huffman coding is implemented with regard to this prediction error Δ in conformance to its occurrence distribution to code the higher-order bit data (variable-length coding).

During the process of calculating the predicted value, prediction formulae using the pixel values of the same-color pixels on the same row and the pixel values of the same-color pixels in the row preceding by two rows are used since, as illustrated in FIG. 2, in a three primary color CCD, neither R or B pixels have the same-color pixels having color filters of the same color component in an immediately preceding row (immediately preceding line) and they have the same-color pixels in the vicinity only in the row preceding by two rows.

After the higher-order bit data are coded in step S3, as described above, the lower-order 4 bits of the target pixel are synthesized (combined) with the lower-order bit data of an adjacent pixel (a pixel having a different color component in the example in FIG. 2) in the following step S4 and processing is performed on data having 8 bits overall.

In other words, a decision is made with respect to each of the pixels (n pixels) contained in a given row among the pixels arrayed in a matrix (see FIG. 2) as to whether or not it is at an odd-numbered position or an even-numbered position counting from the end position (B11 in the first row in FIG. 2), and if it is decided to be at an odd-numbered position (B11, B13, B15), its lower-order 4-bit data are shifted to the higher-order 4 bits in the low buffer 15C (8 bits) and stored in the low buffer 15C, whereas if it is at an even-numbered position (G12, G14), its lower-order bit data are directly stored in the lower-order 4 bits in the low buffer 15C. As a result, at the low buffer 15C, the lower-order bit data (4 bits) of a pixel at an odd-numbered position (B11, B13, B15) are stored at the higher-order 4 bits within one byte (8 bits) and the lower-order bit data (4 bits) of a pixels at an even-numbered position are stored at the lower-order 4 bits (bit-shift processing, packing processing).

In step S5, a decision is made as to whether or not the processing in steps S1~S4 described above has been completed for the entire row, i.e., whether or not the processing has been performed for all the n pixels contained in the row that is the object of the current processing. At the point in time at which the processing for the entire row has been completed (decision result; "yes"), the operation proceeds to the following step S6. In step S6, the higher-order compressed data obtained for the entire row (n pixels) are linked together to constitute a higher-order compressed data block, and likewise, the lower-order data are linked together to constitute a lower-order data block (blocking).

In step S7, the positional information corresponding to the lower-order data block in the same row is added at the starting position of the higher-order compressed data block. In step S8, positional information that indicates the starting positions of the higher-order compressed data blocks in the individual rows is added in the address buffer 15A. The positional information corresponding to the higher-order compressed data blocks stored in the address buffer 15A as described above, the higher-order compressed data corresponding to one row affixed with the positional information on the lower-order data block and the lower-order data are stored in the storage medium 2 with specific timing.

When coding of the image data for one row that is the target of the current processing is completed, in step S9, a decision is made as to whether or not the processing in steps S1~S8 described above has been performed for all of the m rows constituting one frame (one image plane). If the processing for the frame (processing of the m rows) has not been completed, the result of the decision made in step S9 is "no," and the processing in steps S1~S8 is then executed repeatedly. If, on the other hand, the result of the decision made in step S9 is "yes," i.e., when the processing of all the rows (m rows) corresponding to the one frame has been completed, the program ends.

Figure 4:
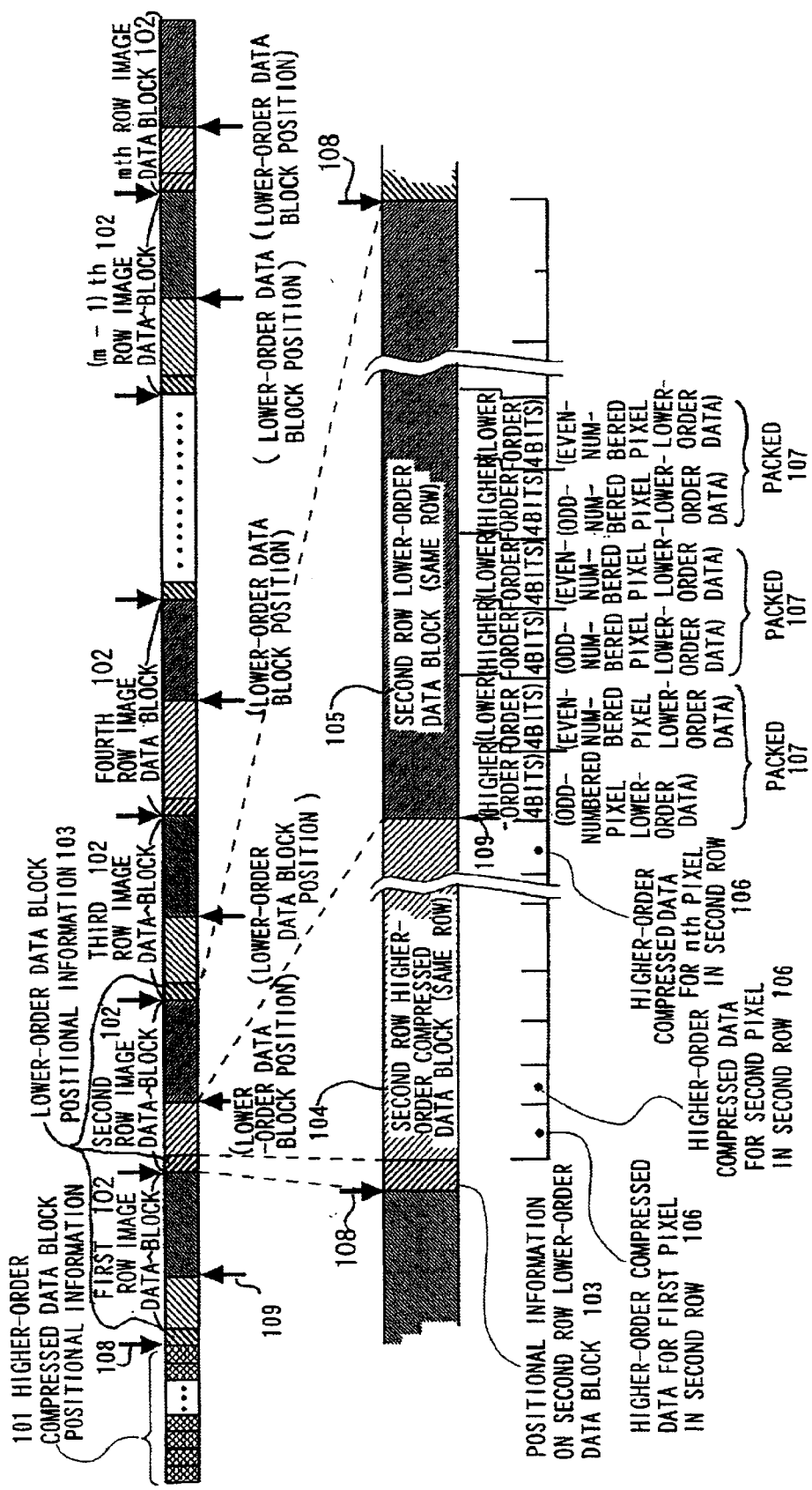
FIG. 4 presents a first example of the format of the compressed image data obtained through the first embodiment.

FIG. 4 shows the data format of the image data (for one frame) having undergone the coding process that are stored in the storage medium 2. As illustrated in the figure, in the image data corresponding to one frame, higher-order compressed data block positional information 101 for the frame (for m rows) is stored at the starting position and following this information, image data blocks 102 corresponding to the individual rows are stored from the first row to the mth row in a repetitive pattern.

In the image data block 102 corresponding to each row, lower-order data block positional information 103 of the corresponding row is added at the starting position and following this information, a higher-order compressed data block 104 of this row and a lower-order data block 105 of the row are sequentially stored.

In this format, the higher-order compressed data block positional information 101 provided at the starting position of the image data for the entire frame indicates starting positions (↓108 in FIG. 4) of the image data blocks 102 corresponding to the individual rows in the image data for the frame (for m rows). While the positions of the lower-order data block positional information 103 is indicated with ↓ 108 in FIG. 4, since the lower-order data block positional information 103 has a fixed length, the value achieved by adding a specific number of bytes to the contents of the higher-order compressed data block positional information 101 indicates the starting position of the higher-order compressed data block 104.

In addition, the lower-order data block positional information 103 provided at the starting position of the image data block 102 corresponding to each row indicates the starting position of the lower-order data block 105 (indicated by ↑ 109 in FIG. 4) within the image data block 102 in the corresponding row.

More specifically, as illustrated in a partial enlargement in FIG. 4 (the image data block 102 for the second row is enlarged in the figure), in the higher-order compressed data block 104 following the lower-order data block positional information 103 for the second row, the higher-order compressed data 106 of all the pixels (n pixels) contained in the second row are provided in a block. In addition, the lower-order data (8 bits) 107 packed in units of 2 pixels and expressed in one byte are provided together for the entire row (n pixels) to constitute the lower-order data block 105.

As explained above, the higher-order compressed data block positional information 101 is stored at the starting position in the image data for one frame, and this enables random read of the higher-order compressed data 106 corresponding to a specific row in the image data for the frame. In addition, since the position of the higher-order compressed data block 104 and the position of the lower-order data block positional information 103 are specified by the higher-order compressed data block positional information 101, the position of the image data block 102 in the corresponding row can be ascertained in correspondence to the higher-order compressed data block position. Thus, a random read of both the higher-order compressed data 106 and the lower-order data 107 in a specific row, too, is enabled.

The lower-order data block positional information 103 is added at the starting position of the image data block 102 corresponding to each row as described above, since the higher-order compressed data blocks 104 having undergone variable-length coding through JPEG lossless coding as explained earlier have varying data lengths in correspondence to the individual rows.

(Variation of data format)

Figure 5:
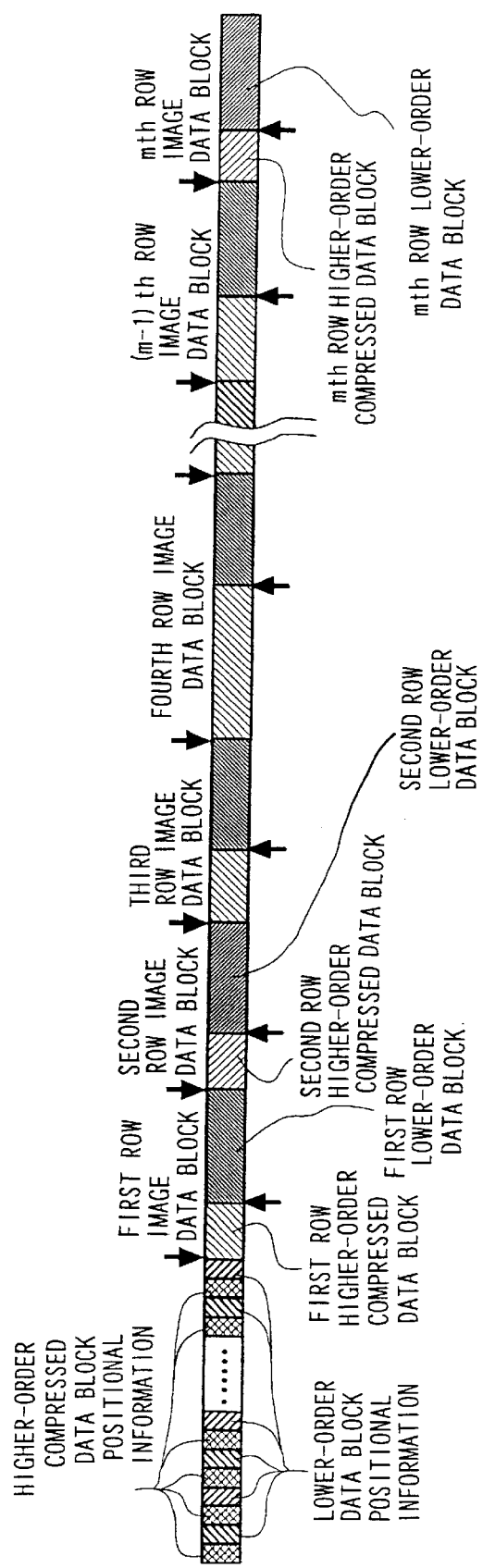
FIG. 5 presents a second example of the format of the compressed image data obtained through the first embodiment.

FIG. 5 presents another example of a data format that may be used when storing the higher-order compressed data blocks and the lower-order data blocks in the storage medium 2. The data format shown in this figure differs from the data format shown in FIG. 4 in that the image data for one frame are compressed and stored in such a manner that the higher-order compressed data block positional information and the lower-order data block positional information are stored alternately in correspondence to individual rows at the starting position of the image data. Thus, by adopting the second data format example, a random read of the higher-order compressed data corresponding to a specific row and a random read of both the higher-order compressed data and the lower-order data corresponding to a specific row are enabled, both based upon the higher-order compressed data block positional information. In addition, a random read of the lower-order data corresponding to a specific row is enabled based upon the lower-order positional data.

Figure 6:
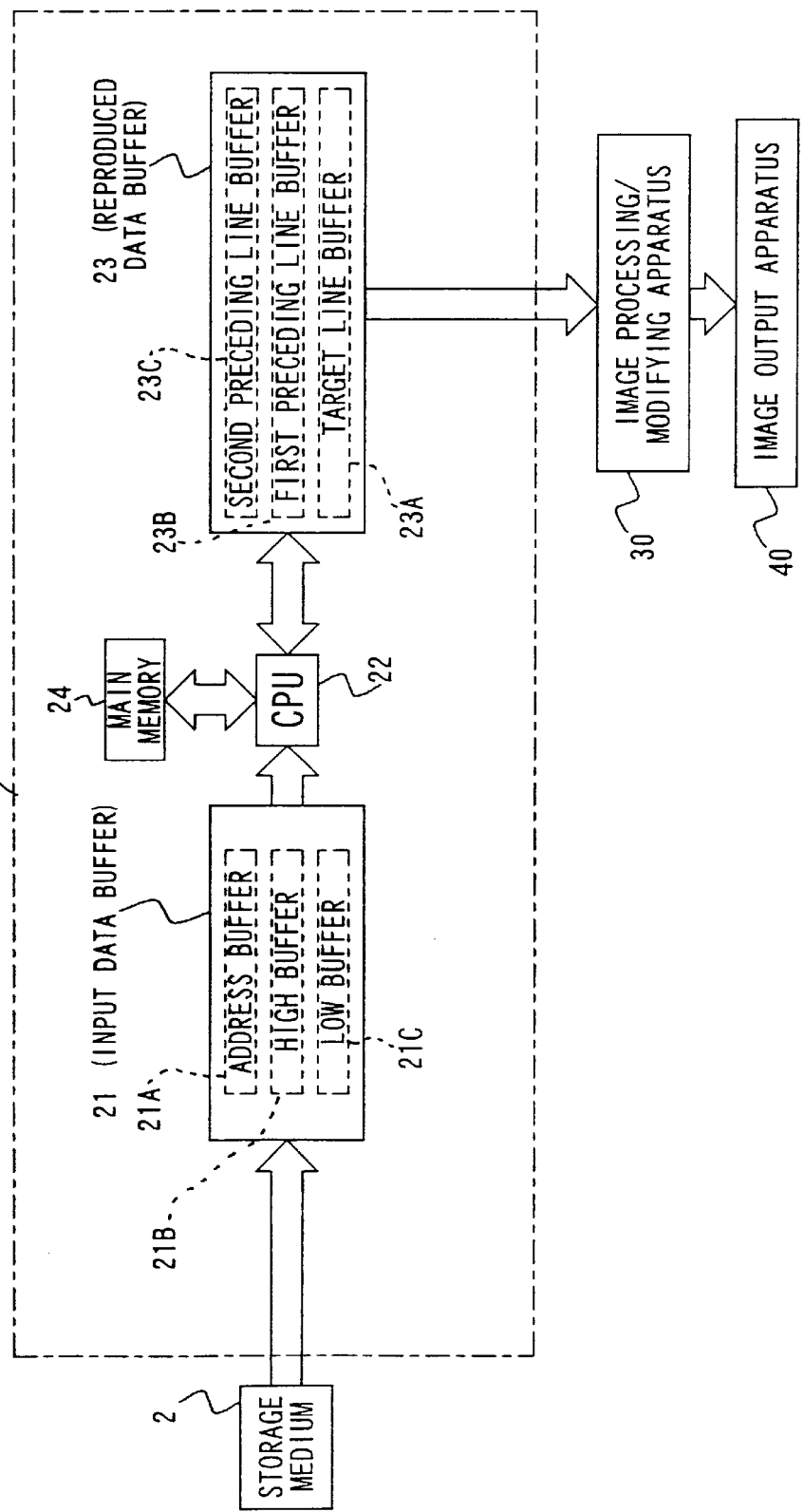
FIG. 6 is a block diagram illustrating the structure of the decoding processing apparatus employed in the first embodiment of the present invention.

Next, decoding of the compressed image data that have been coded through the procedure described above is explained. FIG. 6 is a block diagram illustrating the decoding processing apparatus 20 employed to decode the compressed image data stored in the storage medium 2. The decoding processing apparatus 20 decodes the compressed image data from the storage medium 2 and outputs the decoded image data (12-bit row data) to an image processing/modifying apparatus (e.g., a personal computer) 30. It comprises an input data buffer 21 that reads compressed image data from the storage medium 2, a CPU 22 that reproduces the compressed image data from the storage medium 2, a reproduced data buffer 23 that temporarily stores the reproduced image data (row data) and outputs them in units of individual rows and a main memory 24 that stores programs and the like executed by the CPU 22.

In addition, the image processing/modifying apparatus 30 is connected to the reproduced data buffer 23 in the decoding processing apparatus 20. The image processing/modifying apparatus 30 processes/modifies the reproduced image data (12-bit raw data) based upon processing/modification information (information input through a keyboard operation or the like by the user) input from the outside. The image data having undergone the processing/modification (e.g., 8-bit image data) are sent to an image output apparatus (e.g., a CRT, a printer) 40 to achieve a desired image. It is to be noted that when the coding processing apparatus 10 explained earlier is employed in a digital camera, the decoding processing apparatus 20 and the image processing/modifying apparatus 30 are mainly constituted of a personal computer.

The input data buffer 21 of the decoding processing apparatus 20 comprises an address buffer 21A, a high buffer 21B and a low buffer 21C. The "higher-order compressed data block positional information" from the storage medium 2 is temporarily stored in the address buffer 21A and the "higher-order compressed data" and the "lower-order data block positional information" from the storage medium 2 are temporarily stored in the high buffer 21B. The "lower-order data" from the storage medium 2 are temporarily stored in the low buffer 21C.

The reproduced data buffer 23 of the decoding processing apparatus 20 comprises a target line buffer 23A, a first preceding line buffer 23B and a second preceding line buffer 23C. In the target line buffer 23C, the reproduced image data (12-bit raw data) corresponding to the row that is the object of the current reproduction processing (reproduction target line) are temporarily stored. In the first preceding line buffer 23B, the image data (12-bit raw data) corresponding to the row immediately preceding the reproduction target line shifted from the row corresponding to the target line buffer 23A by one row are temporarily stored and in the second preceding line buffer 23C, the image data (12-bit raw data) in the row preceding the reproduction target line by two rows shifted from the row corresponding to the first preceding line buffer 23B are temporarily stored.

Figure 7:
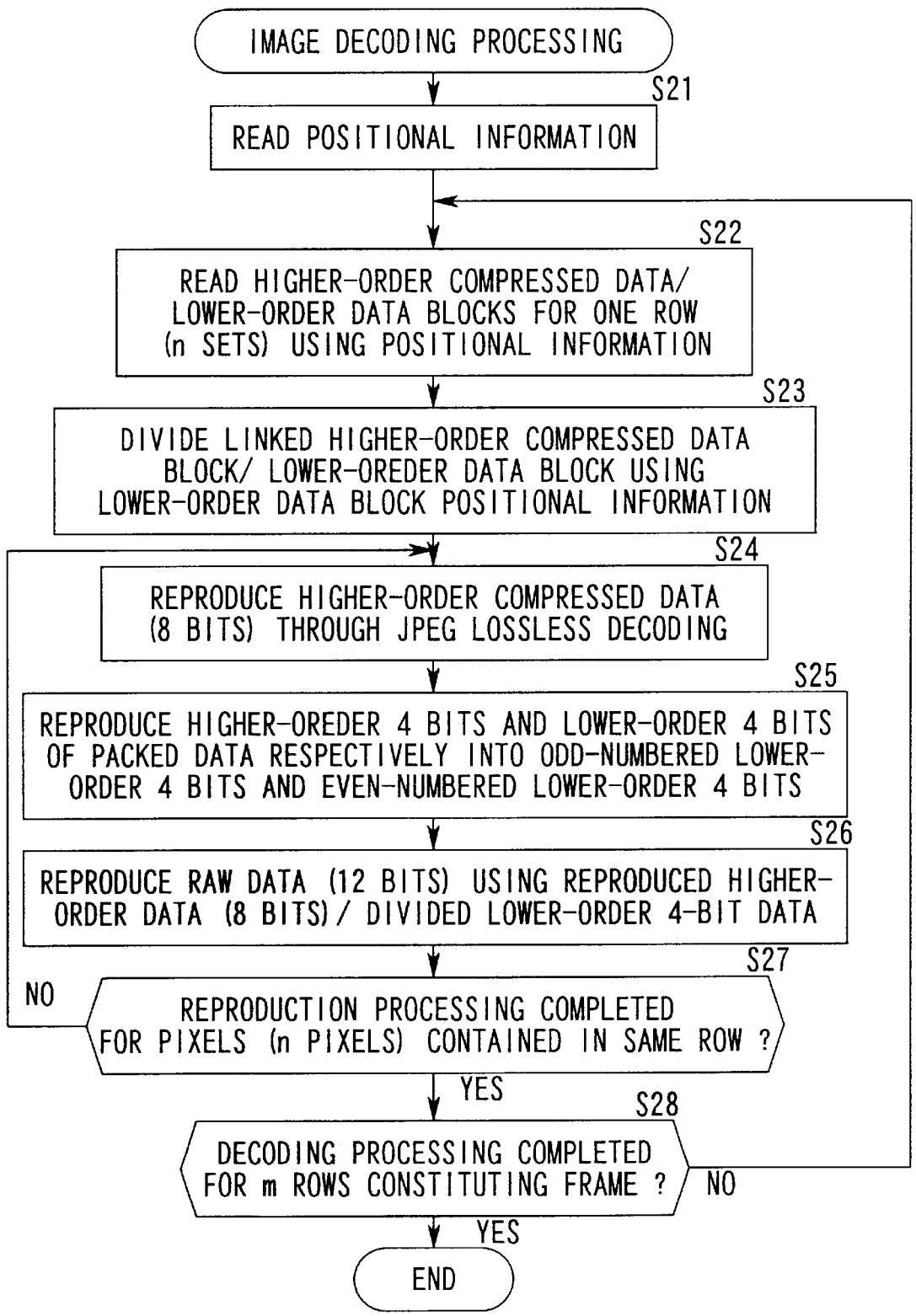
FIG. 7 is a flowchart of the image decoding processing performed in the first embodiment.

FIG. 7 is a program flowchart of the image decoding processing executed by the CPU 22 of the decoding processing apparatus 20 described above. When the program for the image decoding processing starts, first, in step S21, the positional information (the higher-order compressed data block positional information, the lower-order data block positional information) that has been taken in from the storage medium 2 to the input data buffer 21 is read into the CPU 22.

In step S22, based upon the higher-order compressed data block positional information that has been read (information indicating the positions marked with ↓ in FIG. 4), all the data within the image data block corresponding to the row (the entire row) to be processed in the current loop are read.

In step S23, based upon the lower-order data block positional information (information indicating the positions marked with ↑ in FIG. 4) read in step S21, the data read in step S22 are divided into a higher-order compressed data block and a lower-order data block.

In step S24, JPEG lossless decoding of the known art is performed on the higher-order compressed data stored in the higher-order compressed data block achieved through the division described above. This JPEG lossless decoding is implemented by reversing the coding procedure performed in step S3 in the image coding processing (see FIG. 3) explained earlier.

Namely, when decoding the higher-order bit data (8 bits) of a target pixel, first, the pixel value of the pixel preceding the target pixel by 2 pixels (same-color pixel) that has been decoded 2 loops previous is ascertained. Next, a plurality of provisional predicted values for this same-color pixel preceding the target pixel by 2 pixels are obtained through a plurality of prediction formulae using the pixel values of nearby same-color pixels and the pixel values of adjacent pixels. Then, the pixel value of the pixel preceding the target pixel by 2 pixels is compared against the individual provisional predicted values to ascertain their prediction errors Δ and the prediction formula (optimal prediction formula) that achieves the smallest prediction error is determined. Lastly, using the optimal prediction formula, a predicted value for the target pixel in the current loop is calculated, and decoding of the higher-order bit data (8 bits) of the target pixel is performed based upon the prediction error Δ stored in memory and this predicted value.

In step S25, the lower-order data (data corresponding to 2 pixels are expressed in 8 bits) packed in step S4 during the image coding processing (see FIG. 3) explained earlier are reproduced, with the higher-order 4 bits of the data reproduced as odd-numbered image data (lower-order bit data) and the lower-order 4 bits reproduced as even-numbered image data (lower-order bit data).

In step S26, 12-bit image data (raw data) constituted of the higher-order bit data (8 bits) reproduced in step S24 and the lower-order bit data (4 bits) reproduced in step S25 are obtained.

In step S27, a decision is made as to whether or not the processing in steps S24~S26 described above has been performed for the entire row, i.e., for the n pixels contained in the row, and when the decoding processing for the entire row has been completed, the operation proceeds to the next step S28.

In step S28, a decision is made as to whether or not the processing in steps S22~S27 described above has been performed for all the rows (m rows) constituting a single frame (a single image plane), and if it is decided that the processing for the entire frame has not been completed, the operation returns to step S22 to repeat the processing. If the processing for all the rows (m rows) corresponding to the frame has been completed (the result of the decision made in step S28 is "yes"), the program ends (end).

As has been explained, through the image data coding method and the image data decoding method in the first embodiment, in which image data (12-bit image data) obtained by the CCD 1 at high definition the higher-order bit data (8 bits) having marked correlation are compressed through JPEG lossless coding at a high compression rate, whereas bit-shift processing and packing processing are implemented on the lower-order bit data (4 bits) having a lesser degree of correlation to increase the processing speed, the speed of the coding processing for the entire 12-bit image data (raw data) can be increased while assuring a high compression rate.

It is to be noted that a coarse image can be reproduced at high speed by decoding only the higher-order compressed data in coded image data. In addition, since the higher-order compressed data block positional information is stored at the starting position in the compressed image data corresponding to the entire frame and the position of the higher-order compressed data blocks (positions indicated with ↓ in FIG. 4) can be promptly ascertained, reproduction of a coarse image can be achieved at high speed with a high degree of ease. Furthermore, the image can be partially reproduced at high speed by selecting a specific row among the m rows.

Figure 37:
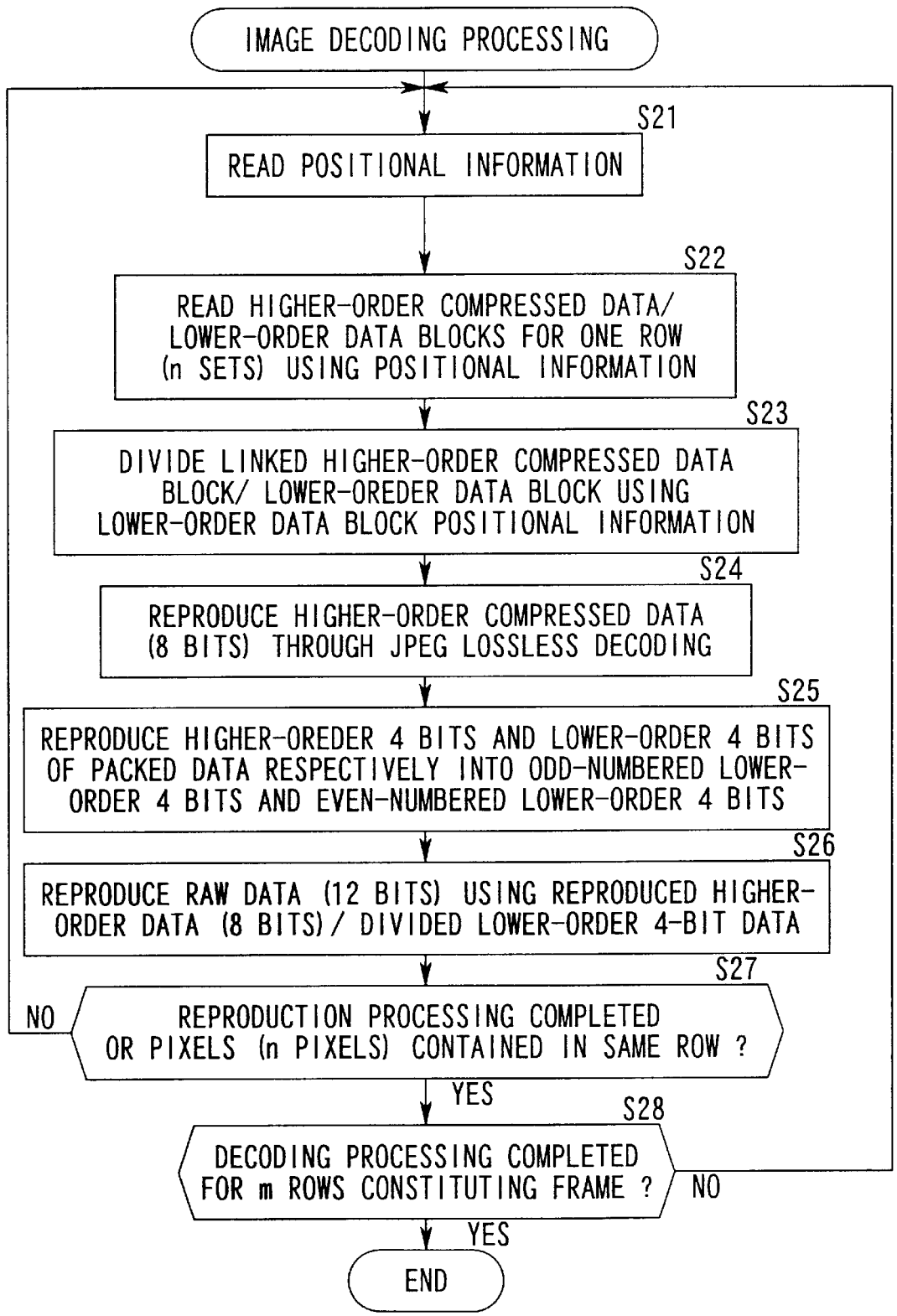
FIG. 37 presents a variation of the flowchart in FIG. 7.

In the first embodiment, the operation returns to step S24 to repeat the processing as long as the result of the decision made in step S27 is "no" and the operation returns to step S22 to repeat the processing as long as the result of the decision made in step S28 is "no," in order to perform the processing efficiently. However, the processing may be repeated, starting with the positional information read in step S21 when the result of the decision made in step S27 is "no" or when the result of the decision made in step S28 is "no" as illustrated in FIG. 37 instead.

(Second Embodiment)

Figure 8:
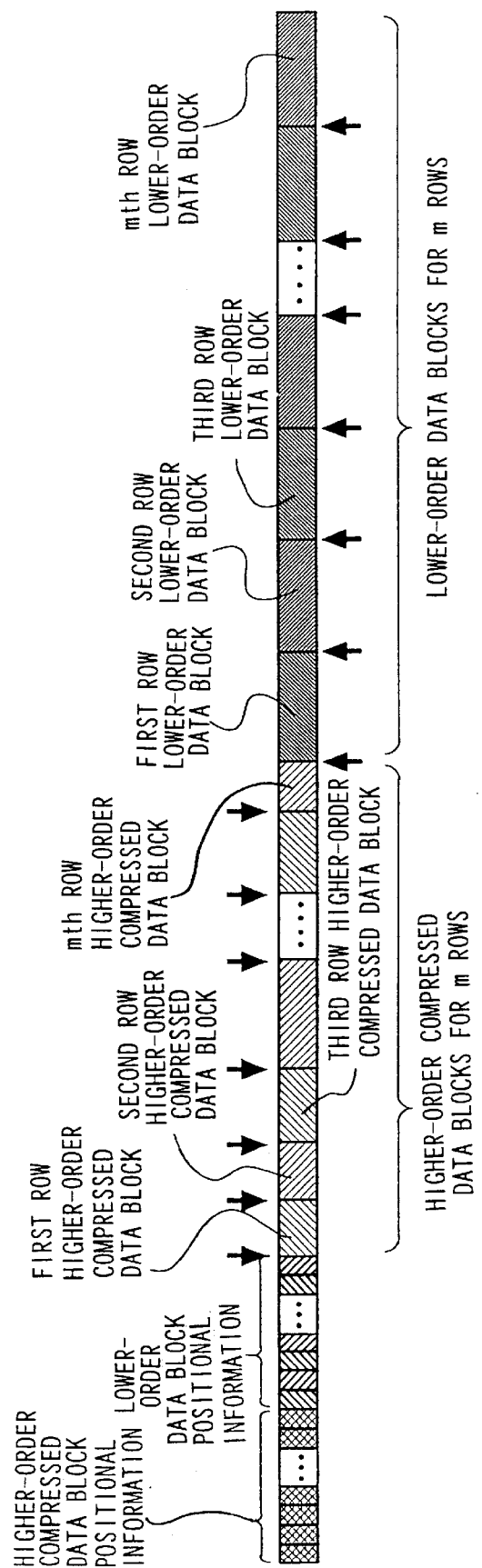
FIG. 8 presents the format of the compressed image data obtained in a second embodiment.
Figure 9:
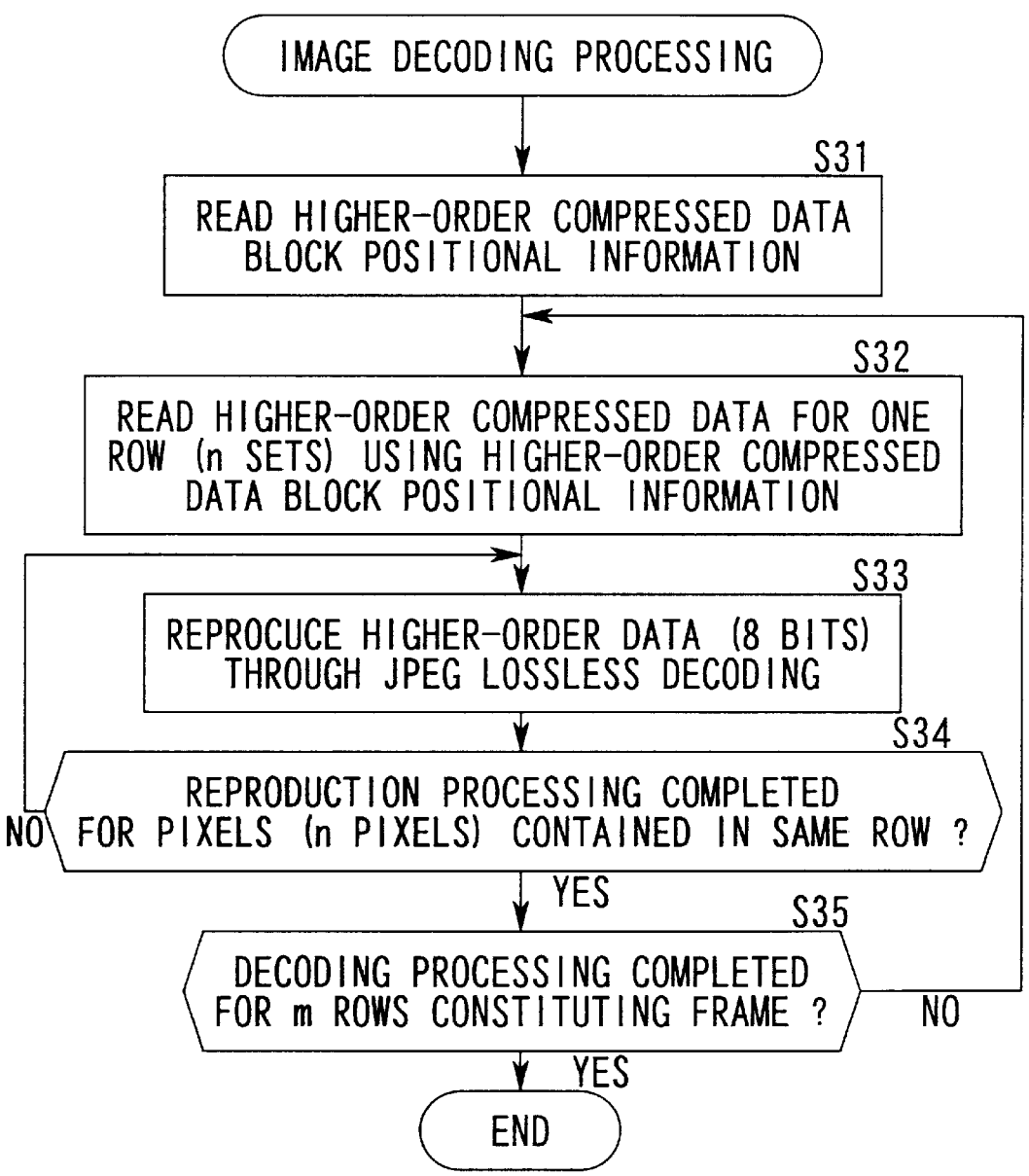
FIG. 9 is a flowchart of the image decoding processing performed in the second embodiment.

Next, the second embodiment of the present invention is explained in reference to FIGS. 8 and 9. In the second embodiment, when storing higher-order compressed data blocks and lower-order data blocks in the storage medium 2, the higher-order compressed data blocks corresponding to all the rows (m rows) in the image data of one frame are stored separately from the lower-order data blocks corresponding to all the rows (m rows).

FIG. 8 illustrates the data format adopted in this case. It is to be noted that since the structures of the coding processing apparatus and the decoding processing apparatus for achieving the second embodiment are identical to those of the coding processing apparatus 10 (see FIG. 1) and the decoding processing apparatus 20 (see FIG. 6) used in the first embodiment, their explanation is omitted.

In addition, coding of the higher-order bit data (JPEG lossless coding) is identical to the image coding processing in the first embodiment, except for the procedure through which data are stored in the storage medium 2, i.e., the second embodiment adopts a procedure different from that implemented in steps S6~S9 in the image coding processing illustrated in FIG. 3. In other words, in the second embodiment, the higher-order compressed data block positional information and the lower-order data block positional information are both stored at the starting position in the image data corresponding to a given frame, the higher-order data blocks corresponding to all of the m rows are stored in a batch and then the lower-order data blocks corresponding to all of the m rows are stored in a batch, as illustrated in FIG. 8.

By storing the higher-order data blocks corresponding to the m rows and the lower-order data blocks corresponding to the m rows in separate batches in the storage medium 2, only the higher-order compressed data need to be decoded based upon the higher-order compressed data block positional information stored at the starting position to increase the processing speed when decoding and outputting only the data corresponding to the higher-order 8 bits (when reproducing only a coarse 8-bit image, for instance, during image reproduction).

In addition, in the compressed image data format in the second embodiment, all the higher-order compressed data block positional information is stored in a batch separately from all the lower-order data block positional information is also stored in a batch. Also, the higher-order compressed data are stored all together and the lower-order data that are stored all together. As a result, based upon the individual types of positional information, all the higher-order compressed data or all the lower-order data contained in the image plane can be read out at high speed.

The following is an explanation of the procedure which is implemented when reproducing a coarse image (higher-order 8 bits) at high speed by decoding only the higher-order compressed data, given in reference to the program flowchart in FIG. 9. It is to be noted that this program is executed by the CPU 22 of the decoding processing apparatus 20 (see FIG. 6).

First, in step S31, the higher-order data block positional information is read. In step S32, the data (higher-order compressed data) within the higher-order compressed data block corresponding to one row are read by using the higher-order data block positional information.

In step S33, the higher-order compressed data thus read that correspond to one pixel are decoded through JPEG lossless decoding achieved by reversing the JPEG lossless coding procedure executed during the coding processing. The decoding performed in step S33 is performed through a procedure identical to that in step S24 in FIG. 7.

In step S34, a decision is made as to whether or not the processing in step S33 described above has been performed for one row, i.e., for the n pixels contained in the row, and when the processing for one row has been completed, the operation proceeds to the next step S35.

In step S35, a decision is made as to whether or not the processing in steps S32~S34 described above has been performed for all the rows (m rows) constituting a single frame (single image plane), and if it is decided that the processing for the entire frame has not been completed, the operation returns to step S32 to repeat the processing. If, on the other hand, it is decided in step S35 that the decoding processing for all the lines in the frame has been completed, the program ends (end).

Through the second embodiment described above, by reproducing only the higher-order 8 bits demonstrating the aforementioned marked correlation when reproducing the image data from the storage medium 2 where high definition raw data that are expressed with 12 bits per pixel are compressed and stored, a coarse image can be reproduced at high speed.

Figure 38:
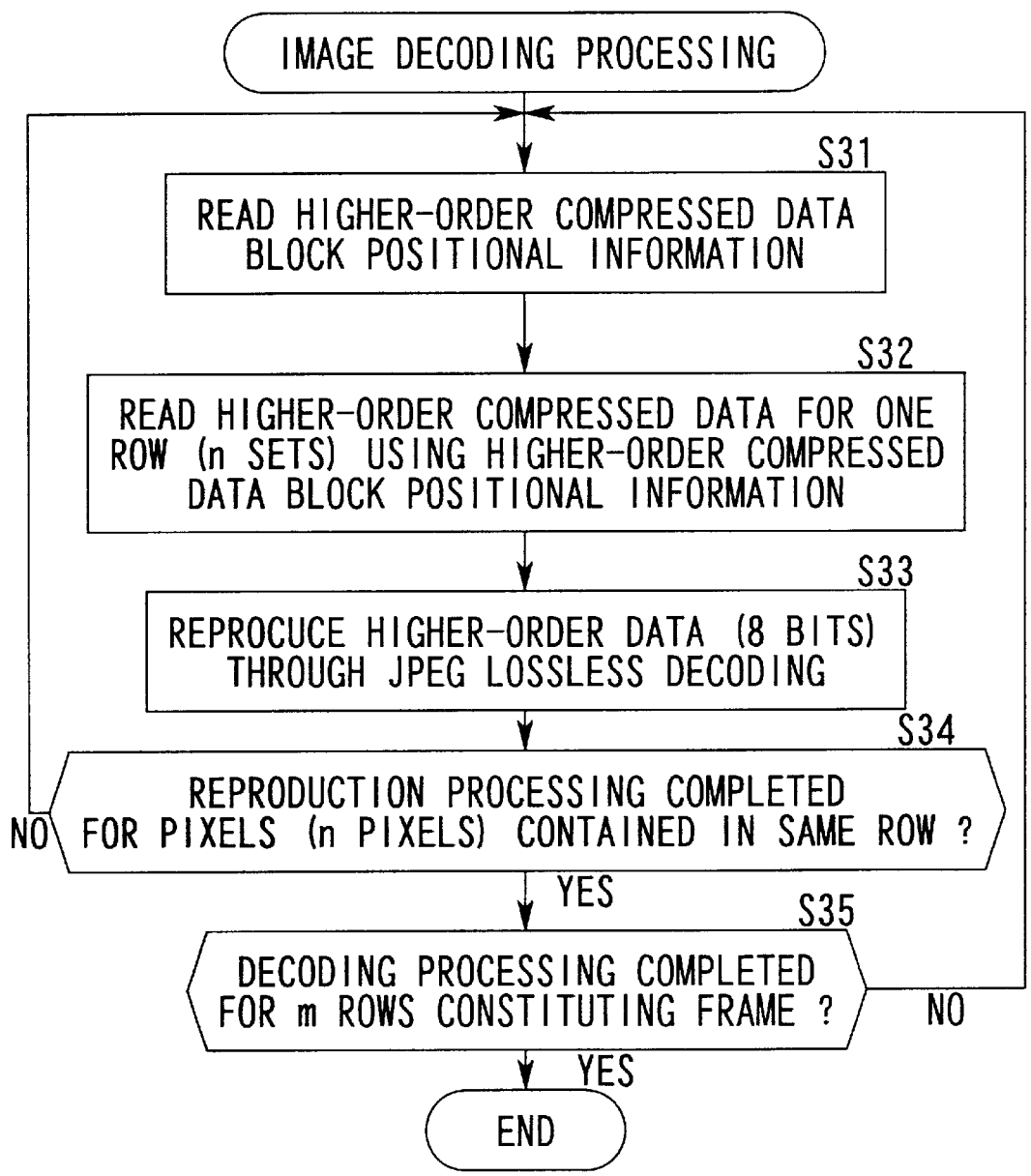
FIG. 38 presents a variation of the flowchart in FIG. 9.

In the second embodiment, the operation returns to step S33 to repeat the processing as long as the result of the decision made in step S34 are "no" and the operation returns to step S32 to repeat the processing as long as the result of the decision made in step S35 is "no," in order to perform the processing efficiently. However, the processing may be repeated, starting in step S31 when the result of the decision made in step S34 is "no" or when the result of the decision made in step S35 is "no" as illustrated in FIG. 38 instead.

It is to be noted that while the explanation is given above in reference to the first and second embodiments on an example in which the image raw data are 12-bit data, the present invention may be adopted in combination with image data having more than 12 bits or image data having fewer than 12 bits. In any case, the processing speed can be increased while assuring a high compression rate.

In addition, while the explanation is given in reference to the first and second embodiments on an example in which the 12-bit raw data are divided into higher-order 8 bits and lower-order 4 bits, the number of higher-order bits may be set at a value other than 8 as long as the higher-order bits demonstrate a marked correlation (it has been learned through experience that the number of higher-order bits should be within a range of 6~9 in the case of 12-bit image data). Also, the number of higher-order bits to correspond to higher-order bit data may be determined for each frame (each image plane).

Furthermore, while the explanation is given in reference to the first and second embodiment on an example in which the coding processing apparatus and the decoding processing apparatus are constituted as separate apparatuses (e.g., the coding processing apparatus is provided on the digital camera side and the decoding processing apparatus is provided on the personal computer side), these two apparatuses may be internally provided within a single system (e.g., the two apparatuses may be internally provided at a digital camera or the like).

Moreover, while the explanation is given in reference to the first and second embodiments on an example in which the processing for dividing image data into a higher-order side and a lower-order side and the coding processing on the higher-order bit data achieved through DPCM coding are both executed by the CPU 13 provided inside the coding processing apparatus 10, the present invention is not restricted to this example, and coding through DPCM coding may be executed by a dedicated LSI provided outside the CPU 13, and the CPU 13 within the coding processing apparatus 10 may be engaged only in dividing image data into the higher-order side and the lower-order side. In this case, the dedicated LSI provided outside the CPU 13 may execute coding such as Ziv-Lempel instead of DPCM coding. Likewise, an external dedicated integrated LSI may be provided at the decoding processing apparatus 20 to implement decoding so that the dedicated LSI can execute DPCM decoding(or another type of decoding such as Ziv-Lempel) on the higher-order bit data. In such a case, the CPU 22 at the decoding processing apparatus 20 can link the higher-order bit data and the lower-order bit data after the decoding processing.

Moreover, while the explanation is given in reference to the first and second embodiments on the assumption that a still picture is obtained by a digital camera or the like, the present invention may be adopted when taking dynamic pictures.

(Third Embodiment)

The following is an explanation of the third embodiment of the present invention given in reference to the attached drawings. Since the coding processing apparatus employed in the third embodiment is identical to the coding processing apparatus 10 in the first embodiment illustrated in FIG. 1, its explanation is omitted. In the following explanation, the coding processing apparatus is described in reference to FIG. 1.

In FIG. 1, the input data buffer 12, which stores in units of single rows (lines) pixel data (m×n sets) corresponding to the individual pixels obtained by the CCD 1, is constituted of a target line buffer 12A that stores in a batch data corresponding to one row (n sets of pixel data) to be coded, a first preceding line buffer 12B that stores the data corresponding to the immediately preceding row shifted by one row from the row corresponding to the target line buffer 12A and a second preceding line buffer 12C that stores the data preceding the data of the target line by two rows shifted by one row from the first preceding line buffer 12B.

In addition, the output data buffer 15 is constituted of an address buffer 15A, a high buffer 15B and a low buffer 15C, with "compressed data block positional information" which is to be detailed later stored in the address buffer 15A, "higher-order compressed data" and "lower-order data block positional information" that are to be detailed later stored in the high buffer 15B and "lower-order data" stored in the low buffer 15C. It is to be noted that by assigning 2 bytes or 4 bytes as positional information with respect to image data corresponding to a single row in advance, positional information on any row can be obtained even faster.

Figure 11:
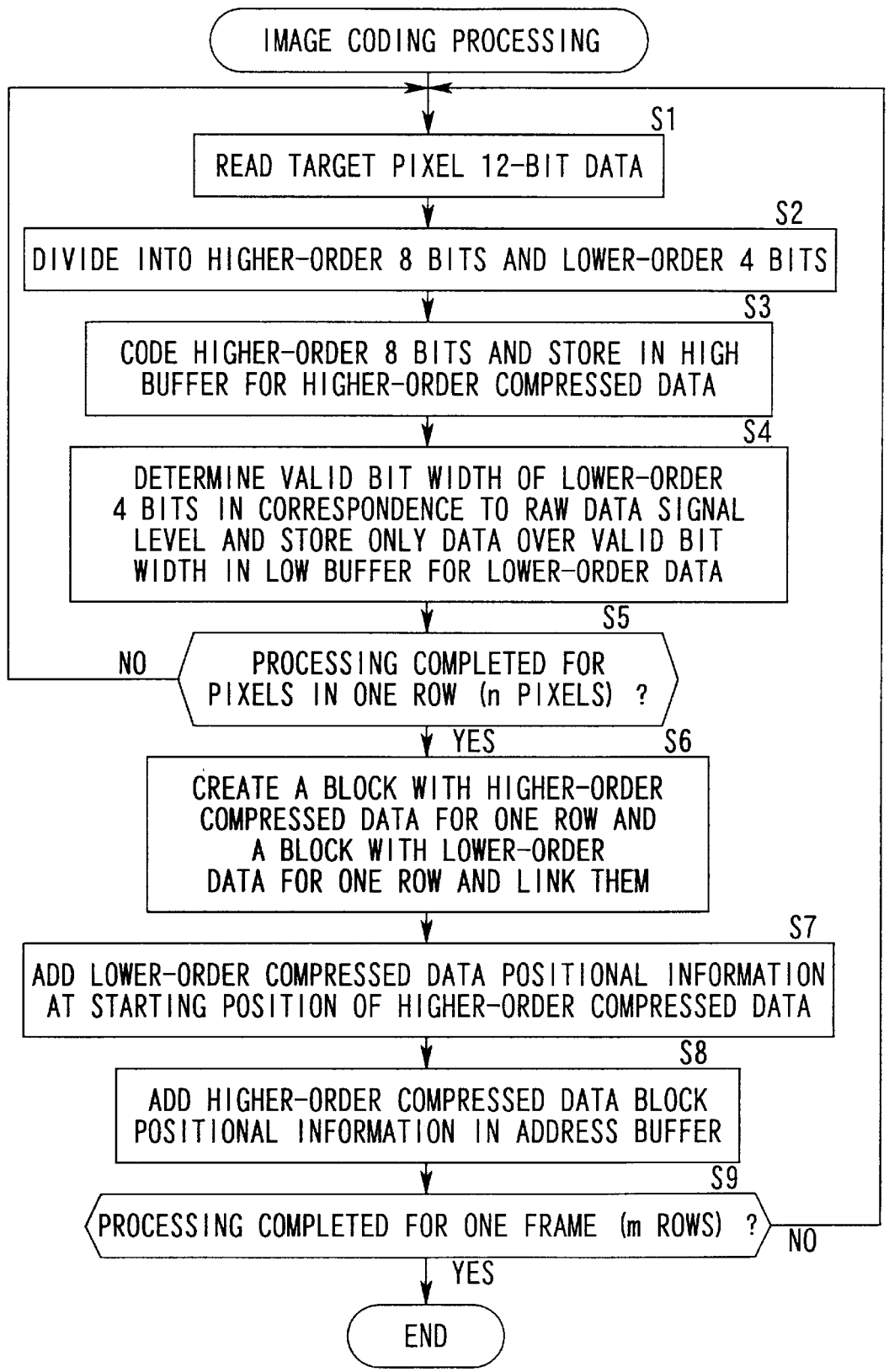
FIG. 11 is a flowchart of the image coding processing performed in a third embodiment.

Next, the coding processing performed on image data corresponding to one frame (image plane) which is executed by the CPU 13 on the coding processing apparatus 10 is explained in reference to the program flowchart in FIG. 11. When this coding processing starts, first in step S1, data corresponding to a target pixel are read from pixel data (12-bit raw data) n sets of which are stored in correspondence to a given row in the target line buffer 12A at the input data buffer 12.

In step S2, the pixel data (12 bits) of the target pixel are divided into higher-order 8 bits (higher-order data) and lower-order 4 bits (lower-order data). The 12-bit pixel data (raw data) are divided into the higher-order 8 bits and the lower-order 4 bits in this manner, since while the data corresponding to the higher-order 6 bits~higher-order 8 bits normally demonstrate marked correlation with other image data in the vicinity and thus coding can be achieved at a high compression rate, the degree of correlation that the lower-order 4 bits manifest with respect to the lower-order 4 bits of other pixels in the vicinity is greatly reduced.

In step S3, the higher-order 8-bit data are reversibly coded through JPEG lossless coding and the data achieved through the coding are stored in the high buffer 15B as "higher-order compressed data." The JPEG lossless coding in step S3 is performed by following the schematic flow of the procedure described below through the combination of DPCM coding and Huffman coding in the third embodiment.

First, a predicted value for the target pixel is calculated through a specific prediction formula by using a pixel value (the value of the higher-order bit data) of the pixel of a color filter in the same color (same-color pixel) in the vicinity or the pixel value (the value of the higher-order bit data) of an adjacent pixel. The nearby pixel used in this process should be the pixel whose pixel value achieves the smallest prediction error relative to the target pixel (e.g., R44 in FIG. 10) among the same-color pixels (e.g., R42, preceding by 2 pixels) on the same line, the same-color pixels (R24 and R22) on the line preceding by 2 lines and adjacent pixels (G43, B33 and G34).

The pixel value that is to be used in the actual calculation of the predicted value, i.e., the prediction formula having the selected pixel value as a variable to be used in the actual calculation (optimal prediction formula), is determined based upon the pixel value of the pixel preceding the target pixel by 2 pixels and the pixel values of the same-color pixels in its vicinity or the pixel values of adjacent pixels of the pixel preceding the target pixel by 2 pixels (the higher-order bit data value in each case). Namely, at the pixel preceding the target pixel by 2 pixels, a plurality of prediction formulae that use the pixel value of the pixel preceding the target pixel by 2 pixels and the pixel values of the same-color pixels in the vicinity or the pixel values of the adjacent pixels are prepared, a plurality of provisional predicted values are calculated through these prediction formulae, the pixel value of the pixel preceding the target pixel by 2 pixels is compared against the plurality of provisional predicted values and the prediction formula achieving the smallest prediction error is stored as an optimal prediction formula. Then, using the optimal prediction formula thus stored, a predicted value for the target pixel in the current loop is calculated.

The predicted value of the higher-order bit data thus calculated is compared against the pixel value of the higher-order bit data (8 bits) obtained through the division in step S2 to determine the prediction error $\Delta$ (DPCM coding). Then, Huffman coding is implemented with regard to this prediction error $\Delta$ in conformance to its occurrence distribution to code the higher-order bit data (reversible coding, variable-length coding).

During the process of calculating the predicted value, prediction formulae using the pixel values of the same-color pixels on the same row and the pixel values of the same-color pixels in the row preceding by two rows are used, since, as illustrated in FIG. 10, in a three primary color CCD, neither R or B pixels have the same-color pixels having color filters of the same color component in an immediately preceding row (immediately preceding line) and they have the same-color pixels in the vicinity only in the row preceding the target row by two rows.

After the coding of the higher-order bit data is performed as described above in step S3, the number of valid bits (1~4 bits) in the lower-order bit data (4 bits) is determined in correspondence to the size (number of digits) of the raw data in the following step S4. In this context, the number of valid bits refers to the number of bits in the lower-order bit data (4 bits) that should be stored (should be used in the reproduction of the image data) counted from the higher-order side (areas shaded with lines slanting down to the right in FIG. 12).

In the third embodiment, the number of valid bits in the lower-order bit data is ascertained on the premise that an valid bit width corresponding to 9 bits is, in principle, secured for the 12-bit raw data (FIGS. 12A~12D).

It is to be noted that the valid bit width mentioned above is determined in correspondence to the detection accuracy of the CCD in this embodiment. Namely, when the 12-bit raw data have 12 digits, one bit that cannot be expressed with the higher-order bit data (8 bits) is expressed with the lower-order bit data and, as a result, the number of valid bits is one (area shaded with lines slanting down to the right in FIG. 12A). When the raw data size is 11 digits, the 2 bits that cannot be expressed with the higher-order bit data (represented with the lower-order 7 bits among the 8 bits) are expressed by the lower-order bit data, and thus, the number of valid bits is 2 (area shaded with lines slanting down to the right in FIG. 12B). Likewise, when the raw data size is 10 digits, the number of valid bits is three since there are 3 bits that cannot be expressed by the higher-order bit data, whereas the number of valid bits is 4 when the raw data size is 9 digits and there are 4 bits that cannot be expressed with the higher-order bit data (area shaded with lines slanting down to the right in FIGS. 12C and 12D).

Figure 12A:
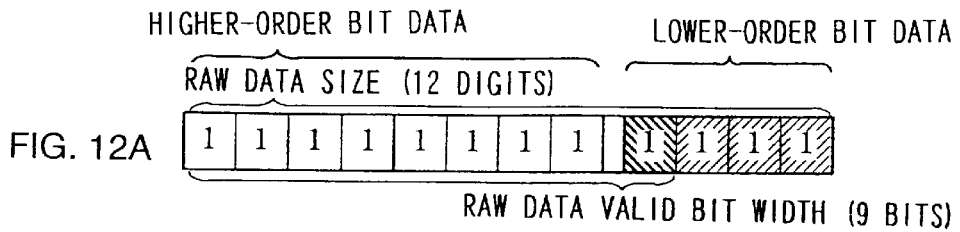
FIG. 12 illustrates individual relationships that the raw data have with the higher-order bit data, the lower-order bit data, the raw data size and the valid bit width in the third embodiment.
Figure 12B:
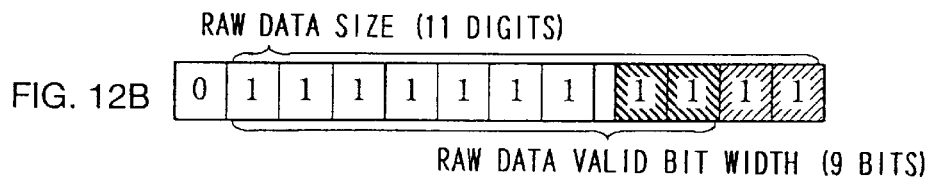
Figure 12C:
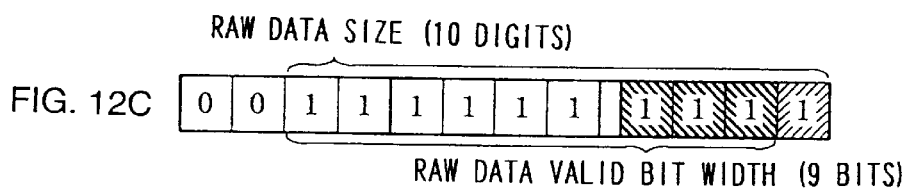
Figure 12D:
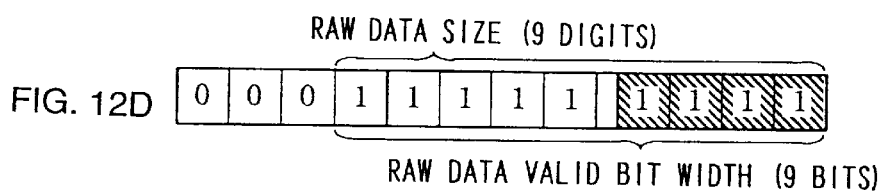
Figure 12E:
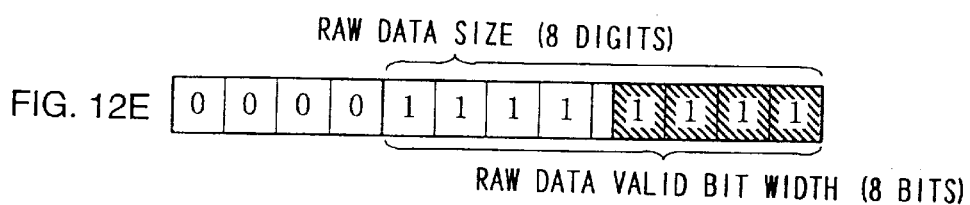
Figure 12F:
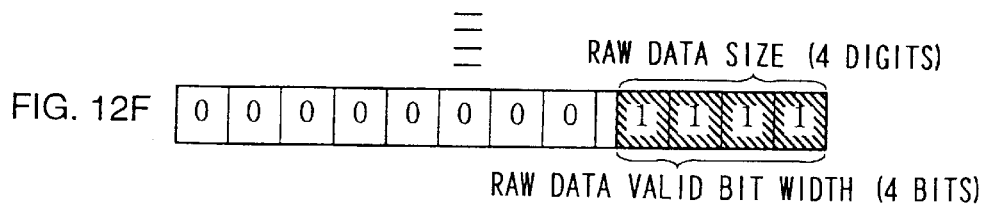
Figure 12G:
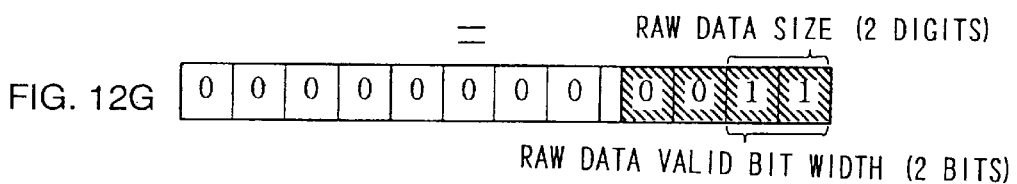

It is to be noted that while the valid bit width of the raw data with 4~8 bits is matched with the size (the number of digits) of the raw data since an valid bit width corresponding to 9 bits cannot be secured, the number of valid bits in the lower-order bit data is 4 in such a case (area shaded with lines slanting down to the right in FIGS. 12E and 12F). Furthermore, if the raw data size is smaller than 4 bits, the number of valid bits is fixed at 4 (area shaded with lines slanting down to the right in FIG. 12G).

Then, in correspondence to the valid bit width of the raw data, the number of bits at which the data should be stored in the 4 bit lower-order bit data (the number of valid bits) and invalid bits representing data that can be discarded (area shaded with lines slanting down to the left in FIG. 12) are determined. The data over the width corresponding to the number of valid bits in the lower-order bit data are stored in the low buffer 15C for storing lower-order data.

In step S5, a decision is made as to whether or not the processing in steps S1~S4 described above has been completed for the entire row, i.e., whether or not the processing has been performed for all the n pixels contained in the row that is the object of the current processing. At the point in time at which the processing for the entire row has been completed (decision result; "yes"), the operation proceeds to the following step S6. In step S6, the higher-order compressed data obtained for the row (n pixels) are grouped together in blocks to constitute a higher-order compressed data block, and likewise, the lower-order data are grouped together in blocks to constitute a lower-order data block and the blocks are then linked with each other.

In step S7, the positional information corresponding to the lower-order data block in the same row is added at the starting position of the higher-order compressed data block. In step S8, positional information that indicates the starting positions of the compressed data blocks in the individual rows is added at the starting position in the image data for one frame.

The compressed data block stored in the address buffer 15A in this manner, the higher-order compressed data corresponding to one row with the lower-order data block affixed and the lower-order data are stored in the storage medium 2 with specific timing.

When coding of the image data for one row that is the target of the current processing is completed, in step S9, a decision is made as to the processing in steps S1~S8 described above has been performed for all of the m rows constituting one frame (one image plane). If the processing for the frame (processing of the m rows) has not been completed, the result of the decision made in step S9 is "no," and the processing in steps S1~S8 is executed repeatedly.

If, on the other hand, the result of the decision made in step S9 is "yes," i.e., when the processing of all the rows (m rows) corresponding to the one frame has been completed, the program ends.

The valid bit width of the raw data is set, in principle, at 9 bits for image data obtained at 12 bits per pixel as explained above, since an output signal from the CCD 1 is expressed with 12 bits contains noise inherent to the CCD 1, noise occurring in the signal transmission path extending from the CCD 1 to the coding processing apparatus 10 and the like and it is known through experience that the noise component is generated to an equivalent of approximately 3 bits in a saturation level signal expressed with 12 bits.

FIG. 19 shows the relationships that the 12-bit raw data have with respect to the raw data valid bit width, the bit position of the signal to be reproduced (the valid bit position) and the number of valid bits in the lower-order bit data. In FIG. 19, "1" indicates the starting position of the valid component, "x" indicates an valid bit and "y" indicates an invalid bit. It is to be noted that the valid bit positions are expressed within a range of bit 1~bit 12 counting from the higher-order side.

For instance, when there are 12 digits in the raw data, the valid bit width is 9 bits, the valid bit positions are bit 1~bit 9. Consequently, only the highest order one bit (bit 9) in the lower-order bit data is an valid bit (x) and the remaining 3 lower-order bits (bit 10~bit 12) are invalid bits (y).

To summarize the explanation given above, the A/D converter 11 in the embodiment is a full-scale 12-bit A/D converter. As explained above, if a saturation-level signal of 12 bits is obtained by performing A/D conversion on a signal from the CCD 1 at the A/D converter 11 (see FIG. 12A), the 12-bit data are assumed to contain a noise component corresponding to approximately 3 bits. This noise component is assumed to become reduced as the signal level becomes lower. For instance, if the signal resulting from the A/D conversion has approximately 10 bits (see FIG. 12C), the noise component will account for approximately 1 bit. Thus, in the embodiment, the data corresponding to the 9 bits starting at the highest order bit at which 1 is set and including the subsequent lower-order bits in the 12-bit data output by the A/D converter 11 are regarded as valid data, which are referred to as the valid bit width in this context.

If data with "1" set at all the bits, as illustrated in FIG. 12A, are obtained through an A/D conversion, the data corresponding to bit 1~bit 9 (a total of 9 bits) are valid data and the data corresponding to the lowest order 3 bits represent noise, i.e., invalid data. If data with "1" set at bits 3~12 as shown in FIG. 12C are obtained through A/D conversion, the data over bit 3~bit 11 (9 bits) are valid data and the lower-order bit 12 is regarded as noise, i.e., invalid. Such invalid data do not need to be recorded (stored). Consequently, in the third embodiment, these invalid data are not recorded during the compression processing performed on 12-bit data to improve the compression rate.

In more specific terms, the higher-order 8 bits in the 12-bit data undergo reversible compression processing through JPEG coding regardless of the valid bit width, as explained earlier, and only the valid bits among the lowest order 4 bits are recorded in correspondence to the size of the raw data. The size of the raw data may be determined by detecting the position of the highest order bit at which "1" is set in the 12-bit data.

Next, the data format (see FIG. 13) of the coded compressed image data (for one frame) having undergone the image coding processing (see FIG. 11) described above is explained. As illustrated in the figure, in the image data corresponding to one frame, "compressed data block positional information" 201 indicating the positions of the compressed data blocks for the individual rows constituting the frame (for m rows) is stored at the starting position and following this information, image data blocks 202 corresponding to the individual rows are stored from the first row to the mth row in a repetitive pattern.

In the image data block 202 corresponding to a given row, "lower-order data block positional information" 203 for the corresponding row is added at the starting position and following this information, "higher-order compressed data block" 204 for the row and "lower-order data block" 205 for the row are sequentially stored.

In this format, the "compressed data block positional information" 201 provided at the starting position of the image data for the frame indicates the positions of the image data blocks 203 corresponding to the individual rows in the image data for the frame (for m rows) (↓ 208 in FIG. 13) In addition, the "lower-order data block positional information" 203 provided at the starting position of the image data block corresponding to each row indicates the position of the "lower-order data block" 205 (↑ 209 in FIG. 13) within the image data block in the corresponding row.

Figure 13:
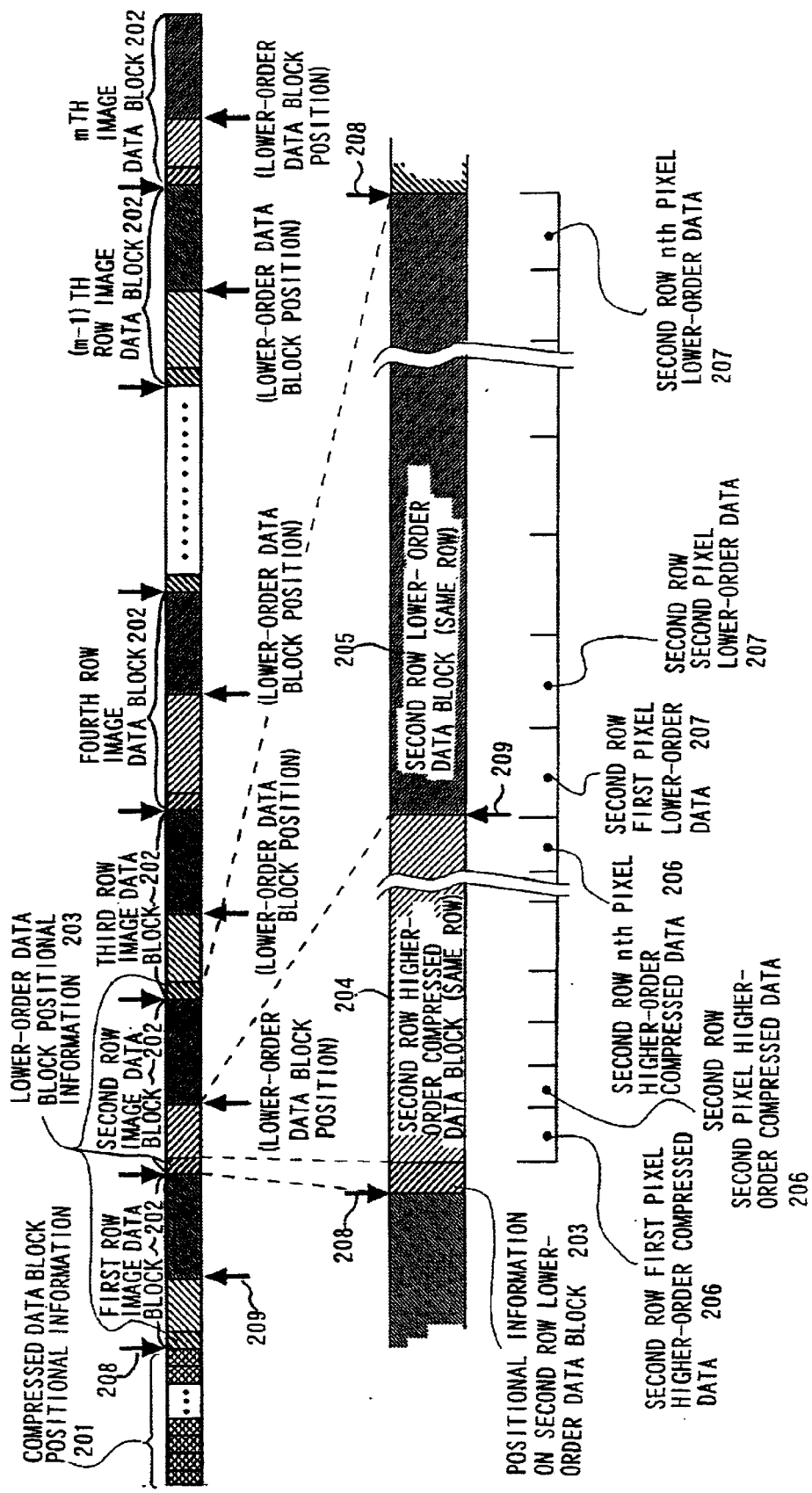
FIG. 13 presents the first example of the format of compressed image data obtained through the third embodiment.

More specifically, as illustrated in a partial enlargement in FIG. 13 (the image data block of the second row is enlarged in the figure), in the "higher-order compressed data block" 204 following the "lower-order data block positional information" 203 for the second row, the "higher-order compressed data" 206 for all the pixels (n pixels) contained in the second row are provided as a block. In addition, in the "lower-order compressed data block" 205 that follows the "higher-order compressed data block" 204 the "lower-order data" 207 corresponding to all the pixels (n pixels) contained in the second row are provided as a block.

By storing the "compressed data block positional information" 201 for the individual rows at the starting position in the image data for one frame, as described above, the "higher-order compressed data" 206 in a specific row in the image data of the entire frame can be randomly read out. A given "compressed data block position" indicates the starting position of the "higher-order compressed data block" 204 in the corresponding row and, at the same time, it indicates the position of the image data block 202 in the corresponding row. Thus, it is also possible to randomly read out both the "higher-order compressed data" 206 and the "lower-order data" 207 of a specific row.

In addition, the "lower-order data block positional information" 203 is added at the starting position of the image data block 202 corresponding to each row as described above, since the "higher-order compressed data block" 204 having undergone variable-length coding through JPEG lossless coding as explained earlier have varying data lengths in correspondence to the individual rows.

(Variation of data format)

Figure 14:
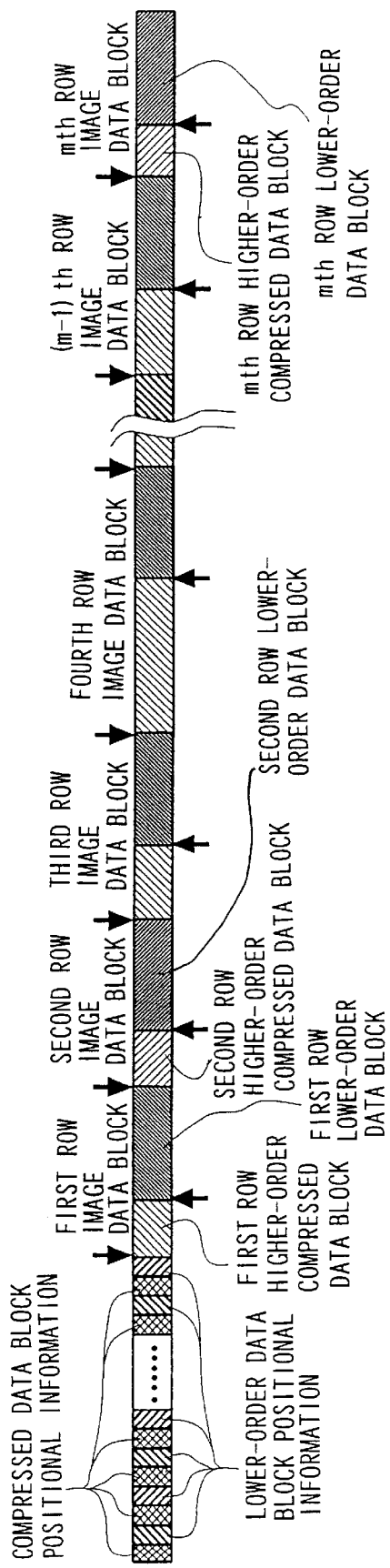
FIG. 14 presents the second example of the format of compressed image data obtained through the third embodiment.

FIG. 14 presents another example of a data format that may be adopted when storing the "higher-order compressed data blocks" and the "lower-order data blocks" in the storage medium 2. The data format shown in this figure differs from the data format shown in FIG. 13 in that the image data for one frame are compressed and stored with the "compressed data block positional information" and the "lower-order data block positional information" stored alternately in correspondence to the individual rows at the starting position of the image data.

By alternately storing the "compressed data block positional information" and the "lower-order data block positional information" at the leading portion of the image data for one image plane in this manner, the necessity for reading image data for other rows is eliminated when extracting only the image data for a specific row, to improve the processing speed.

Next, decoding of the image data having undergone the coding through the procedure described above is explained.

Since the structure of the decoding processing apparatus in the third embodiment is identical to that of the decoding processing apparatus 20 in the first embodiment illustrated in FIG. 6, its explanation is omitted. In the following explanation, the decoding processing apparatus is described in reference to FIG. 6.

In FIG. 6, the input data buffer 21 of the decoding processing apparatus 20 comprises an address buffer 21A, a high buffer 21B and a low buffer 21C. The "compressed data block positional information" from the storage medium 2 is temporarily stored in the address buffer 21A and the "higher-order compressed data" and the "lower-order data block positional information" from the storage medium 2 are temporarily stored in the high buffer 21B. The "lower-order data" from the storage medium 2 are temporarily stored in the low buffer 21C.

The reproduced data buffer 23 of the decoding processing apparatus 20 comprises a target line buffer 23A, a first preceding line buffer 23B and a second preceding line buffer 23C. In the target line buffer 23C, the reproduced image data (12-bit raw data) corresponding to the row that is the object of the current reproduction processing (reproduction target line) are temporarily stored. In the first preceding line buffer 23B, the image data (12-bit raw data) corresponding to the row preceding the reproduction target line by one row shifted from the row corresponding to the target line buffer 23A are temporarily stored and in the second preceding line buffer 23C, the image data (12-bit raw data) in the row preceding the reproduction target line by two rows shifted from the row corresponding to the first preceding line buffer 23B are temporarily stored.

Figure 15:
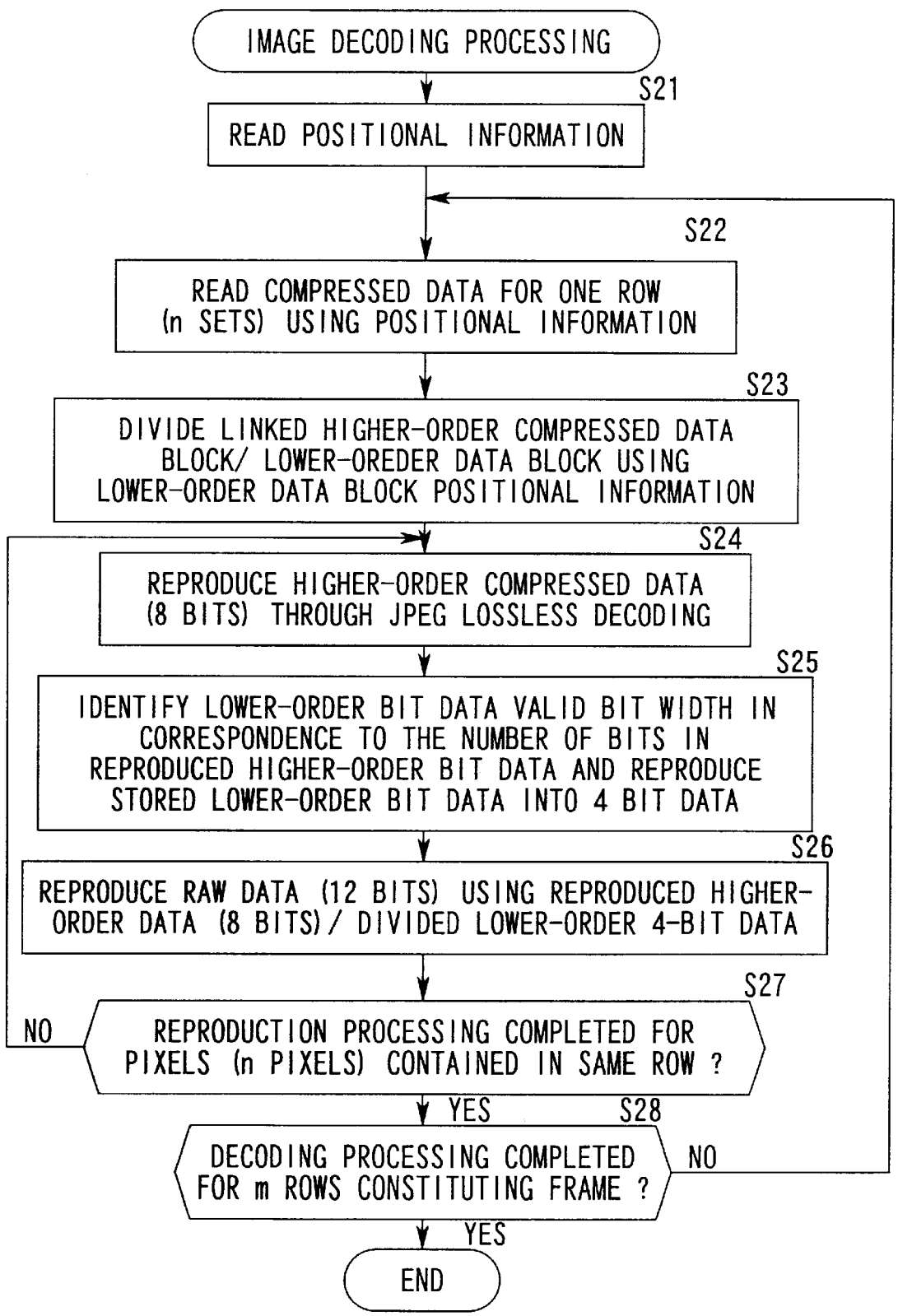
FIG. 15 is a flowchart of the image decoding processing performed in the third embodiment.

FIG. 15 is a program flowchart of the image decoding processing executed by the CPU 22 in the decoding processing apparatus 20 shown in FIG. 6. When the program for the image decoding processing starts, first, in step S21, the positional information ("compressed data block positional information," "lower-order data block positional information") that has been taken from the storage medium 2 into the input data buffer 21 is read into the CPU 22.

In step S22, based upon the compressed data block positional information (information indicating the positions of the ↓ in FIG. 13) that has been read, all the data within the image data block corresponding to the row (the entire row) to be processed in the current loop are read. In step S23, based upon the lower-order data block positional information (information indicating the positions of the ↑ in FIG. 13) read in step S21, the data read in step S22 are divided into a higher-order compressed data block and a lower-order data block.

In step S24, JPEG lossless decoding of the known art is performed on the higher-order compressed data stored in the higher-order compressed data block achieved through the division described above. This JPEG lossless decoding is implemented by reversing the coding procedure performed in step S3 in the image coding process (see FIG. 11) explained earlier.

Namely, when decoding the higher-order bit data (8 bits) of a target pixel, first, the pixel value of the pixel preceding the target pixel by two pixels (same-color pixel) that has been decoded two loops previous is determined. Next, a plurality of predicted values (provisional predicted values) for this same-color pixel preceding the target pixel by two pixels are determined in advance through a plurality of prediction formulae using the pixel values of nearby same-color pixels and the pixel values of adjacent pixels. Then, the pixel value of the pixel preceding the target pixel by two pixels is compared against the individual provisional predicted values to ascertain their prediction errors Δ and the prediction formula (optimal prediction formula) that achieves the smallest prediction error is selected in advance. Then, using the optimal prediction formula stored two loops previous, a predicted value for the target pixel in the current loop is determined, and decoding of the higher-order bit data (8 bits) of the target pixel is performed based upon the prediction error Δ stored in memory and this predicted value.

In step S25, processing to reproduce the lower-order bit data stored at the width corresponding to the number of valid bits in step S4 during the image coding processing (see FIG. 11) explained earlier to 4 bit data is implemented. During this process, the number of valid bits in the lower-order bit data is ascertained based upon the number of bits corresponding to the higher-order bit data reproduced in step S24. Data corresponding to the number of valid bits thus ascertained are read from the lower-order data block recorded during the coding process to fill the lower-order bit data for reproduction starting from the highest-order side. The remaining portion that has been discarded as the invalid bits during coding may be randomly filled with "0" and "1" by assuming that a noise component is being reproduced by doing so, or it may be filled with a value that is ½ of the value that can be expressed using the number of bits corresponding to the remaining portion. The lower-order bit data are reproduced through this process.

In step S26, 12-bit image data (raw data) are obtained from the higher-order bit data (8 bits) reproduced in step S24 and the lower-order bit data (4 bits) reproduced in step S25. In step S27, a decision is made as to whether or not the processing in steps S24~S26 described above has been performed for the entire row, i.e., for the n pixels contained in the row, and at the point in time at which the decoding processing for the entire row has been completed, the operation proceeds to the next step S28.

In step S28, a decision is made as to whether or not the processing in steps S22~S27 described above has been performed for all the rows (m rows) constituting a single frame (a single image plane), and if it is decided that the processing for the entire frame has not been completed, the operation returns to step S22 to repeat the processing. If the processing for all the rows (m rows) corresponding to the frame has been completed (the result of the decision made in step S28 is "yes"), the program ends (end).

Figure 39:
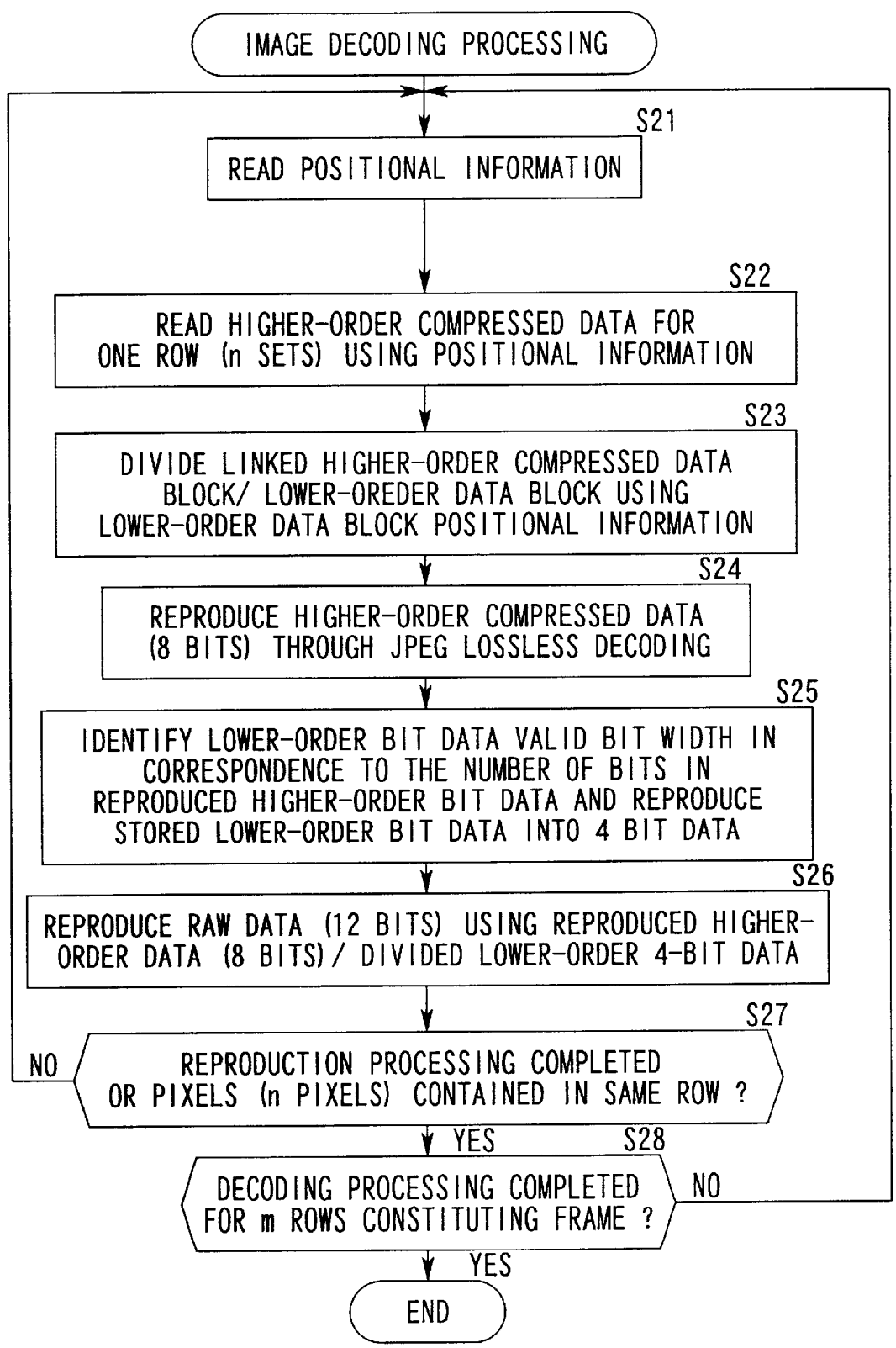
FIG. 39 presents a variation of the flowchart in FIG. 15.

In this image decoding processing, the operation returns to step S24 to repeat the processing as long as the result of the decision made in step S27 is "no" and the operation returns to step S22 to repeat the processing as long as the result of the decision made in step S28 is "no," in order to perform the processing efficiently. However, the processing may be repeated starting with the positional information read in step S21 when the result of the decision made in step S27 is "no"or when the result of the decision made in step S28 is "no" as illustrated in FIG. 39, instead.

(Another variation of data format)

Figure 16:
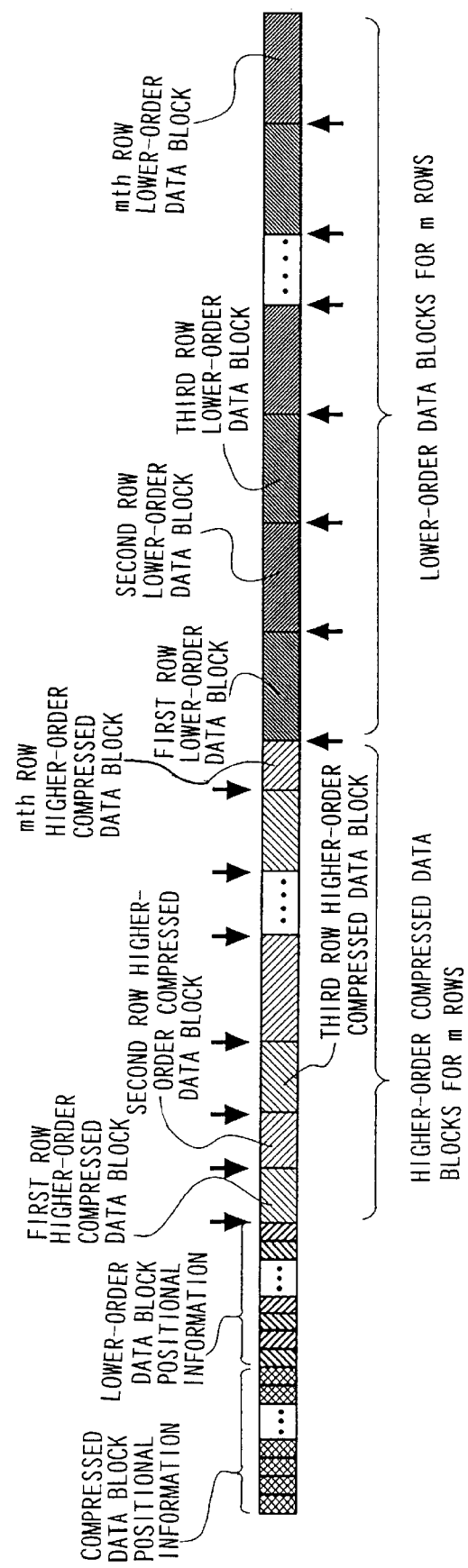
FIG. 16 shows the format of the compressed image data achieved in a variation of the third embodiment.
Figure 17:
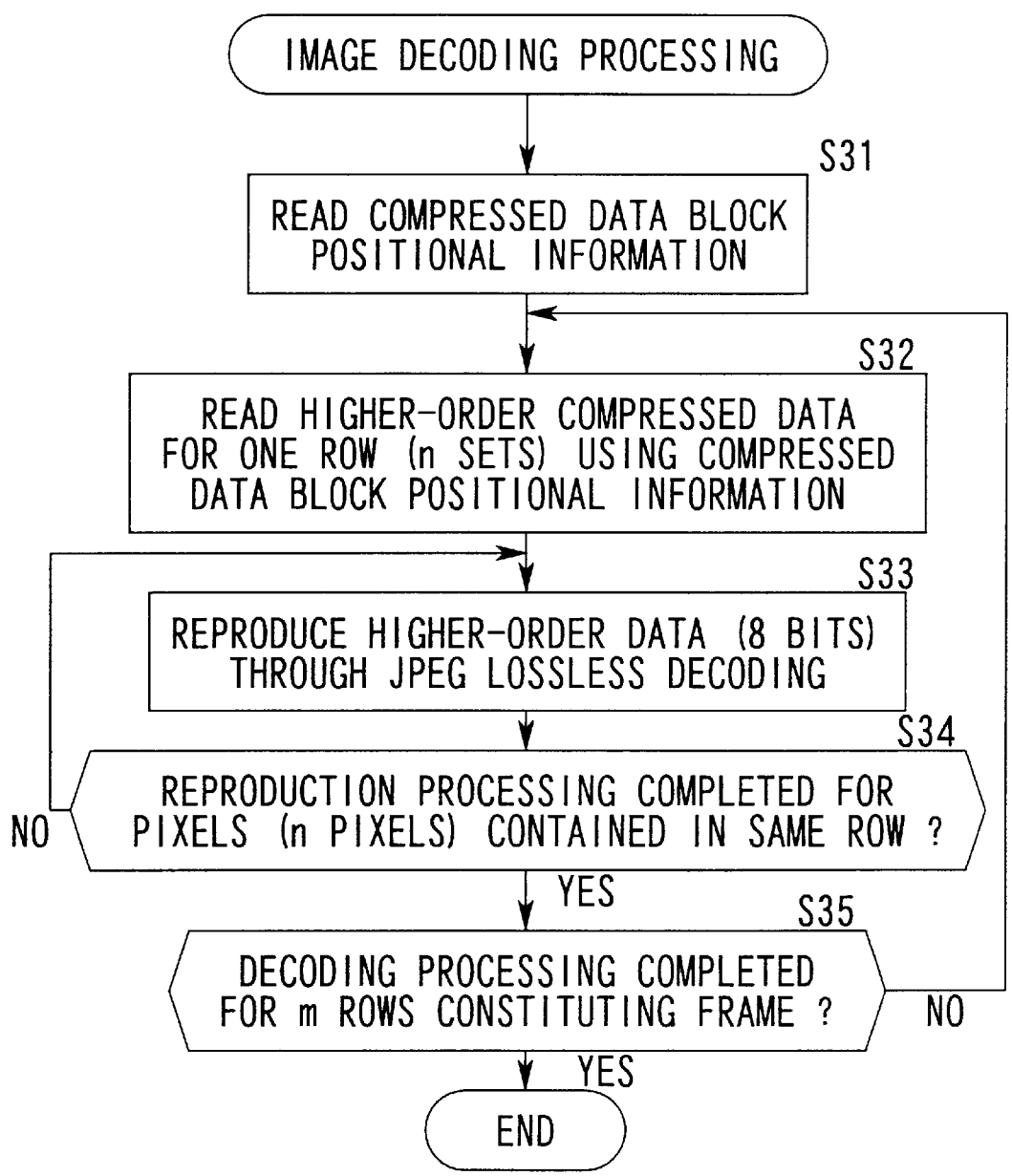
FIG. 17 is a flowchart of the image decoding processing performed in a fourth embodiment.

An example of a variation of the data format that may be used when storing compressed image data into the storage medium 2 is now explained in reference to FIGS. 16 and 17.

In this example of a variation, when storing higher-order compressed data blocks and lower-order data blocks in the storage medium 2, the higher-order compressed data blocks corresponding to all the rows (m rows) in the image data of one frame are stored in a batch separately from the lower-order data blocks corresponding to all the rows (m rows).

FIG. 16 shows the data format adopted in this case. In the example, the "compressed data block positional information" and the "lower-order data block positional information" are both stored at the starting position of the image data corresponding to one frame, and then, the "higher-order data blocks" corresponding to all of the m rows are stored in a batch and next, the "lower-order data blocks" corresponding to all of the m rows are stored in a batch, as shown in the figure.

By storing the "higher-order data blocks" for m rows in a separate batch from batch constituted of the "lower-order data blocks" for m rows in the storage medium 2 in this manner, the processing speed of image data reproduction can be improved when, for instance, only the data corresponding to the higher-order 8 bits are to be decoded and output (when reproducing only a coarse 8-bit image) since the "compressed data block positional information (at the positions indicated with ↓ in FIG. 16)" stored at the starting position can be used to decode the "higher-order compressed data" alone.

The specific procedure that may be taken to achieve high speed reproduction of a coarse image (higher-order 8 bits) by decoding only the higher-order compressed data is now explained in reference to the program chart in FIG. 17. It is to be noted that this program is executed by the CPU 22 of the decoding processing apparatus 20 (see FIG. 6).

First, in step S31, the "compressed data block positional information" is read.

In step S32, the data (higher-order compressed data) within the higher-order compressed data block corresponding to one row are read by using the compressed data block positional information (at the positions indicated with ↓ in FIG. 16). In step S33, the higher-order compressed data thus read that correspond to one pixel are decoded through JPEG lossless decoding achieved by reversing the JPEG lossless coding procedure executed during the coding processing. The decoding processing performed in step S33 is performed through a procedure identical to that in step S24 in FIG. 15.

In step S34, a decision is made as to whether or not the processing in step S33 described above has been performed for one row, i.e., for the n pixels contained in the row, and when the processing for one row has been completed, the operation proceeds to the next step S35. In step S35, a decision is made as to whether or not the processing in steps S32~S34 described above has been performed for all the rows (m rows) constituting a single frame (single image plane), and if it is decided that the processing for the entire frame has not been completed, the operation returns to step S32 to repeat the processing. If, on the other hand, it is decided in step S35 that the decoding processing for all the lines in the frame has been completed, the program ends (end).

In the example of a variation described above, by reproducing only the higher-order 8 bits demonstrating the aforementioned marked correlation when reproducing the image data from the storage medium 2 where high definition raw data that are expressed with 12 bits per pixel are compressed and stored, a coarse image can be reproduced at high speed.

Figure 40:
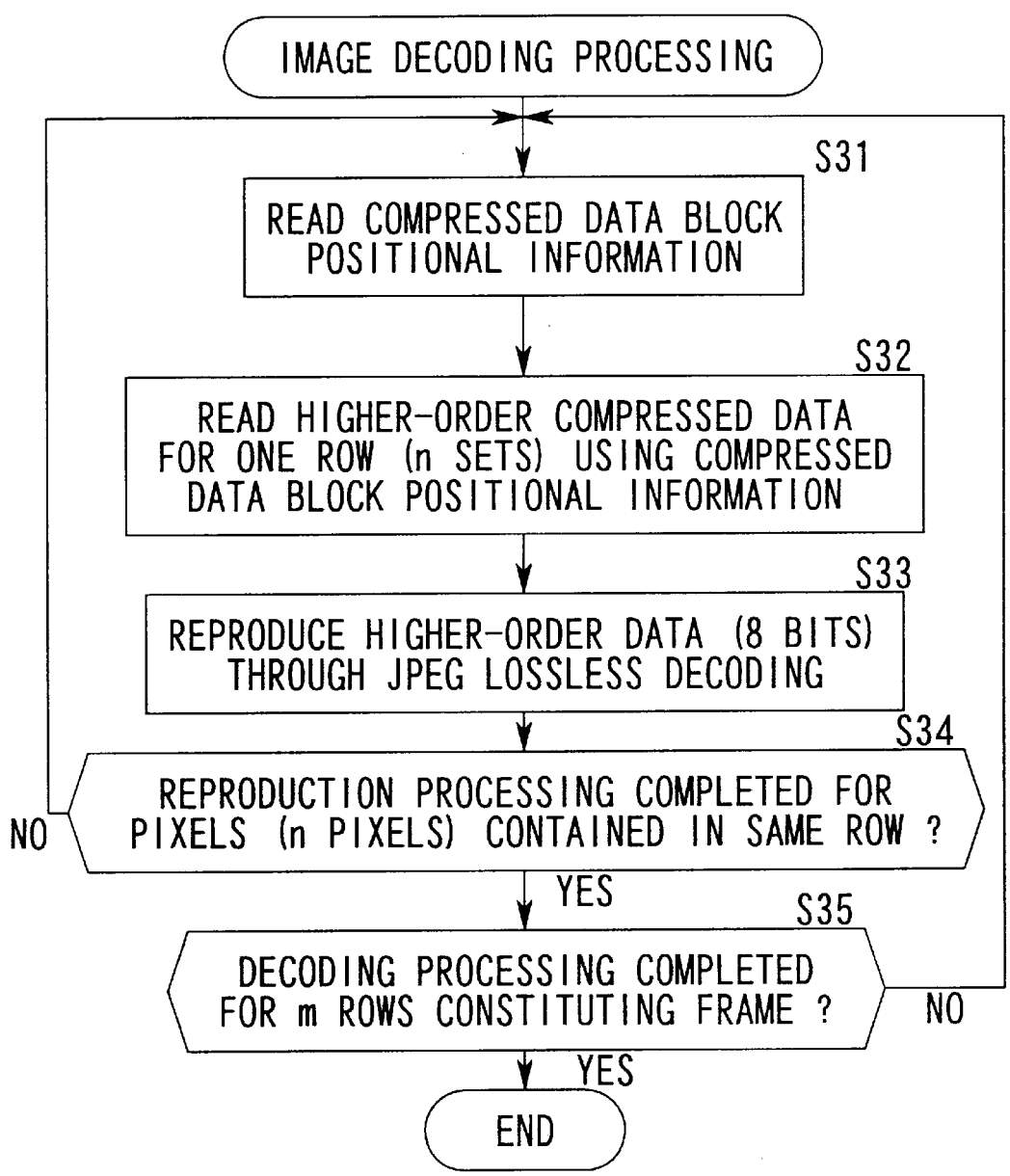
FIG. 40 presents a variation of the flowchart in FIG. 17.

In this image processing, the operation returns to step S33 to repeat the processing as long as the result of the decision made in step S34 are "no" and the operation returns to step S32 to repeat the processing as long as the result of the decision made in step S35 is "no," in order to perform the processing efficiently. However, the processing may be repeated, starting in step S31 when the result of the decision made in step S34 is "no" or when the result of the decision made in step S35 is "no" as illustrated in FIG. 40 instead.

Through the image data coding method and the image data decoding method in the third embodiment explained above, JPEG lossless coding at a high compression rate is enabled for the higher-order 8 bits (higher-order bit data) demonstrating marked correlation with nearby pixels in the 12-bit raw data obtained at a high definition, whereas high speed processing is achieved on the lower-order bit data achieving only a lesser degree of correlation by discarding the data that are not within the width corresponding to the number of valid bits. As a result, the processing speed is improved while still assuring a high overall compression rate for the 12-bit raw data. In addition, since the data outside of the width corresponding to the number of valid bits are discarded, no degradation in the image quality of the reproduced pixels occurs.

Furthermore, since the valid bit width relative to the entire 12-bit raw data is set at 9 bits, the data over the valid 9-bit width are coded/decoded with a high degree of reliability using all or part of the lower-order bit data as well to achieve a highly efficient storage of image data.

(Fourth Embodiment)

Next, the fourth embodiment of the present invention is explained in reference to FIGS. 20~22. In the fourth embodiment, the number of valid bits in the lower-order bit data (lower-order 4 bits) is set at a value corresponding to the effective signal level when the CCD 1 is at the saturation level. The image data compression in the fourth embodiment is executed by a coding processing apparatus and a decoding processing apparatus identical to those employed in the third embodiment.

FIG. 20 presents the relationships among the number of signal charges achieved in the CCD 1 with a saturation level of 100,000 ($1.0 \times 10^5$) electrons, the value of the signal from the CCD 1, the effective signal level and the noise component. Let us now consider a hypothetical situation in which the value that is equal to a ½ power of the luminance (electrons) in the CCD 1 with a number of signal charges at $1.0 \times 10^5$ (electrons) at the saturation level is calculated to be used as the gradation of the effective signal level.

The value that is ½ power of the number of signal charges $1.0 \times 10^5$ (electrons) at the saturation level of the CCD 1 is approximately 316.2, and thus, the effective signal level when the CCD 1 is at the saturation level can be expressed as 316.2 gradations. Consequently, even when the output from the CCD 1 is at the saturation level, its luminance can be fully expressed with 9 bits ($2^9 = 512$).

Since the number of signal charges at the saturation level is expressed through 316.2 gradations, the lower-order 12.95 gradations can be processed as a noise component in the calculation. In other words, in the calculation process, if the 316.2 gradations are expressed with the higher-order bits in the 12-bit data, the lower-order bits express 12.95 gradations. Since the lower-order 12.95 gradations are larger than what can be expressed with 3 bits ($2^3 = 8$), data corresponding to, at least, the lower 3 bits in the data expressed through 12 bits can be discarded (disregarded) at the saturation level.

Based upon the number of lower-order bits that can be discarded as a noise component at the saturation level (316.2 gradations), i.e., 12.95 gradations, the level of the signal exactly 3 bits of which can be regarded as a noise component (signal value S1) is determined through an arithmetic operation. When the noise component corresponds to exactly 3 bits, the effective signal level can be expressed through $(X1\times10^5)^{1/2}$ gradations assuming that signal charges ($X1\times10^5$ electrons) are generated at a ratio of $X1 (0<X1<1)$ relative to the saturation level ($1.0\times10^5$ electrons). During this process, it is assumed that the size of the noise component is in proportion to a ½ power of the signal level.

As mentioned earlier, at a saturation level expressed with 12 bits (when there are 4096 gradations), the noise component corresponds to 12.95 gradations. The signal value S1, which is expressed with 12 bits when the noise component corresponds to 8 (gradations), that is "4096×X1". Since the gradations of the effective signal level corresponding to the number of signal charges ($X1\times10^5$ electrons) is $(X1\times10^5)^{1/2}$, "X1×4096" matches the value achieved by multiplying $2^3$ by $(X1\times10^5)^{1/2}$, due to the nature of the linear relationship.

$$X1\times4096 = 8\times(X1\times10^5)^{1/2} \cdots \quad (1)$$

Through the equation (1) above, X1 is calculated to be approximately 0.38147. Thus, the signal value S1 that corresponds to a noise component of exactly 8 gradations is calculated to be; "4096×X1≈1563."

Likewise, when calculating the signal value S2 corresponding to the number of signal charges that achieves a noise component of exactly 4 gradations, equation (2) is true due to the linear relationship whereby "X2×4096" matches the value achieved by multiplying 4 by $(X2\times10^5)^{1/2}$.

$$X2\times4096 = 4\times(X2\times10^5)^{1/2} \cdots \quad (2)$$

Through equation (2) above, X2 is calculated to be approximately 0.09537. Thus, a signal value S2 achieving a noise component of exactly 4 (gradations) is calculated to be; 4096×X2≈391.

Likewise, when calculating a signal value S3 corresponding to the number of signal charges that achieves a noise component of 2 gradations, equation (3) is true since "X3×4096" matches the value achieved by multiplying 2 by $(X3\times10^5)^{1/2}$.

$$X3\times4096 = 2\times(X3\times10^5)^{1/2} \cdots \quad (3)$$

Through equation (3) above, X3 is calculated to be approximately 0.02384. Thus, the signal value S3 achieving a noise component of exactly 2 (gradations) is calculated to be 4096×X3=98.

FIG. 21 presents an example in which the signal values S1, S2 and S3 obtained in this manner are used as threshold values. In FIG. 21, instead of "S1(=1563)," "S2(=391)" and "S3(=98)," "1552," "384" and "96" are used as threshold values to set first—fourth ranges "4095~1552 (the first range)," "1551~384 (the second range)," "383—96 (the third range)" and "95~0 (the fourth range) ."

"1552," "384" and "96" are set as the threshold values in place of "S1 (=1563)," "S2 (=391)" and "S3 (=98)" for the following reason. Namely, the 12-bit raw data are divided into higher-order 8 bits (higher-order bit data) and lower-order 4 bits (lower-order bit data) in the fourth embodiment and the higher-order 8 bits are processed through JPEG lossless coding/decoding by following the same procedure as that taken in the third embodiment. Thus, in order to ascertain the number of valid bits in the lower-order bit data, only the higher-order bit data are used.

"S1 (=1563)" is expressed as "1,1,0,0,0,0,1,1,0,1,1," "S2 (=391)" is expressed as "1,1,0,0,0,0,1,1,1" and "S3 (=98)" is expressed as "1,1,0,0,0,1,0" in binary notation. Consequently, by using only the actual values corresponding to the higher-order 8 bits and assuming that the values of the lower-order 4 bits are "0,0,0,0," "1,1,0,0,0,0,1,0,0,0,0" =1552, "1,1,0,0,0,0,0,0,0," =384 and "1,1,0,0,0,0,0"=96 are used as the individual threshold values.

When the signal value (12-bit data) indicating the number of signal charges obtained by the CCD 1 is within the first range described above, bit 1 may be set at either "1" or "0." As a result, when bit 1 is at "1," the valid bit width of the raw data corresponds to 9 bits, whereas when bit 1 is at "0," the valid bit width of the raw data corresponds to 8 bits. In either case, the number of valid bits in the lower-order bit data is 1, and 3 bits of the lower-order 4 bits are discarded as a noise component.

Likewise, when a signal value indicating the number of signal charges obtained by the CCD 1 is within the second range, bit 1 and bit 2 may be set at "0" and "1" respectively or bit 1 and bit 2 may be both at "0." Consequently, the valid bit width of the raw data is either 8 or 7, and in either case, the number of valid bits in the lower-order bit data is 2 (higher-order 2 bits) with the remaining 2 bits discarded as the noise component.

In addition, when the signal value indicating the number of signal charges is within the third range, the valid bit width of the raw data is either 7 or 6, and in either case, the number of valid bits in the lower-order bit data (4 bits) is 3, and thus, the higher-order 3 bits are stored as valid bits.

When a signal value indicating the number of electrical charges is within the fourth range, the valid bit width of the raw data is a value in a range of 6~1, and at this time, the number of valid bits in the lower-order bit data is 4, i.e., the entire lower-order bit data are handled as effective data.

FIG. 22 presents the results of hexadecimal processing adopted to determine the number of valid bits in the lower-order bit data by using the higher-order bit data (8 bits) in the 12-bit raw data described above. In FIG. 22, "2748," "812," "156" and "76" are expressed in hexadecimal notation ("2748=0, x, A, B, C," "812=0, x, 3, 2, C," "156=0, x, 9, C," and "76=0, x, 4, C"). "0, x" in the fourth and fifth digits indicate that the values are expressed in hexadecimal notation.

As explained above, since the higher-order bit data (8 bits) in the raw data (12 bits) expressed through binary notation are used to determine the number of bits in the lower-order bit data to be used as effective data bits, a decision is made as to how the first digit is to be handled based upon the values other than the value in the lowest order (the first digit, corresponding to 4 bits) in the value expressed through hexadecimal notation ("0, x, A, B," "0, x, 3, 2," "0, x, 9" and "0, x, 4").

In the example described above, in which "2748=0, x, A, B, C," "812=0, x, 3, 2, C," "156=0, x, 9, C" and "76=0, x, 4, C," the value at the first digit in hexadecimal notation is all "C"=0,b,1,1,0,0" ("0,b" indicates that the value is expressed in binary notation). Consequently, the number of higher-order bits in the "1,1,0,0" expressed in binary notation to be used as effective data is determined based upon the second and third digits or the second digit in the value expressed in hexadecimal notation ("A, B" "3, 2" "9" and "4").

Namely, the number of valid bits among the lowest order 4 bits during compression is determined in correspondence to the range in FIG. 21 within which the value that is achieved by setting "0" for the lowest order 4 bits in the 12-bit raw data obtained through the A/D conversion is contained. During decoding, the number of valid bits among the lowest order 4 bits is determined in correspondence to the range in FIG. 21 within which the value achieved by incorporating 0 set for the 4 bits with the decoded higher-order 8-bit data is contained. Based upon the number of valid bits thus determined, the data corresponding to the number of valid bits are obtained at the position of the lower-order data 206 of the pixel in the lower-order data block 205 (see FIG. 13). While the size of the lower-order data 206, i.e., the number of valid bits in the lower-order data, is variable, as explained earlier, the position of the data corresponding to the pixel is ascertained through calculation since the processing is performed sequentially in units of individual pixels.

(Fifth Embodiment)

Figure 18:
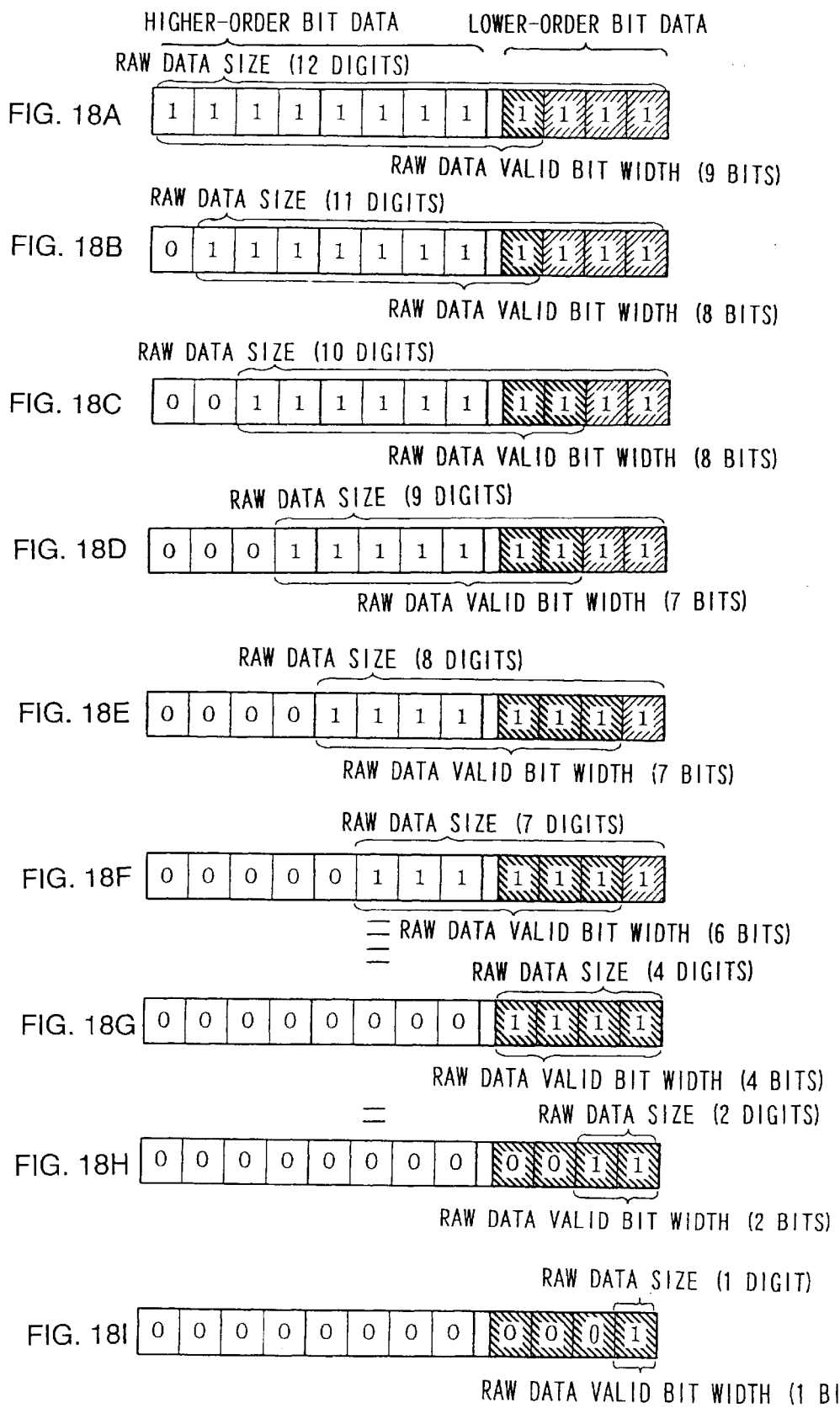
FIG. 18 illustrates individual relationships that the raw data have with the higher-order bit data, the lower-order bit data, the raw data size and the valid bit width in a fifth embodiment.

Next, the fifth embodiment of the present invention is explained in reference to FIGS. 18 and 23. In the fifth embodiment, the number of valid bits in the lower-order bit data (4 bits) of the 12-bit raw data is determined based upon the level of the signal (the number of signal charges) from the CCD 1 for each signal. It is to be noted that the image data compression in the fifth embodiment, too, is executed by a coding processing apparatus and a coding processing method identical to those in the third embodiment.

FIGS. 18A~18H illustrate individual relationships that the 12-bit raw data have with the higher-order bit data (8 bits), the lower-order bit data (4 bits), the raw data size (the number of digits) and the valid bit width. FIG. 23 presents relationships among the 12-bit raw data, an valid bit width of the signal and the valid bit position. It is to be noted that in FIG. 23, "1" indicates the starting position of the valid component, "x" indicates a valid bit and "y" indicates an invalid bit. In addition, the valid bit position is expressed within the range of bit 1~bit 12 counting from the higher-order side.

As shown in FIG. 23, when the size of the 12-bit raw data is 12 digits (bit 1~bit 12), the size of data that can be displayed with these 12 digits is 4095 (gradations), the number of signal charges is $1.0\times10^5$ (electrons) at this point (saturation level) and the corresponding effective signal level at this point is $(1.0\times10^5)^{1/2} \approx 316.2$ (gradations) (see FIG. 18A). Since this level of gradation can be expressed with 9 bits, the higher-order 9 bits (bit 1~bit 9) in the 12-bit raw data are set as the valid bit width with the remaining 3 bits, (bit 10~bit 12) regarded as invalid bits. Consequently, only the highest order bit (bit 9) in the lower-order bit data (bit 9~bit 12) is valid (the number of valid bits=1).

When the size of the 12-bit raw data corresponds to 11 digits or less, the noise component having data that can be discarded is determined based upon the effective signal level, and the valid bit width of the raw data and the number of valid bits in the lower-order bit data are determined by using the noise component as described below.

Namely, when the size of the 12-bit raw data is 11 digits (bit 2~bit 12), the size of data that can be displayed with these 11 digits is "2047," the number of signal charges is $0.5\times10^5$ electrons, since the data size corresponds to ½ of the saturation level and the effective signal level at this point is $(0.5\times10^5)^{1/2} \approx 223.6$ (gradations) (see FIG. 18B). Since this level of gradation can be expressed with 8 bits, the 8 bits (bit 2~bit 9) in the 12-bit raw data are set as the valid bit width with the remaining 3 bits, (bit 10~bit 13) regarded as invalid bits. Consequently, only the highest order bit (bit 9) in the lower-order bit data (bit 9~bit 12) is valid (the number of valid bits=1).

In addition, when the size of the 12-bit raw data is 10 digits (bit 3~bit 12), the size of data that can be expressed with these 10 digits is "1023," the number of signal charges is $0.25\times10^5$ (electrons) since the data size corresponds to ¼ of the saturation level and the effective signal level is $(0.25\times10^5)^{1/2} \approx 158.1$ (gradations) (see FIG. 18C). Since this level of gradation, too, can be expressed with 8 bits, the 8 bits, (bit 3~bit 10) in the 12-bit raw data are set as the valid bit width with the remaining 2 bits, (bit 11~bit 12) regarded as invalid bits. Thus, in this case, the higher-order 2 bits (bit 9, bit 10) are valid bits in the lower-order bit data (bit 9~bit 12) (the number of valid bits=2).

Likewise, when the size of the raw data is 9 digits (bit 4~bit 12) (see FIG. 18D), the effective signal level can be expressed with 7 bits and the 7 bits, from bit 4 through bit 10 in the 12-bit raw data are set as the valid bit width with the remaining 2 bits, i.e., bit 11 and bit 12, regarded as invalid bits. Thus, in this case, too, the higher-order 2 bits (bit 9, bit 10) are valid bits in the lower-order bit data (bit 9~bit 12) (the number of valid bits=2).

Furthermore, when the size of the raw data is 8 digits (bit 5~bit 12) (see FIG. 18E), the effective signal level can be expressed with 7 bits and the 7 bits, from bit 5 through bit 11 in the 12-bit raw data are set as the valid bit width with only bit 12 regarded as an invalid bit. Thus, in this case, the higher-order 3 bits (bit 9~bit 11) in the lower-order bit data (bit 9~bit 12) are effective (the number of valid bits=3).

In addition, when the size of the raw data is 7 digits (bit 6~bit 12) (see FIG. 18F), the effective signal level can be expressed with 6 bits, the 6 bits, from bit 6 through bit 11 in the 12-bit raw data are set as the valid bit width with only bit 12 regarded as an invalid bit. Thus, in this case, too, the higher-order 3 bits (bit 9~bit 11) in the lower-order bit data (bit 9~bit 12) are effective (the number of valid bits=3).

When the size of the raw data is 6 digits or fewer, the effective signal level can be expressed with a minimum of 6 bits, and in this case, the 6 digits are all valid bits. Consequently, the 4 bits (bit 9~bit 12) in the lower-order bit data (bit 9~bit 12) are all valid bits (the number of valid bits=4).

As explained above, in the fifth embodiment, in which the number of valid bits in the lower-order bit data is determined in correspondence to the individual effective signal levels, efficient image data compression that corresponds to the signal value is achieved.

It is to be noted that while the explanation is given above in reference to the third~fifth embodiments on an example at which the raw image data are 12-bit data, the present invention may be adopted in combination with image data having more than 12 bits or image data having fewer then 12 bits. In any case, the processing speed can be increased while assuring a high compression rate.

In addition, while the explanation is given in reference to the third~fifth embodiments on an example in which the 12-bit raw data are divided into higher-order 8 bits and lower-order 4 bits, the number of higher-order bits may be set at a value other than 8 as long as the higher-order bits demonstrate a marked correlation (it has been learned through experience that the number of higher-order bits should be within a range of 6~9 in the case of 12-bit image data). The number of higher-order bits to correspond to a higher-order bit data may be determined for each frame (each image plane).

Furthermore, while the explanation is given in reference to the third~fifth embodiments above on an example in which the prediction error Δ (or the quantized prediction error δ) is coded by using a Huffman coding table or the like, the prediction error Δ (or the quantized prediction error δ) may be coded through universal coding such as Ziv-Lempel, instead.

While the positional information (data block positional information) is affixed to the compressed image data by taking into consideration the possibility of partially reproducing an image in a given frame in the third~fifth embodiments described above, the positional information may be omitted as long as an intact image corresponding to the entire frame is always reproduced.

Furthermore, while the explanation is given in reference to the third~fifth embodiments on an example in which the coding processing apparatus and the decoding processing apparatus are constituted as separate apparatuses (e.g., the coding processing apparatus is provided on the digital camera side and the decoding processing apparatus is provided on the personal computer side), these two apparatuses may be internally provided within a single system (e.g., the two apparatuses may be internally provided at a digital camera or the like).

Moreover, while the explanation is given in reference to the third~fifth embodiments on an example in which the processing for dividing image data into higher-order data and lower-order data and the coding processing on the higher-order bit data achieved through DPCM coding are both executed by the CPU 13 provided inside the coding processing apparatus 10, the present invention is not restricted to this example, and coding through DPCM coding may be executed by a dedicated LSI provided outside the CPU 13, and the CPU 13 within the coding processing apparatus 10 is engaged only in dividing the image data into the higher-order side and the lower-order side. In this case, the externally provided dedicated LSI may execute coding such as Ziv-Lempel instead of DPCM coding. Likewise, an externally provided dedicated LSI may be provided at the decoding processing apparatus 20 to implement decoding so that the dedicated LSI can execute DPCM decoding (or another type of decoding such as Ziv-Lempel) on the higher-order bit data. In such a case, the CPU 22 at the decoding processing apparatus 20 can combine the higher-order bit data and the lower-order bit data after the decoding processing.

Also, when one of the third~fifth embodiments explained above is to be adopted in a digital camera, the quantity of noise corresponding to the invalid bit portion in the lower-order bit data may be calculated based upon the gain of the amplifier that amplifies signals output by the CCD. In addition, the invalid bit portion in the lower-order bit data may be determined based upon the ISO sensitivity setting that determines the gain of the amplifier at the digital camera. Since the noise quantity changes in correspondence to the gain at the amplifier that amplifies the CCD output signals in a digital camera, the valid bit length may be varied in correspondence to the amplifier gain or the ISO sensitivity. In such a case, signals at the correct valid bit length can be obtained in the digital camera at any sensitivity setting or gain setting to achieve an improvement in the compression efficiency.

In addition, while the explanation is given in reference to the third~fifth embodiments on an example in which the valid bit length is determined in correspondence to the characteristics of the input device, the image quality is hardly affected at all, even if a bit length that is smaller than this bit length by 1~2 bits is used as the valid bit length. Thus, the valid bit length may be varied in correspondence to the photographing conditions, the area of application and the like.

Moreover, while the explanation is given in reference to the third~fifth embodiments on the assumption that a still picture is obtained by a digital camera or the like, the present invention may be adopted when taking dynamic pictures.

(Sixth Embodiment)

Before the sixth embodiment is explained, the compression method in the prior art that is improved by adopting the sixth embodiment, is explained.

JPEG DPCM (international standard specifications), which is a reversible compression method for multivalued halftone image data is known as standard specifications for image data compression in the prior art. In the JPEG DPCM method, a predicted value for a target pixel is calculated through a specific prediction formula by using the pixel values of pixels in the vicinity of the target pixel (pixel values that have already been determined), the difference (prediction error $\Delta$) between the calculated predicted value and the pixel value of the target pixel that is actually obtained is determined, and this prediction error $\Delta$ is processed through entropy coding (Huffman coding, arithmetic coding or the like) to achieve compression of the image data.

Figures 33, 34:
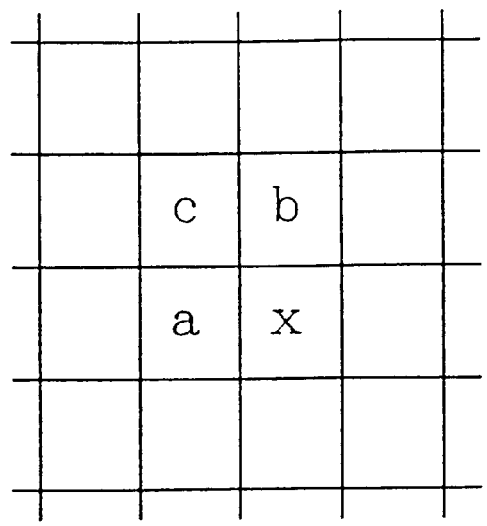
FIG. 33 shows the pixel values of nearby pixels used to determine a predicted value for a target pixel in the prior art.
FIG. 34 shows a standard layout of color filters provided at the light-receiving surface of an image input device.

FIG. 33 illustrates the positions of nearby pixels used in the calculation of the predicted value, with "x" indicating the pixel value of the target pixel. In addition, "a," "b" and "c" are the pixel values of the nearby pixels used to calculate the predicted value "y" of the target pixel, with the "x," "a," "b" and "c" indicating the respective positions of the target pixel and the nearby pixels. In this example, the pixel values of the pixels adjacent to the target pixel (adjacent pixels) are used as the pixel values of nearby pixels.

(1)~(7) below are seven types of prediction formulae set forth in the standard international specifications, in which the pixel values "a," "b" and "c" are used.

$$y=a. . . \tag{1}$$

$$y=b. . . \tag{2}$$

$$y=c. . . \tag{3}$$

$$y=a+b-c. . . \tag{4}$$

$$y=a+(b-c)/2. . . \tag{5}$$

$$y=b+(a-c)/2. . . \tag{6}$$

$$y=(a+b)/2. . . \tag{7}$$

The image data compression rate can be improved by calculating a predicted value "y" of the target pixel using the pixel values "a," "b" and "c" of the pixels adjacent to the target pixel, determining the prediction error $\Delta$ (=y−x) of the predicted value "y" relative to the pixel value "x" of the target pixel detected by a single-board CCD and coding the prediction error $\Delta$ in this manner.

However, if the prediction error $\Delta$ is determined simply through prediction formulae (1)~(7) using the pixel values "a," "b" and "c" of the pixels adjacent to the target pixel (positioned at "x") as illustrated in FIG. 33, the difference (prediction error $\Delta$) between the predicted value "y" of the target pixel and the pixel value "x" of the target pixel may become too large, and in such a case, a high compression rate cannot easily be achieved.

The reason for this is as follows. In a color image input device employing a single-board CCD such as a digital still camera, color filters are provided for the individual pixels (cells) of the single-board CCD, as illustrated in FIG. 34, to extract a signal with a specific color component from each cell. Specific examples of a color filter combination include the combination of the primary colors, i.e., red (R), green (G) and blue (B), the combination of four complementary colors, i.e., yellow (Y), magenta (M), cyan (C) and white (W) and the combination of four colors i.e., yellow (Y), magenta (M), cyan (C) and green (G), and in these combinations, the color filters provided at adjacent pixels may have different color components.

For instance, at a single-board CCD having different color filters provided at adjacent pixels (cells) as illustrated in FIG. 34, (an example in which the primary colors red (R), green (G) and blue (B) are arrayed in a Bayer array is illustrated in the figure), the predicted value obtained by incorporating the pixel values "a," "b" and "c" of the adjacent pixels in prediction formulae (1)~(7) may not always be close enough to the pixel value (the numerical value inside each cell in FIG. 33) obtained by the single-board CCD, and in such a case, the prediction error $\Delta$ becomes extremely large. If the prediction error $\Delta$ is large, a high compression rate cannot be achieved through Huffman coding or arithmetic coding implemented by using the prediction error $\Delta$.

Now, let us consider a hypothetical area achieving an almost consistent image value distribution with average color component signal values of; red (R)=100, green (G)=50 and blue (B)=200, as illustrated in FIG. 33. Predicted value "y" calculated through formulae (1)~(7) using the pixel values "a," "b" and "c" of the pixels adjacent to a target pixel indicated as B33 in FIG. 33 are as presented in FIG. 35, and the value representing the prediction error $\Delta$ (=y−x) is large regardless of which of prediction formulae (1)~(7) is used (in the example in FIG. 35, the prediction error $\Delta$ calculated by using prediction formula (3) is at the smallest at "−100"). If the prediction error $\Delta$ is large, as in this case, a high compression rate cannot be achieved through either Huffman coding or arithmetic coding.

In particular, when storing high definition image data having 10 bits~12 bits per pixel in a storage medium as described earlier, the compression must be achieved at a high compression rate. However, the need for a high compression rate achieved in the compression of high definition image data cannot be met through the JPEG DPCM (standard international specifications) image compression method in the prior art using prediction formulae (1)~(7) in which the pixel values of adjacent pixels are simply used for substitution.

Accordingly, through the sixth embodiment, an image data compression method that enables image data compression at a high compression rate by achieving a target pixel predicted value closer to its actual pixel value even if color filters provided at the individual pixels (cells) of the image input device (single-board CCD) may have different color components among adjacent pixels.

The following is an explanation of the sixth embodiment of the present invention, given in reference to the attached drawings.

Figure 24:
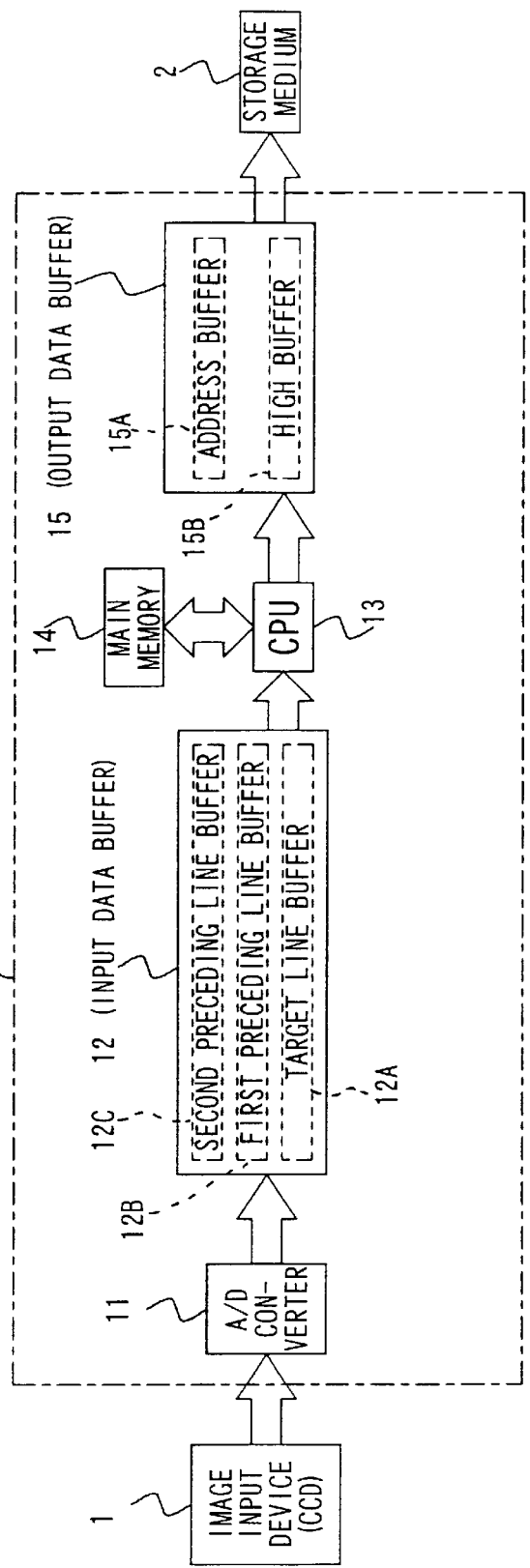
FIG. 24 a block diagram illustrating the structure of the coding processing apparatus in a sixth embodiment of the present invention.

FIG. 24 is a block diagram illustrating the structure of a coding processing apparatus 10 that implements the image data compression method according to the present invention. The coding processing apparatus 10 digitizes an image signal input from an image input device (single-board CCD) 1 and then compresses the image data through JPEG lossless coding which combines DPCM coding and entropy coding such as Huffman coding to store them at a storage medium 2. In this structure, the coding processing apparatus 10 and the single-board CCD 1 constitute an integrated unit (e.g., inside a digital camera). In addition, as detailed later, the compressed image data stored at the storage medium 2 are decoded at a decoding processing apparatus 20 (see FIG. 29) such as a personal computer and then the image is reproduced after the data undergo processing/modification performed by the user.

The single-board CCD 1 connected to the input side of the coding processing apparatus 10 is provided with pixels (cells) arrayed in an m-row×n-column matrix and, as illustrated in FIG. 25, color filters in three colors, R, G and B are provided at its light-receiving surface and arrayed in a specific pattern.

The coding processing apparatus 10 comprises an A/D converter 11 that converts a signal (signal charge) from the single-board CCD 1 to a digital signal, an input data buffer 12 that temporarily stores the digitized signal (image data), a CPU 13 that codes the signal (image data) temporarily stored at the input data buffer 12, a main memory 14 that stores programs and the like executed by the CPU 13, an output data buffer 15 that temporarily stores the signal (compressed image data) coded by the CPU 13 and outputs the signal with specific timing to the storage medium 2 for storage and the like.

The input data buffer 12, which stores pixel data (m x n sets) corresponding to the individual pixels obtained by the single-board CCD 1 in units of single rows (lines), is constituted of a target line buffer 12A that stores in a batch data corresponding to one row (n sets of pixel data) to be coded, a first preceding line buffer 12B that stores the data corresponding to the immediately preceding row shifted by one row from the row corresponding to the target line buffer 12A and a second preceding line buffer 12C that stores the data preceding the data of the target line by two rows shifted by one row from the row corresponding to the first preceding line buffer 12B.

In addition, the output data buffer 15 is constituted of an address buffer 15A and a high buffer 15B, with "data block positional information" stored in the address buffer 15A and "compressed image data" stored in high buffer 15B. It is to be noted that by allocating in advance 2 bytes or 4 bytes for the image data positional information corresponding to a given row in the address buffer 15A, the positional information corresponding to any row can be obtained even faster.

Figure 26:
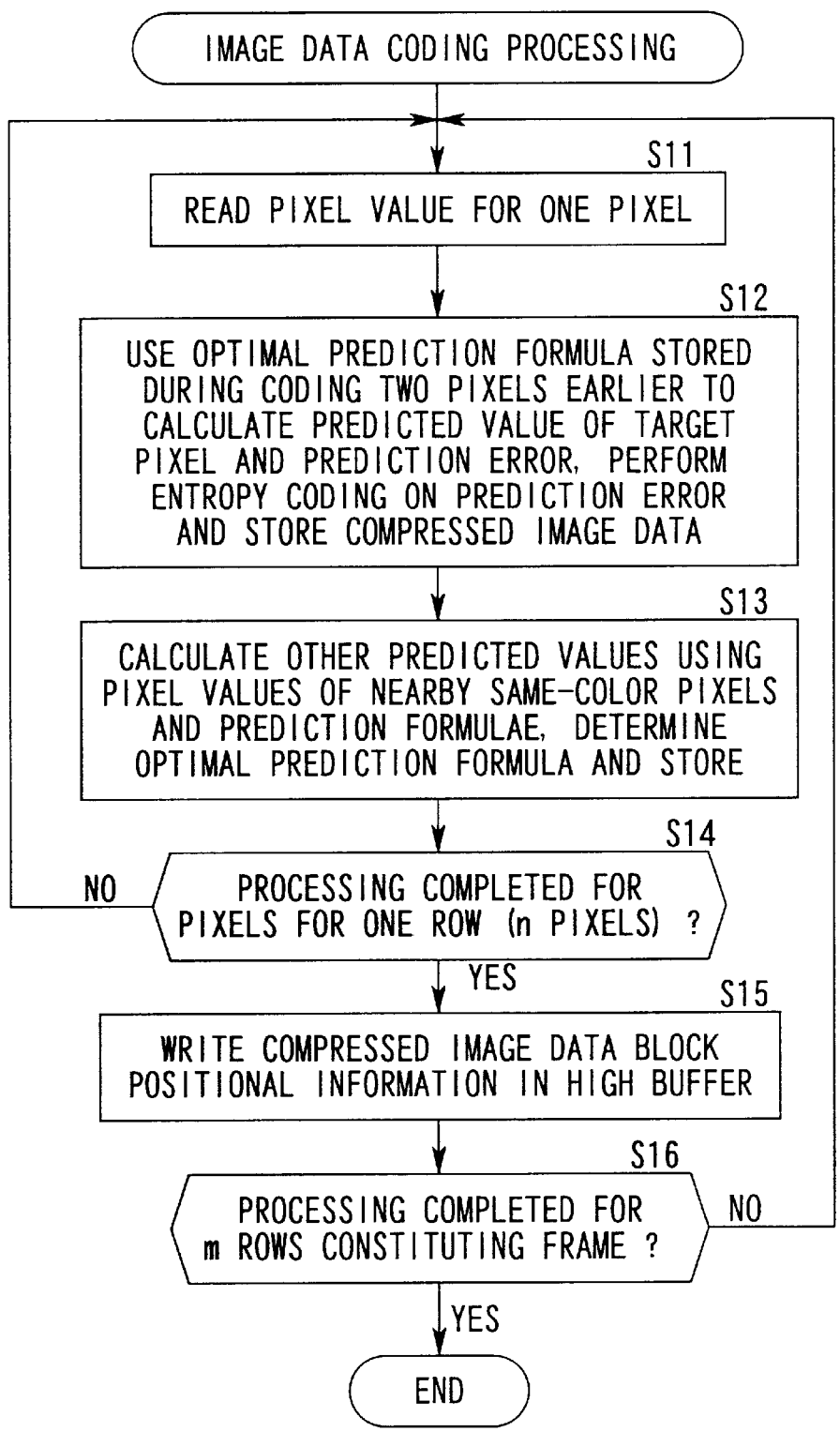
FIG. 26 is a flowchart of the image data coding processing performed in the sixth embodiment.

Next, the coding processing performed on image data that is executed by the CPU 13 of the coding processing apparatus 10 is explained in reference to the program flowchart in FIG. 26.

When this coding processing starts, first in step S11, the pixel value "x" representing one pixel (target pixel) in the image data (n sets) corresponding to one row obtained at the rate of 12 bits per pixel is read from the target line buffer 12A.

In step S12, a predicted value "y" of the target pixel in the current loop is calculated by using the optimal prediction formula (one of the following prediction formulae (1)~(14)) stored during the processing of the pixel preceding the target pixel by two pixels, the prediction error $\Delta$ (=y−x) relative to the pixel value "x" obtained in step S11 is calculated, image data compression is performed by implementing entropy coding such as Huffman coding using a Huffman coding table, arithmetic coding or the like on the prediction error $\Delta$ and the compressed image data are stored.

(1)~(14) below are examples of prediction formulae that may be utilized in this embodiment.

$$y=a. . .\tag{1}$$

$$y=b. . .\tag{2}$$

$$y=c. . .\tag{3}$$

$$y=a+b-c. . .\tag{4}$$

$$y=a+(b-c)/2. . .\tag{5}$$

$$y=b+(a-c)/2. . .\tag{6}$$

$$y=(a+b)/2. . .\tag{7}$$

$$y=d \ldots \quad (8)$$

$$y=e \ldots \quad (9)$$

$$y=f \ldots \quad (10)$$

$$y=d+e-f \ldots \quad (11)$$

$$y=d+(e-f)/2 \ldots \quad (12)$$

$$y=e+(d-f)/2 \ldots \quad (13)$$

$$y=(d+e)/2 \ldots \quad (14)$$

Figures 27, 28:
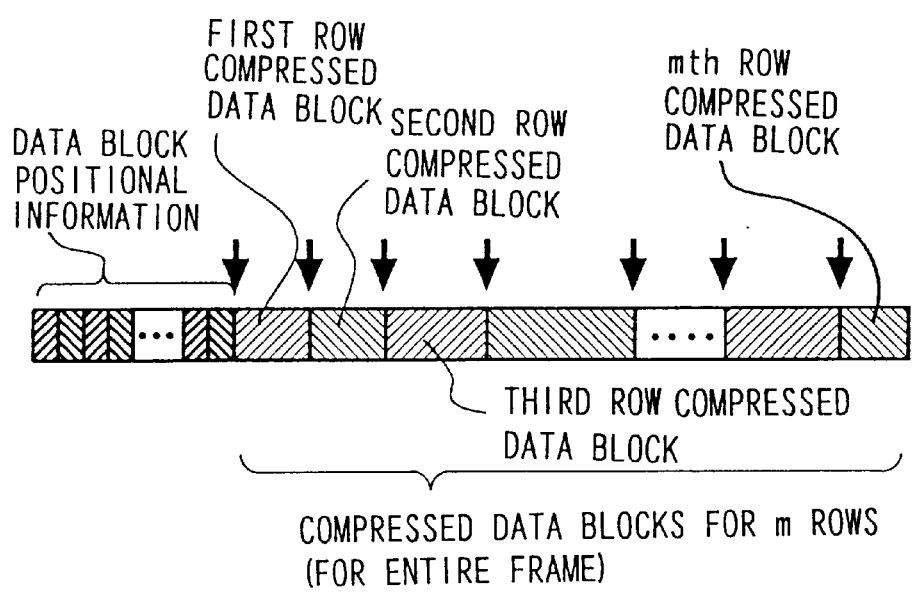
FIG. 27 shows the pixel values of nearby pixels used to determine a predicted value for a target pixel.
FIG. 28 presents an example of the format of the compressed image data achieved through the sixth embodiment.

Variables "a," "b," "c," "d," "e" and "f" in prediction formulae (1)~(14) are the pixel values of pixels that have positional relationships illustrated in FIG. 27 relative to the target pixel (position indicated as "x"). In addition, since color filters are provided at the individual pixels (cells) of the single-board CCD 1 as illustrated in FIG. 25, the pixels (adjacent pixels) at positions "a" "b" and "c" adjacent to the target pixel (positioned as indicated by "x") have color filters with color components different from that of the target pixel. Color filters having the same color component as that of the target pixel are provided at the pixel positioned at "d" "e" and "f" that are not adjacent to the target pixel (same-color pixels).

It is to be noted that the optimal prediction formula is selected from prediction formulae (1)~(14) in step S13 (to be detailed later) during the image data coding processing executed two loops earlier, and the number assigned to the optimal prediction formula thus determined (prediction formula No.) is stored. In the next step S13, an optimal prediction formula to be used in the calculation of the predicted value for the pixel two loops later is selected from prediction formulae (1)~(14) by using the pixel value "x" obtained in step S11 during the current loop and the corresponding prediction formula number, i.e., one of the prediction formula numbers (1)~(14), is stored. The optimal prediction formula thus stored is utilized in the calculation of the predicted value during the coding processing (step S12) two loops later.

The following is a specific explanation of the procedure through which the optimal prediction formula is determined.

At the single-board CCD 1 having a color filter array as illustrated in FIG. 25, for instance, the pixel values "a" "b" and "c" of nearby pixels G32, G23 and R22 (enclosed by bold lines in the figure) and the pixel values "d" "e" and "f" of the nearby pixels B31, B13 and B11 (indicated by lines slanting down to the right in the figure) around the target pixel (e.g., pixel B33 in FIG. 25) in the current loop are used for substitution in prediction formulae (1)~(14) to calculate 14 provisional predicted values "y" (see FIGS. 25 and 27).

If the pixel values are distributed as illustrated in FIG. 34 (numerical values within parentheses in FIG. 25), "a=50," "b=50" "c=100" "d=206" "e=202" and "f=204" with respect to the target pixel B33. FIG. 36 presents the prediction errors _ of the 14 provisional predicted values "y" obtained by using these values for substitution in prediction formulae (1)~(14) relative to the pixel value "x" of the pixel B33.

As FIG. 36 indicates, the provisional predicted value "y" calculated by using the pixel values "a"~"f" of the nearby pixels of the target pixel B33, that is the closest to the pixel value "x" of the target pixel, is obtained through the prediction formula (9) (the prediction error Δ is the smallest at "2"). Thus, in this case, a predicted value "y" of the target pixel B35 is calculated by using the optimal prediction formula (9) in the coding processing two loops later.

The pixel value "x" of the pixel B33, which has already been coded, is used to determine the optimal prediction formula for the target pixel B35 two loops later in this manner, since, as detailed later, the optimal prediction formula among prediction formulae (1)~(14), to be used to decode the compressed image data of the target pixel can easily be determined based upon the pixel value of the pixel two pixels previous that is already known at this point in time. In other words, since the pixel value of the target pixel to be decoded in the current loop is still unknown at the time of decoding, the optimal prediction formula for the decoding cannot be determined based upon the pixel value of the target pixel in the current loop.

In the color filter array illustrated in FIG. 25, the target pixel two loops previous has a color filter with the same color component as that of the color filter of the current target pixel. In other words, when determining the optimal prediction formula, too, the pixel value of a same-color pixel having a color filter with the same color component and the provisional predicted value for this pixel are used.

In the following step S14, a decision is made as to whether or not the processing in steps S11~S13 has been performed for one row, i.e., for all of the n pixels, and when the processing for the entire row has been completed, the operation proceeds to step S15. In step S15, the compressed image data coded in step S12 are written in the high buffer 15B of the output data buffer 15.

In step S16, a decision is made as to whether or not the processing in steps S11~S15 described above has been performed for one frame (in rows). If the processing for the entire frame (processing of m rows) has not been completed, the result of the decision made in step S16 is "no," and the processing in steps S11~S15 described above is executed repeatedly. If, on the other hand, the processing of all the rows (m rows) constituting the frame has been completed (the result of the decision made in step S16 is "yes"), the processing ends.

FIG. 28 shows the data format of the image data (for one frame) having undergone the coding process that are stored in the storage medium 2. As illustrated in the figure, in the image data corresponding to one frame (one image plane), data block positional information for the frame (for m rows) is stored at the starting position and following this information, compressed data blocks corresponding to the individual rows are stored from the first row to the mth row in a repetitive pattern.

In this format, the data block positional information provided at the starting position of the image data for the entire frame indicates the positions of the image data blocks corresponding to the individual rows in the image data for the frame (for m rows) (information indicating the positions of the data blocks marked with ↓ in FIG. 28. The data block positional information is added as described above, since the lengths of individual sets of compressed image data vary after coding. By storing the data block positional information, the compressed image data corresponding to a specific row in the image constituting one frame can be read out randomly for decoding.

Next, decoding of the image data that have been coded through the procedure described above is explained.

Figure 29:
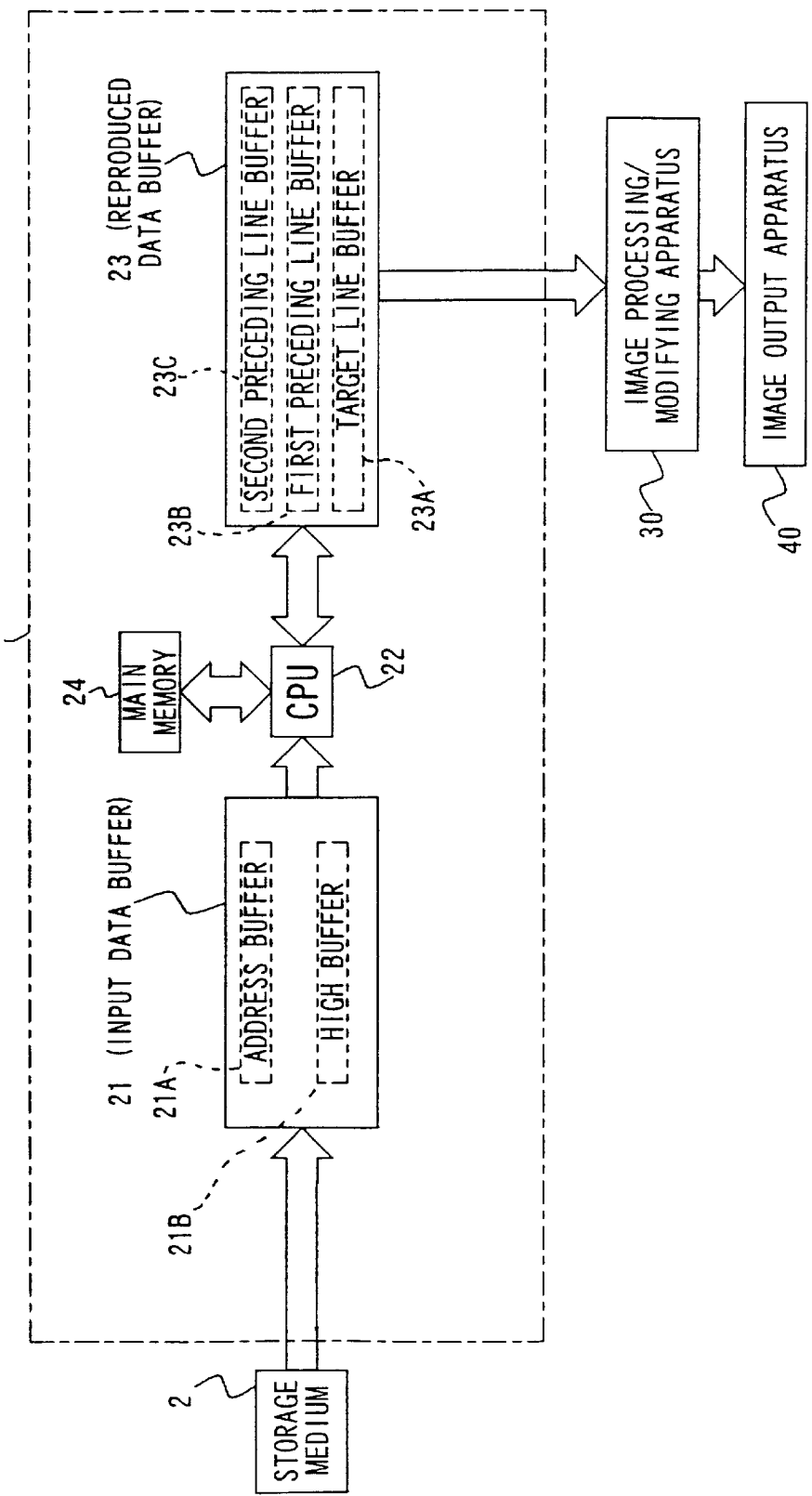
FIG. 29 is a block diagram illustrating the structure of the decoding processing apparatus employed in the sixth embodiment of the present invention.

FIG. 29 is a block diagram illustrating the decoding processing apparatus 20 employed to decode the compressed image data (see FIG. 28) that have been coded and stored in the storage medium 2. The decoding processing apparatus 20 decodes the compressed image data from the storage medium 2 and outputs the decoded image data (12-bit row data) to an image processing/modifying apparatus (e.g., a personal computer) 30. It comprises an input data buffer 21 that reads compressed image data from the storage medium 2, a CPU 22 that reproduces the compressed image data from the storage medium 2, a reproduced data buffer 23 that temporarily stores the reproduced image data (row data) in units of individual rows and outputs them and a main memory 24 that stores programs and the like executed by the CPU 22.

In addition, the image processing/modifying apparatus 30 is connected to the reproduced data buffer 23 in the decoding processing apparatus 20. The image processing/modifying apparatus 30 processes/modifies the reproduced image data (12-bit raw data) based upon processing/modification information (information input through a keyboard operation or the like by the user) input from the outside. The image data having undergone the processing/modification (e.g., 8-bit image data) are output to an image output apparatus (e.g., a CRT, a printer) 40 to achieve a desired image. It is to be noted that when the coding processing apparatus 10 explained earlier is employed in a digital camera, the decoding processing apparatus 20 and the image processing/modifying apparatus 30 are mainly constituted of a personal computer.

The input data buffer 21 of the decoding processing apparatus 20 comprises an address buffer 21A and a high buffer 20B. The "data block positional information" from the storage medium 2 is temporarily stored in the address buffer 21A and the "compressed image data" from the storage medium 2 are temporarily stored in the high buffer 21B.

The reproduced data buffer 23 of the decoding processing apparatus 20 comprises a target line buffer 23A, a first preceding line buffer 23B and a second preceding line buffer 23C. In the target line buffer 23A, the reproduced image data (12-bit raw data) corresponding to the row that is the object of the current reproduction processing (reproduction target line) are temporarily stored. In the first preceding line buffer 23B, the image data (12-bit raw data) corresponding to the row preceding the reproduction target line by one row shifted from the row corresponding to the target line buffer 23A are temporarily stored and in the second preceding line buffer 23C, the image data (12-bit raw data) in the row preceding the reproduction target line by two rows shifted from the row corresponding to the first preceding line buffer 23B are temporarily stored.

Figure 30:
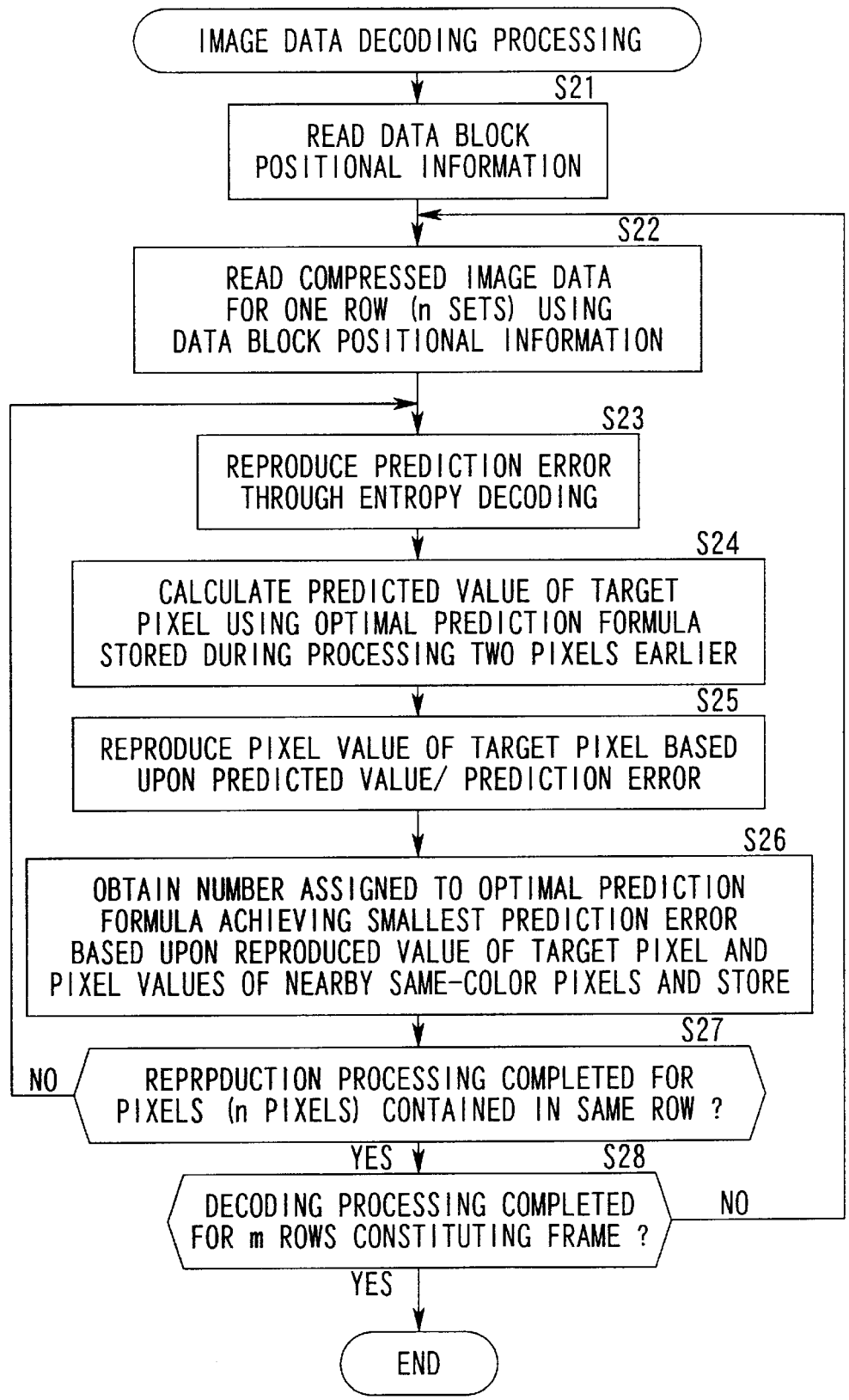
FIG. 30 is a flowchart of the image data decoding processing performed in the sixth embodiment.

FIG. 30 is a program flowchart of the image data decoding processing executed by the CPU 22 of the decoding processing apparatus 20 described above. When this image data decoding processing program is started, first, in step S21, the positional information (data block positional information) that is stored in the address buffer 21A of the input data buffer 21 is read.

In step S22, based upon the data block positional information thus read, the compressed image data (the prediction errors Δ coded through entropy coding) that corresponds to a specific row (n sets) are read. In step S23, entropy decoding such as Huffman decoding or arithmetic decoding is performed on the compressed image data thus read. This entropy decoding is achieved by reversing the procedure taken in the entropy coding in step S12 during the image data coding processing (see FIG. 26).

In step S24, the pixel values "a"~"f" of nearby pixels are incorporated for substitution as necessary in the optimal prediction formula (one of prediction formulae (1)~(14)) stored during the decoding process two pixels earlier (the pixel having a color filter with the same color component as that of the target pixel in the current loop) to calculate a predicted value "y" of the target pixel. In step S25, using the predicted value "y" thus calculated and the prediction error Δ that has been decoded, the pixel value "x" of the target pixel is reproduced.

In step S26, provisional predicted values "y" based upon the pixel value "x" of the target pixel and the pixel values "a"~"f" of the pixels in the vicinity of the target pixel (the pixels having the positional relationships illustrated in FIG. 27 relative to the target pixel) are determined through prediction formulae (1)~(14). Then, by using the pixel value of the target pixel "x" and the provisional predicted values "y," the optimal prediction formula that achieves the smallest prediction error Δ in the current loop is determined and the corresponding prediction formula number is stored. The prediction formula, the number of which is thus stored, is used in the calculation of the predicted value "y" of the target pixel in step S24 during the image data decoding processing two loops later.

In step S27, a decision is made as to whether or not the processing in steps S23~S26 described above has been performed for the entire row, i.e., for the n pixels contained in the row, and when the decoding processing on the compressed image data corresponding to one row has been completed, the operation proceeds to the next step S28. In step S28, a decision is made as to whether or not the processing in steps S22~S27 described above has been performed for all the rows (m rows) constituting a single frame (a single image plane), and if it is decided that the processing for the entire frame has not been completed, the operation returns to step S22 to repeat the processing. If the processing for all the rows (m rows) corresponding to the frame has been completed (the result of the decision made in step S28 is "yes"), the program ends.

As explained above, by adopting the image data coding/decoding method in the sixth embodiment, during DPCM coding/decoding of image data (12-bit image data) obtained by the single-board CCD 1 in high definition, provisional predicted values "y" of the target pixel are calculated through prediction formulae (1)~(7) that use the pixel values "a"~"c" of adjacent pixels having color filters with color components different from that of the target pixel, and more provisional predicted values "y" are calculated through prediction formulae (8)~(14) that use the pixel values "d"~"f" of pixels (same-color pixels) having color filters with the same color component as that of the target pixel to select the prediction formula achieving the smallest prediction error Δ relative to the pixel value "x" as the optimal prediction formula, and thus, image data compression can be achieved at an even higher compression rate.

Thus, when areas over which signals with the same color component are distributed evenly, areas corresponding to outlines where the degree of lightness greatly varies among signals having the same color component, areas showing almost monochromatic color and the like are present together within image data corresponding to one frame (one image plane), a predicted value (y) is calculated using the pixel values (d, e, f) of same-color pixels in an area where signals with the same color component are distributed evenly, whereas a predicted value (y) is calculated using the pixel values (a, b, c) of the adjacent pixels in an area where the degree of lightness varies greatly. Consequently, the prediction error (Δ) can be further reduced to achieve an improvement in the compression rate.

Figure 41:
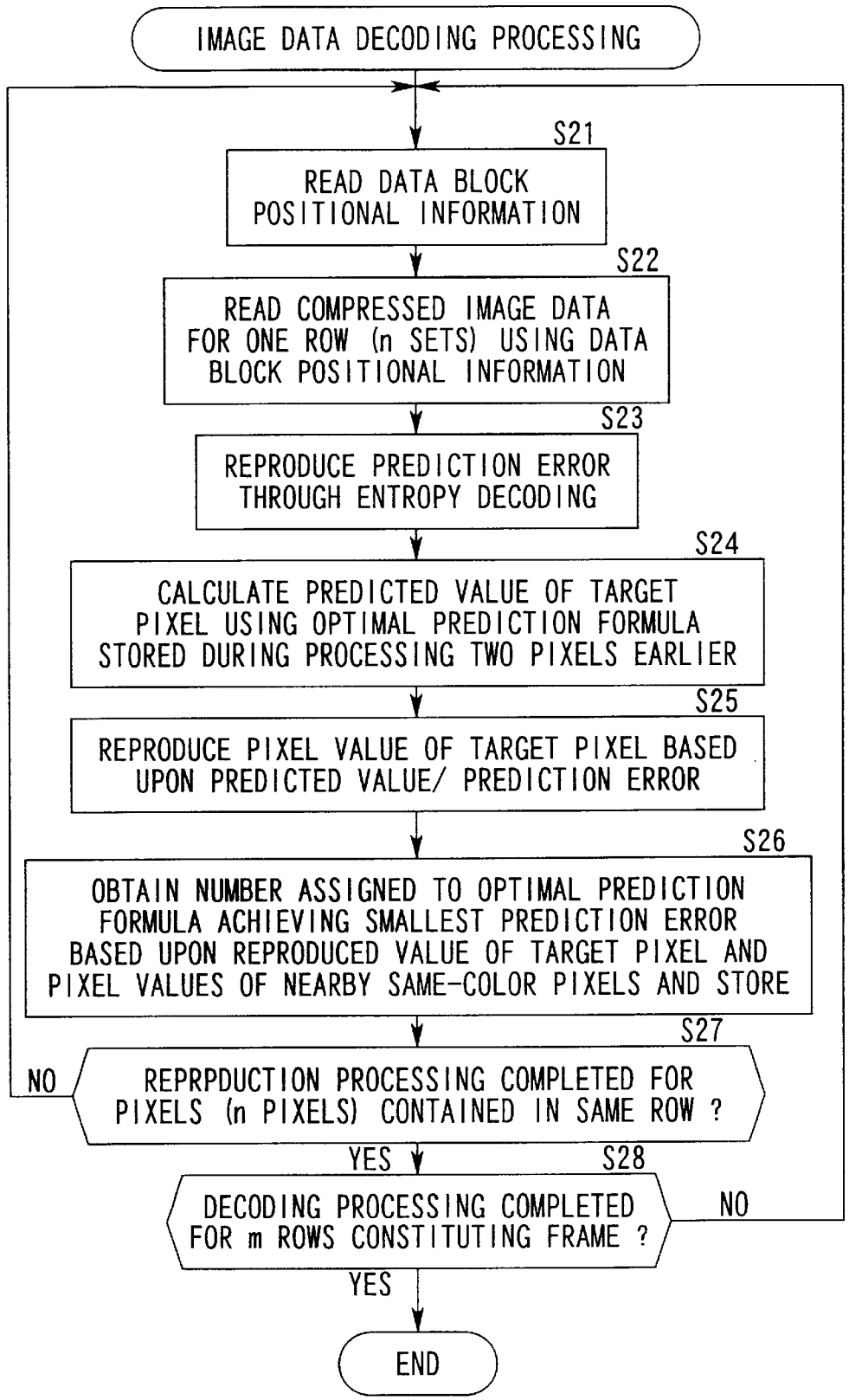
FIG. 41 presents a variation of the flowchart in FIG. 30.

In the image data decoding processing in the sixth embodiment, the operation returns to step S23 to repeat the processing as long as the result of the decision made in step S27 is "no" and the operation returns to step S22 to repeat the processing as long as the result of the decision made in step S28 is "no," in order to perform the processing efficiently. However, the processing may be repeated, starting in step S21 when the result of the decision made in step S27 is "no" or when the result of the decision made in step S28 is "no" as illustrated in FIG. 41 instead.

(Seventh Embodiment)

Figure 31:
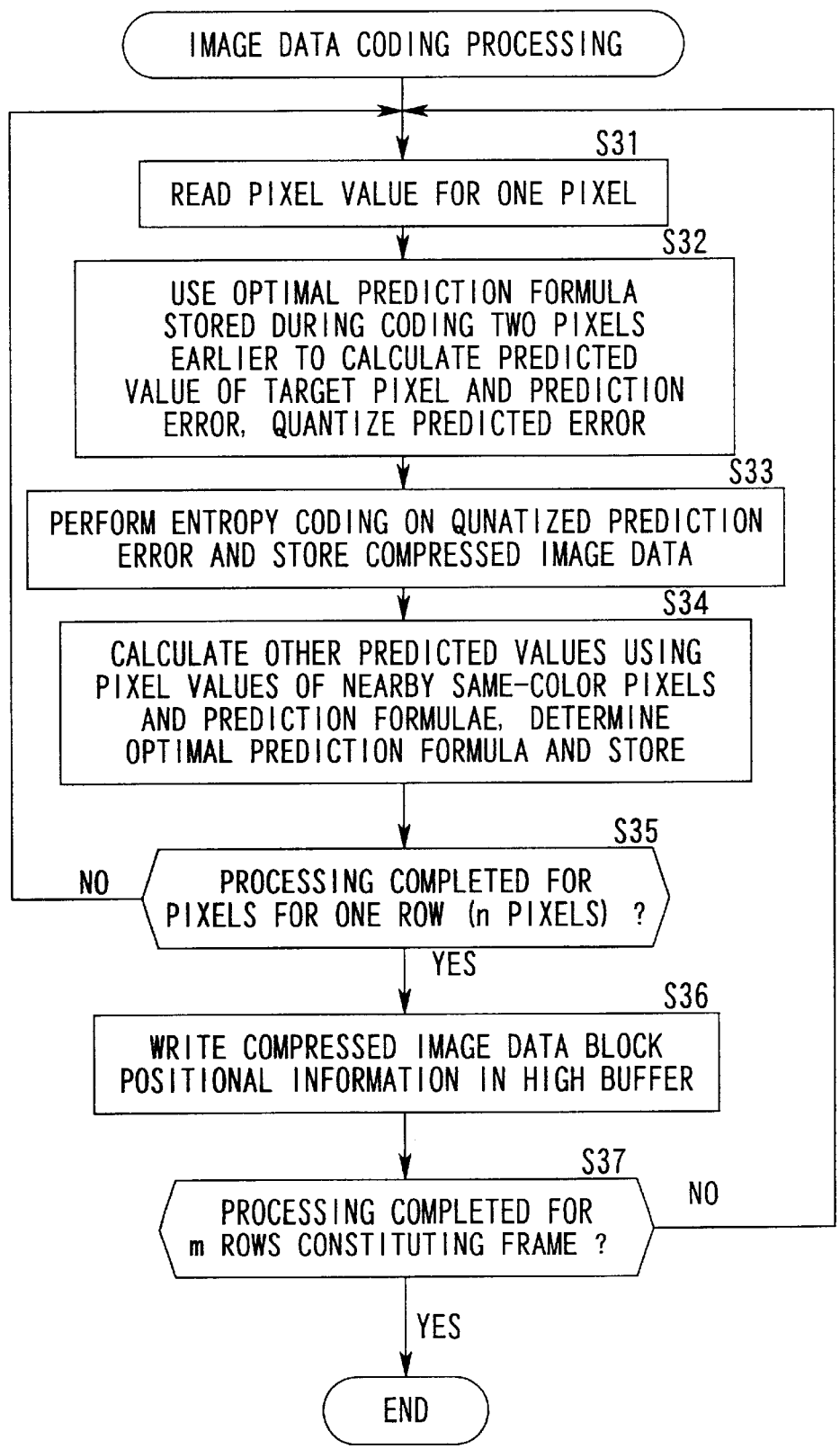
FIG. 31 is a flowchart of the image data coding processing performed in a seventh embodiment.
Figure 32:
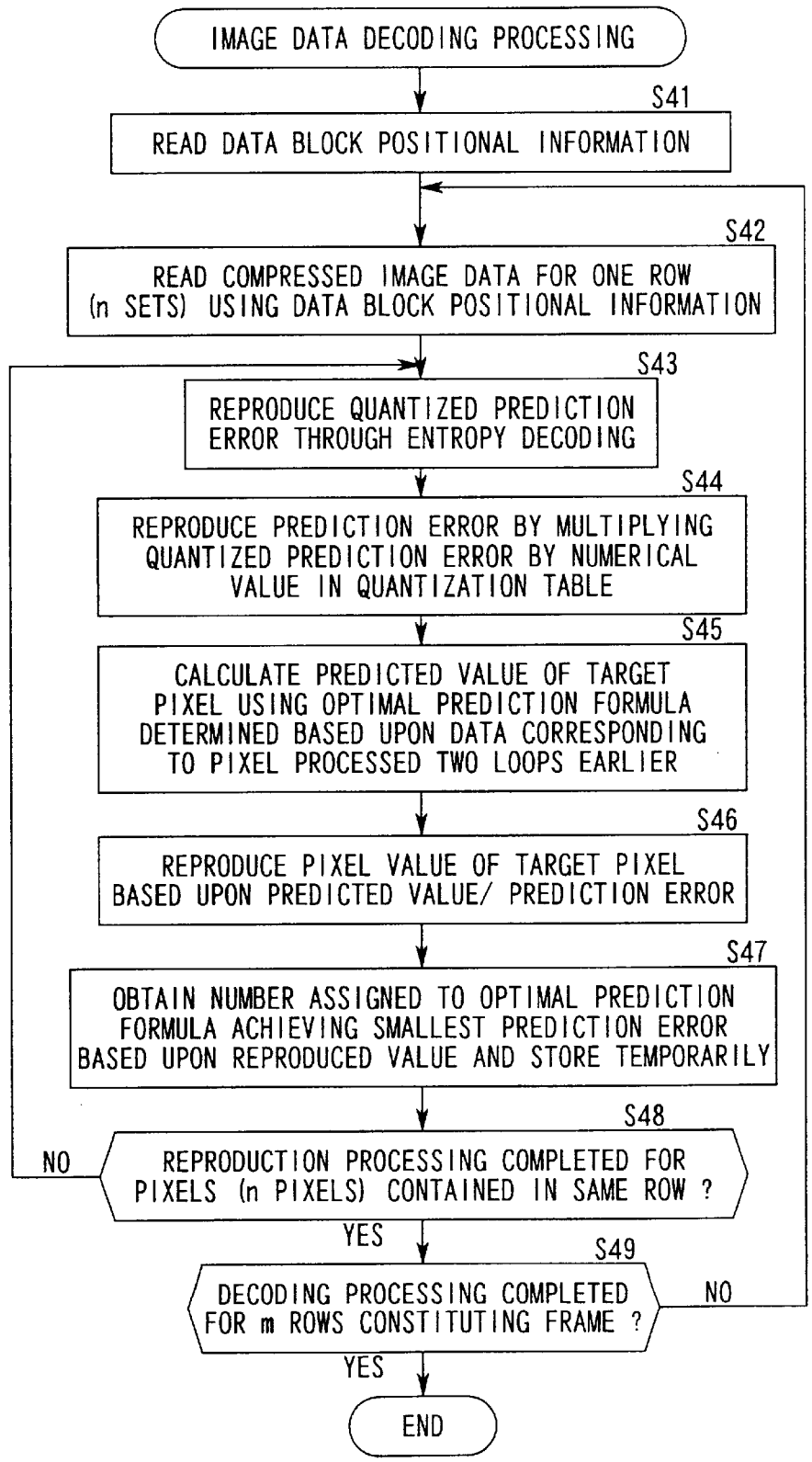
FIG. 32 is a flowchart of the image decoding processing performed in the seventh embodiment.

Next, the seventh embodiment of the present invention is explained in reference to the flowcharts in FIGS. 31 and 32. In the seventh embodiment, the prediction error Δ calculated using the predicted value "y" obtained through the optimal prediction formula (one of prediction formulae (1)~(14)) and the pixel value "x" obtained by a single-board CCD 1 is quantized by using a specific quantization table to ascertain a quantized prediction error δ which is then processed through entropy coding. In other words, instead of coding the prediction error Δ as in step S12 of the image data coding processing (see FIG. 26) in the sixth embodiment, steps S32 and S33 are executed.

First, in step S32, the prediction error Δ between the pixel value "x" obtained in step S31 and the predicted value "y" obtained through an optimal prediction formula determined two loops earlier is ascertained and, at the same time, the prediction error is quantized to obtain a quantized prediction error δ. It is to be noted that this quantization is achieved in conformance to specific quantization tables stored in the main memory.

In step S33, entropy coding such as Huffman coding, arithmetic coding or the like is performed on the quantized prediction error δ. It is to be noted that since the individual steps implemented in the image data coding processing other than steps S32 and S33 are identical to those executed in the image data coding processing in the sixth embodiment explained earlier, their detailed explanation is omitted.

The image data that have been compressed through the image data coding processing (see FIG. 31) are decoded through the image data decoding processing illustrated in FIG. 32 to reproduce high definition 12-bit image data.

In the image data decoding processing in the seventh embodiment, steps S43 and S44 are executed in place of the decoding of the prediction error Δ implemented in step S23 during the image data decoding processing (see FIG. 30) in the sixth embodiment.

First, in step S43, the quantized prediction error δ processed through entropy coding in step S33 of the image data coding processing (see FIG. 31) is decoded through entropy decoding. In step S44, the quantized prediction error δ is multiplied by the numerical value in the quantization table used in step S32 during the image data decoding processing (see FIG. 31) to restore the quantized prediction error δ to the prediction error Δ.

The prediction error Δ that has been reproduced in this manner, is then used in the processing in step S45 and subsequent steps to reproduce the pixel value "x" of the target pixel. It is to be noted that since the individual steps in the image data decoding processing starting with step S45 are identical to those executed in the image data decoding processing starting with step S24 in the sixth embodiment explained earlier, their detailed explanation is omitted. It is to be noted that the compression achieved through the coding/decoding processing in the seventh embodiment is irreversible.

It is to be noted that the quantization table utilized to ascertain the quantized prediction error δ achieves non-linear quantization with a small quantization step normally achieved when the prediction error Δ is small and a large quantization step achieved when the prediction error Δ is large, in accordance with human visual characteristics. In irreversible compression, the quantization tables are uniformly multiplied by a constant in correspondence to the compression rate to be achieved, to obtain a table value utilized in the actual arithmetic operation. Since the prediction error Δ is smaller in this seventh embodiment than that in DPCM coding in the prior art, the overall quantization step is small even when quantization of the known art is implemented, and thus, the degradation in the image quality occurring at the time of reproduction in irreversible coding can be prevented.

Figure 42:
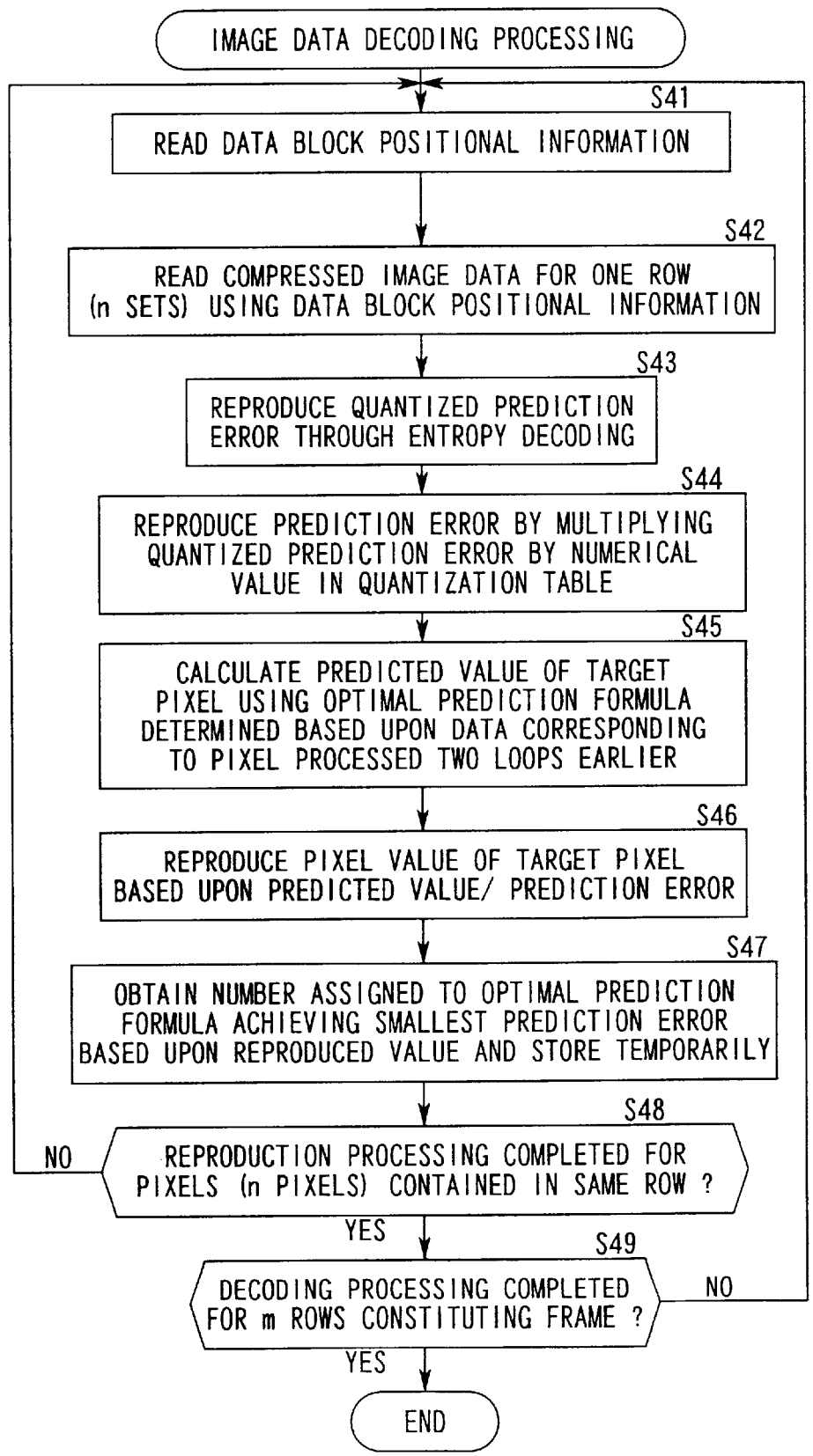
FIG. 42 presents a variation of the flowchart in FIG. 32.

In the image decoding processing in the seventh embodiment, the operation may return to the processing in step S41 if the result of the decision made in step S48 or S49 is "no," as illustrated in FIG. 42

By adopting the coding/decoding method in the seventh embodiment described above, in which the prediction error Δ obtained through the comparison of the pixel value "x" and the predicted value "y" is then quantized in conformance to a specific quantization table and the quantized value is then processed through entropy coding, the compression rate in DPCM coding is further improved.

It is to be noted that while the explanation is given in reference to the sixth and seventh embodiments on an example in which the single-board CCD 1 is provided with color filters (R, G and B) in the pattern illustrated in FIG. 25, the color filter array pattern is not restricted to that in FIG. 25. In addition, the color filter combination is not limited to the combination of red (R), green (G) and blue (B), and instead, a combination of four complementary colors, i.e., yellow (Y), magenta (M), cyan (C) and white (W) or a combination of four colors, i.e., yellow (Y), magenta (M), cyan (C) and green (G) may be used.

In addition, while the explanation is given in reference to the sixth and seventh embodiments on an example in which the optimal prediction formula utilized in coding is identified based upon the pixel value of a same-color pixel (the pixel preceding the target pixel by two pixels in the embodiment) during the decoding processing, the prediction formula number of the optimal prediction formula may be added to the data indicating the prediction error for storage each time.

Furthermore, while the explanation is given in reference to the sixth and seventh embodiments on an example in which the optimal prediction formula is determined for each pixel, a given optimal prediction formula may be utilized for coding/decoding units of a plurality of pixels (e.g., in units of individual compressed data blocks). Moreover, the same optimal prediction formula may be utilized for color filters with the same color component.

Moreover, while the explanation is given in reference to the sixth and seventh embodiments above on an example in which the prediction error Δ (or the quantized prediction error δ) is coded by using a Huffman coding table or the like, the prediction error Δ (or the quantized prediction error δ) may be coded through universal coding such as Ziv-Lempel, instead.

While the positional information (data block positional information) is affixed to the compressed image data by taking into consideration the possibility of partially reproducing an image in a given frame in the sixth and seventh embodiments described above, the positional information may be omitted as long as an intact image corresponding to the entire frame is always reproduced.

In addition, while the explanation is given in reference to the sixth and seventh embodiments on an example in which the coding processing apparatus and the decoding processing apparatus are constituted as separate apparatuses (e.g., the coding processing apparatus is provided in a digital camera and the decoding processing apparatus is provided in a personal computer), these two apparatuses may be internally provided within a single system (e.g., the two apparatuses may be internally provided at a digital camera or the like).

While the explanation is given in reference to the sixth and seventh embodiments on an example in which high definition image data with 12 bits per pixel are compressed, the present invention may be adopted when compressing 8-bit image data or image data with an even higher degree of resolution and gradation than 12 bits.

Moreover, while the explanation is given in reference to the sixth and seventh embodiments on the assumption that a still picture is obtained by a digital camera or the like, the present invention may be adopted when compressing dynamic pictures.

While the explanation is given in reference to the first embodiment on an example in which the program executed in the coding processing apparatus 10 (FIG. 10) and the program executed in the decoding apparatus 20 (FIG. 6) are stored in the internal main memories 14 (FIG. 1) and 24 (FIG. 6). However, these programs may be provided through a recording medium such as a CD-ROM and the like. Also, these programs may be provided via a communication medium such as a transmission line, a typical example of which is the internet. Namely, the programs may be converted to signals on a carrier wave that is transmitted on a transmission medium, and transmitted. Any types of recording media such as a magneto-optical device, a magnetic disk, a magnetic tape and a DVD may be used as the recording medium.

Figure 43:
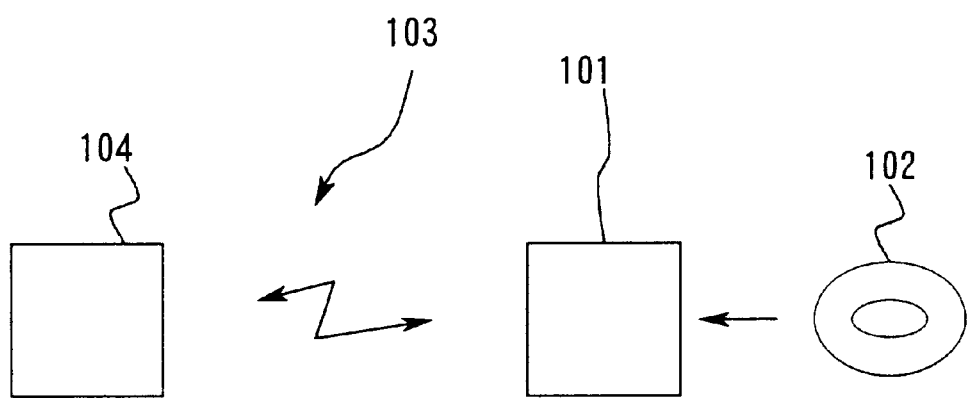
FIG. 43 illustrates a method for providing the program.

FIG. 43 illustrates a configuration through which the programs are provided in this manner. A processing unit 101 corresponds to the coding processing apparatus 10 or the decoding apparatus 20 explained above. The processing unit 101, which is provided with a CD ROM drive device, is capable of receiving programs provided on a CD ROM 102. In addition, the processing unit 101, which has a function of connecting with a telecommunication line or carrier wave 103, is capable of receiving programs or signals provided via the internet or the like. The programs described above are stored in a computer 104, which functions as a server computer, i.e., the provider of the program. The telecommunication line 103 may be a telecommunication line for an internet connection, telecomputing service or the like or a dedicated telecommunication line. The telecommunication line 103 may be a telephone line, a wireless telephone line, a mobile telephone line or the like.

What is claimed is:

1. An image data compression method for compressing image data including pixel data having a specific number of bits per pixel obtained at an image input device, comprising:
    a step in which the pixel data having the specific number of bits are divided into higher-order bit data having a first number of bits and lower-order bit data having a second number of bits;
    a step in which at least the higher-order bit data resulting from division are compressed through a specific compression method, wherein:
        the specific number of bits is equal to at least three; and the first number of bits is equal to at least two;
    a step in which the higher-order bit data that have been compressed are stored in a first storage area;
    a step in which the lower-order bit data are stored in a second storage area through a specific method; and
    a step in which first positional data provided for management of a storage position of the higher-order bit data and second positional data provided for management of a storage position of the lower-order bit data are stored in a third storage area.

2. An image data compression method for compressing image data including pixel data having a specific number of bits per pixel obtained at an image input device, comprising:
    a step in which the pixel data having the specific number of bits are divided into higher-order bit data having a first number of bits and lower-order bit data having a second number of bits;
    a step in which at least the higher-order bit data resulting from division are compressed through a specific compression method, wherein:
        the specific number of bits is equal to at least three, and the first number of bits is equal to at least two;
    a step in which the higher-order bit data that have been compressed are stored in a first storage area; and
    a step in which the lower-order bit data are stored in a second storage area through a specific method, wherein:
        data corresponding to a third number of bits starting from a highest order bit that is set in the pixel data are valid data, and
        bits in the lower-order bit data that are not included in the valid data are not stored in said second storage area.

3. An image data compression method for compressing image data including pixel data having a specific number of bits per pixel obtained at an image input device, comprising:
    a step in which the pixel data having the specific number of bits are divided into higher-order bit data having a first number of bits and lower-order bit data having a second number of bits; and
    a step in which at least the higher-order bit data-resulting from division are compressed through a specific compression method, wherein:
        the specific number of bits is equal to at least three, the first number of bits is equal to at least two,
        the image input device is provided with color filters having specific colors in correspondence to individual pixels, and
        said compression method employed to compress the higher-order bit data comprises:
            a step in which the individual pixels are each sequentially assigned as a target pixel;
            a step in which a predicted value for the target pixel is calculated based upon pixel data corresponding to one or more nearby pixels including, at least, a pixel having a color filter with the same color component as the target pixel that has the same color component as the target pixel that has already been obtained;
            a step in which an error in the predicted value that has been calculated relative to pixel data corresponding to the target pixel obtained by the image input device is ascertained; and
            a step in which the error that has been calculated is coded through a specific method.

4. An image data compression method for compressing image data, which is obtained by an image input device, having a specific number of bits per pixel, comprising:
    a step in which raw data corresponding to each pixel having the specific number of bits are divided into higher-order bit data having a specific number of higher-order bits and lower-order bit data having a specific number of lower-order bits;

a step in which the higher-order bit data undergo reversible coding;

a step in which a number of valid bits in the lower order bit data is determined based upon the raw data corresponding to each pixel having the specific number of bits per pixel;

a step in which higher-order data corresponding to specific bits in the lower-order bit data are extracted in conformance to a width representing the number of valid bits;

a step in which management data to be used to individually manage the higher-order bit data having undergone the reversible coding and the lower-order bit data corresponding to the width representing the number of valid bits that have been extracted are generated; and a step in which the higher-order bit data having undergone the reversible coding, the lower-order bit data corresponding to the width representing the number of valid bits that have been extracted and the management data that have been generated are recorded in the recording medium.

5. An image data compression method according to claim 4, wherein:

the number of valid bits is determined in conformance to a valid bit width in the raw data corresponding to each pixel.

6. An image data compression method according to claim 4, wherein:

the valid bit width of each pixel is a value corresponding to a degree of accuracy of detection achieved at the image input device; and the specific number of higher-order bits at which correlation with nearby pixels tends to manifest greatly, is determined through rules of experience.

7. An image data compression apparatus that compresses image data including pixel data having a specific number of bits per pixel obtained at an image input device, comprising:

a data dividing unit that divides the pixel data having the specific number of bits into higher-order bit data having a first number of bits and lower-order bit data having a second number of bits;

a compression unit that compresses at least the higher-order bit data resulting from data division through a specific compression method, wherein:

the specific number of bits is equal to at least three, and the first number of bits is equal to at least two; and a recording control device that stores the higher-order bit data that have been compressed in a first storage area of a recording medium, stores the lower-order bit data in a second storage area of the recording medium through a specific method, and stores first positional data provided for management of a storage position of the higher-order bit data and second positional data provided for management of a storage position of the lower-order bit data in a third storage area of the recording medium.

8. An image data compression apparatus that compresses image data including pixel data having a specific number of bits per pixel obtained at an image input device, comprising:

a data dividing unit that divides the pixel data having the specific number of bits into higher-order bit data having a first number of bits and lower-order bit data having a second number of bits;

a compression unit that compresses at least the higher-order bit data resulting from data division through a specific compression method, wherein:

the specific number of bits is equal to at least three, and the first number of bits is equal to at least two; and a recording control device that stores the higher-order bit data that have been compressed in a first storage area of a recording medium and stores the lower-order bit data in a second storage area of said recording medium through a specific method, wherein:

data corresponding to a third number of bits starting from a highest order bit that is set in the pixel data are valid data; and bits in the lower-order bit data that are not included in the valid data are not stored in said second storage area by said recording control device.

9. An image data compression apparatus that compresses image data including pixel data having a specific number of bits per pixel obtained at an image input device, comprising:

a data dividing unit that divides the pixel data having the specific number of bits into higher-order bit data having a first number of bits and lower-order bit data having a second number of bits; and a compression unit that compresses at least the higher-order bit data resulting from data division through a specific compression method, wherein:

the specific number of bits is equal to at least three, the first number of bits is equal to at least two, the image input device is provided with color filters having specific colors in correspondence to individual pixel, and said compression unit sequentially assigns each of the individual pixels as a target pixel, calculates a predicted value for the target pixel based upon pixel data corresponding to one or more nearby pixels including, at least, a pixel having a color filter with the same color component as the target pixel that has already been obtained, calculates an error in the predicted value that has been calculated relative to pixel data corresponding to the target pixel obtained by the image input device, and codes the error that has been calculated through a specific method.

10. A recording medium having recorded therein an image date compression program used in an image data compression processing apparatus that compresses image data including pixel data having a specific number of bits per pixel obtained at an image input device, said image data compression program comprising:

a step in which the pixel data having the specific number of bits are divided into higher-order bit data having a first number of bits and lower-order bit data having a second number of bits;

a step in which at least the higher-order bit data resulting from division are compressed through a specific compression method, wherein:

the specific number of bits is equal to at least three, and the first number of bits is equal to at least two;

a step in which the higher-order bit data that have been compressed are stored in a first storage area;

a step in which the lower-order bit data are stored in a second storage area through a specific method; and a step in which first positional data provided for management of a storage position of the higher-order bit data and second positional data provided for management of a storage position of the lower-order bit data are stored in a third storage area.

11. A recording medium having recorded therein an image data compression program used in an image data compression processing apparatus that compresses image data including pixel data having a specific number of bits per pixel obtained at an image input device, said image data compression proven comprising:

a step in which the pixel data having the specific number of bits are divided into higher-order bit data having a first number of bits and lower-order bit data having a second number of bits;

a step in which at least the higher-order bit data resulting from division are compressed through a specific compression method, wherein:
the specific number of bits is equal to at least three, and the first number of bits is equal to at least two;

a step in which the higher-order bit data that have been compressed are stored in a first storage area; and a step in which the lower-order bit data are stored in a second storage area through a specific method, wherein:
data corresponding to a third number of bits starting from a highest order bit that is set in the pixel data are valid data; and
bits in the lower-order bit data that are not included in the valid data are not stored in said second storage area.

12. A data signal embodied in a carrier wave comprising an image data compression program used in an image data compression processing apparatus that compresses image data including pixel data having a specific number of bits per pixel obtained at an image input device, said image data compression program comprising:

a step in which the pixel data having the specific number of bits are divided into higher-order bit data having a first number of bits and lower-order bit data having a second number of bits;

a step in which at least the higher-order bit data resulting from division are compressed through a specific compression method, wherein:
the specific number of bits is equal to at least three, and the first number of bits is equal to at least two;

a step in which the higher-order bit data that have been compressed are stored in a first storage area;

a step in which the lower-order bit data are stored in a second storage area through a specific method; and a step in which first positional data provided for management of a storage position of the higher-order bit data and second positional data provided for management of a storage position of the lower order bit data are stored in a third storage area.

13. A data signal embodied in a carrier wave comprising an image data compression program used in an image data compression processing apparatus that compresses image data including pixel data having a specific number of bits per pixel obtained at an image input device, said image data compression program comprising:

a step in which the pixel data having the specific number of bits are divided into higher-order bit data having a first number of bits and lower-order bit data having a second number of bits;

a step in which at least the higher-order bit data resulting from division are compressed through a specific compression method, wherein:
the specific number of bits is equal to at least three, and the first number of bits is equal to at least two;

a step in which the higher-order bit data that have been compressed are stored in a first storage area; and a step in which the lower-order bit data are stored in a second storage area through a specific method, wherein:
data corresponding to a third number of bits starting from a highest order bit that is set in the pixel data are valid data; and
bits in the lower-order bit data that are not included in the valid data are not stored in said second storage area.

14. An image data compression method for compressing image data including pixel data having a specific number of bits per pixel obtained at an image input device, comprising:

a step in which the pixel data having the specific number of bits are divided into higher-order bit data having a first number of bits and lower-order bit data having a second number of bits;

a step in which at least the higher-order bit data resulting from division are compressed through a specific compression method, wherein:
the specific number of bits is equal to at least eight, and the first number of bits is equal to at least two; and a step in which the higher-order bit data that have been compressed are stored in a first storage area; and a step in which the lower-order bit data are stored in a second storage area through a specific method, wherein:
data corresponding to a third number of bits starting from a highest order bit that is set in the pixel data are valid data, and
bits in the lower-order bit data that are not included in the valid data are not stored in said second storage area.

15. An image data compression apparatus that compresses image data including pixel data having a specific number of bits per pixel obtained at an image input device, comprising:

a data dividing unit that divides the pixel data having the specific number of bits into higher-order bit data having a first number of bits and lower-order bit data having a second number of bits;

a compression unit that compresses at least the higher-order bit data resulting from data division through a specific compression method, wherein:
the specific number of bits is equal to at least eight, and the first number of bits is equal to at least two; and a recording control device that stores the higher-order bit data that have been compressed in a first storage area of a recording medium and stores the lower-order bit data in a second storage area of said recording medium through a specific method, wherein:
data corresponding to a third number of bits starting from a highest order bit that is set in the pixel data are valid data, and
bits in the lower-order bit data that are not included in the valid data are not stored in said second storage area by said recording control device.

16. A recording medium having recorded therein an image data compression program used in an image data compression processing apparatus that compresses image data including pixel data having a specific number of bits per pixel obtained at an image input device, said image data compression program comprising:

a step in which the pixel data having the specific number of bits are divided into higher-order bit data having a first number of bits and lower-order bit data having a second number of bits;

a step in which at least the higher-order bit data resulting from division are compressed through a specific compression method, wherein:
the specific number of bits is equal to at least eight, and the first number of bits is equal to at least two;

a step in which the higher-order bit data that have been compressed are stored in a first storage area; and a step in which the lower-order bit data are stored in a second storage area through a specific method, wherein:

data corresponding to a third number of bits starting from a highest-order bit that is set in the pixel data are valid data, and bits in the lower-order bit data that are not included in the valid data are not stored in said second storage area.

17. A data signal embodied in a carrier wave comprising an image data compression program used in an image data compression processing apparatus that compresses image data including pixel data having a specific number of bits per pixel obtained at an image input device, said image data compression program comprising:

a step in which the pixel data having the specific number of bits are divided into higher-order bit data having a first number of bits and lower-order bit data having a second number of bits;

a step in which at least the higher-order bit data resulting from division are compressed through a specific compression method, wherein:

the specific number of bits is equal to at least eight, and the first number of bits is equal to at least two;

a step in which the higher-order bit data that have been compressed are stored in a first storage area; and a step in which the lower-order bit data are stored in a second storage area through a specific method, wherein:

data corresponding to a third number of bits starting from a highest order bit that is set in the pixel data are valid data, and bits in the lower-order bit data that are not included in the valid data are not stored in said second storage area.

* * * * *